US010180109B2

(12) United States Patent
Okubo et al.

(10) Patent No.: US 10,180,109 B2
(45) Date of Patent: Jan. 15, 2019

(54) INTERNAL COMBUSTION ENGINE

(71) Applicant: TOYOTA JIDOSHA KABUSHIKI KAISHA, Toyota-shi, Aichi-ken (JP)

(72) Inventors: Takuya Okubo, Susono (JP); Norihisa Nakagawa, Susono (JP); Koichi Kimura, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 355 days.

(21) Appl. No.: 15/082,037

(22) Filed: Mar. 28, 2016

(65) Prior Publication Data

US 2016/0290245 A1 Oct. 6, 2016

(30) Foreign Application Priority Data

Mar. 30, 2015 (JP) .................. 2015-069212

(51) Int. Cl.
*F02D 13/02* (2006.01)
*F02D 41/02* (2006.01)
(Continued)

(52) U.S. Cl.
CPC ..... *F02D 13/0261* (2013.01); *F02D 41/0007* (2013.01); *F02D 41/0295* (2013.01);
(Continued)

(58) Field of Classification Search
CPC .. F02D 13/0261; F02D 41/26; F02D 41/1454; F02D 41/0007; F02D 41/1441;
(Continued)

(56) References Cited

U.S. PATENT DOCUMENTS 5,784,879 A * 7/1998 Dohta ................... F01N 11/007
60/276
7,275,516 B1* 10/2007 Cunningham ........ F02B 25/145
123/305
(Continued)

FOREIGN PATENT DOCUMENTS

EP 2952715 A1 12/2015
JP S64-066448 A 3/1989
(Continued)

*Primary Examiner* — Sizo Vilakazi
*Assistant Examiner* — Brian Kirby
(74) *Attorney, Agent, or Firm* — Hunton Andrews Kurth LLP

(57) ABSTRACT

An internal combustion engine 100 comprises an air-fuel ratio control device. The air-fuel ratio control device controls the amount of fuel fed to the combustion chamber by feedback control so that the air-fuel ratio detected by the upstream side air-fuel ratio sensor matches the target air-fuel ratio when a blow-through amount of air blown from the intake passage through a cylinder to the exhaust passage due to an occurrence of valve overlap is a reference blow-through amount or less. The air-fuel ratio control device sets the target air-fuel ratio of the inflowing exhaust gas based on the air-fuel ratio detected by the downstream side air-fuel ratio sensor and, without performing the feedback control, feeds the amount of fuel calculated from the target air-fuel ratio to the combustion chamber when the blow-through amount is greater than the reference blow-through amount.

10 Claims, 19 Drawing Sheets

(51) Int. Cl.
| | | |
|---|---|---|
| *F02D 41/14* | (2006.01) | |
| *F02D 41/00* | (2006.01) | |
| *F02D 41/26* | (2006.01) | |
| *F02B 37/00* | (2006.01) | |
| *F02B 25/14* | (2006.01) | |

(52) U.S. Cl.
CPC ..... *F02D 41/1441* (2013.01); *F02D 41/1454* (2013.01); *F02D 41/1456* (2013.01); *F02D 41/26* (2013.01); *F02B 25/145* (2013.01); *F02B 37/00* (2013.01); *F02D 2041/001* (2013.01); *F02D 2200/0814* (2013.01); *Y02T 10/144* (2013.01); *Y02T 10/18* (2013.01)

(58) Field of Classification Search
CPC ............. F02D 41/1456; F02D 41/0295; F02D 2041/001; F02D 2200/0814; Y02T 10/18; Y02T 10/144; F02B 25/145; F02B 37/00
See application file for complete search history.

(56) References Cited

U.S. PATENT DOCUMENTS

| | | | | |
|---|---|---|---|---|
| 9,856,811 | B2* | 1/2018 | Okubo | F02D 41/1454 |
| 2002/0011068 | A1* | 1/2002 | Kako | F01N 11/007 |
| | | | | 60/285 |
| 2002/0078683 | A1* | 6/2002 | Katayama | F02D 41/0295 |
| | | | | 60/285 |
| 2003/0196428 | A1* | 10/2003 | Iida | F01N 3/10 |
| | | | | 60/285 |
| 2005/0097888 | A1* | 5/2005 | Miyashita | F02D 41/0007 |
| | | | | 60/602 |
| 2008/0087259 | A1* | 4/2008 | Kato | F02D 41/1441 |
| | | | | 123/672 |
| 2009/0070014 | A1* | 3/2009 | Miyashita | F02D 13/0261 |
| | | | | 701/105 |
| 2010/0024785 | A1 | 2/2010 | Yoshioka | |
| 2011/0126519 | A1* | 6/2011 | Okada | F02D 13/0246 |
| | | | | 60/276 |
| 2011/0144892 | A1* | 6/2011 | Katsumata | F02D 23/00 |
| | | | | 701/104 |
| 2011/0179774 | A1* | 7/2011 | Iihoshi | F02D 41/0085 |
| | | | | 60/276 |
| 2013/0111900 | A1* | 5/2013 | Hagner | F02D 41/0062 |
| | | | | 60/602 |
| 2013/0211692 | A1* | 8/2013 | Asami | B60W 20/00 |
| | | | | 701/103 |
| 2013/0255631 | A1* | 10/2013 | Ruhland | F02D 41/30 |
| | | | | 123/445 |
| 2013/0305707 | A1* | 11/2013 | Takagi | F02B 25/145 |
| | | | | 60/597 |
| 2013/0340423 | A1* | 12/2013 | Tsunooka | F02D 41/2454 |
| | | | | 60/600 |
| 2014/0216394 | A1* | 8/2014 | Matsuda | F02D 13/0223 |
| | | | | 123/295 |
| 2014/0331651 | A1* | 11/2014 | Nishikiori | F02D 41/1475 |
| | | | | 60/285 |
| 2015/0075492 | A1 | 3/2015 | Glugla et al. | |
| 2015/0184582 | A1* | 7/2015 | Kondo | F02D 41/1456 |
| | | | | 123/674 |
| 2015/0204260 | A1* | 7/2015 | Shimojo | F02D 41/0295 |
| | | | | 60/285 |
| 2015/0330323 | A1 | 11/2015 | Aoki | |
| 2016/0017831 | A1 | 1/2016 | Nakagawa et al. | |
| 2016/0032843 | A1* | 2/2016 | Ulrey | F02D 41/0007 |
| | | | | 123/90.15 |
| 2016/0153331 | A1* | 6/2016 | Cavanna | F01N 3/05 |
| | | | | 60/273 |
| 2016/0290245 | A1* | 10/2016 | Okubo | F02D 41/26 |

FOREIGN PATENT DOCUMENTS

| | | |
|---|---|---|
| JP | 2003-083134 A | 3/2003 |
| JP | 2008-157057 A | 7/2008 |
| JP | 2010159701 A * | 7/2010 |
| JP | 2014-145308 A | 8/2014 |
| WO | 2013/080362 A1 | 6/2013 |
| WO | 2014/118889 A1 | 8/2014 |
| WO | 2014/118892 A1 | 8/2014 |

* cited by examiner

INTERNAL COMBUSTION ENGINE

CROSS-REFERENCE TO RELATED APPLICATION

The present application claims priority to Japanese Patent Application No. 2015-069212 filed on Mar. 30, 2015, which is incorporated herein by reference in its entirety.

TECHNICAL FIELD

The present invention relates to an internal combustion engine.

BACKGROUND ART

In an internal combustion engine, if valve overlap occurs when a pressure inside an intake port is higher than a pressure inside an exhaust port, air is blown from an intake passage through a cylinder to an exhaust passage, that is, "scavenging" occurs. In an internal combustion engine which is provided with a supercharger such as a turbocharger, scavenging is used when an amount of intake air is insufficient for a torque demand. Due to the occurrence of scavenging, the amount of exhaust gas which sweeps through increases and a speed of a turbine of the supercharger is raised. As a result, a pressure of the intake air is raised and the amount of intake air is made to increase.

Known in the past has been an internal combustion engine which comprises an air-fuel ratio sensor in an exhaust passage of the internal combustion engine and which controls the amount of fuel which is fed to a combustion chamber of the internal combustion engine so that the output of this air-fuel ratio sensor matches a target air-fuel ratio (for example stoichiometric air-fuel ratio (14.6)) (for example, see PLTs 1 and 2).

CITATIONS LIST

Patent Literature

PLT 1. International Publication No. 2014/118892A
PLT 2. International Publication No. 2014/118889A
PLT 3. Japanese Patent Publication No. 2008-157057A
PLT 4. Japanese Patent Publication No. 2003-083134A
PLT 5. Japanese Patent Publication No. 64-066448A

SUMMARY OF INVENTION

Technical Problem

However, if the above-mentioned scavenging occurs, the air in a cylinder is decreased, so a combustion air-fuel ratio in the cylinder becomes rich. If the scavenging amount is large and the rich degree of the combustion air-fuel ratio becomes higher, the concentration of hydrogen in the exhaust gas becomes higher. If exhaust gas contains hydrogen, the difference in gas diffusion between hydrogen with its fast diffusion speed and other exhaust components causes the hydrogen to first reach an electrode surface of an air-fuel ratio sensor. As a result, the electrode surface of the air-fuel ratio sensor becomes a rich atmosphere and output of the air-fuel ratio sensor deviates to the rich side. If the air-fuel ratio is controlled based on the air-fuel ratio which is deviated to the rich side, the actual combustion air-fuel ratio in a cylinder becomes leaner than the target air-fuel ratio. As a result, the efficiency of removal of unburned gas etc. at the exhaust purification catalyst falls and the exhaust emissions are liable to deteriorate.

Therefore, in consideration of the above problem, an object of the present invention is to provide an internal combustion engine which can suppress deterioration of the exhaust emissions which accompanies occurrence of scavenging.

Solution to Problem

In order to solve the above problem, in a first invention, there is provided an internal combustion engine comprising: a supercharger which can change a pressure of air fed into a combustion chamber, a variable valve timing mechanism which can change an amount of valve overlap between an intake valve and an exhaust valve, a catalyst which is arranged in an exhaust passage and which can store oxygen, an upstream side air-fuel ratio sensor which is arranged at an upstream side of the catalyst and which can detect an air-fuel ratio of inflowing exhaust gas flowing into the catalyst, a downstream side air-fuel ratio sensor which is arranged at a downstream side of the catalyst and which can detect an air-fuel ratio of outflowing exhaust gas flowing out from the catalyst, and an air-fuel ratio control device controlling an air-fuel ratio of the inflowing exhaust gas, wherein, the air-fuel ratio control device sets a target air-fuel ratio of the inflowing exhaust gas based on the air-fuel ratio detected by the downstream side air-fuel ratio sensor and controls the amount of fuel fed to the combustion chamber by feedback control so that the air-fuel ratio detected by the upstream side air-fuel ratio sensor matches the target air-fuel ratio when a blow-through amount of air blown from the intake passage through a cylinder to the exhaust passage due to an occurrence of valve overlap is a reference blow-through amount or less, and sets the target air-fuel ratio of the inflowing exhaust gas based on the air-fuel ratio detected by the downstream side air-fuel ratio sensor and, without performing the feedback control, feeds the amount of fuel calculated from the target air-fuel ratio to the combustion chamber when the blow-through amount is greater than the reference blow-through amount, and the air-fuel ratio control device updates the target air-fuel ratio of the inflowing exhaust gas based on the oxygen storage amount of the catalyst and the air-fuel ratio detected by the downstream side air-fuel ratio sensor, the oxygen storage amount of the catalyst being calculated based on the air-fuel ratio detected by the upstream side air-fuel ratio sensor when the blow-through amount is the reference blow-through amount or less and being calculated based on the target air-fuel ratio of the inflowing exhaust gas when the blow-through amount is greater than the reference blow-through amount.

In a second invention, the reference blow-through amount is zero in the first invention.

In a third invention, the target air-fuel ratio is alternately set to a rich set air-fuel ratio richer than a stoichiometric air-fuel ratio and a lean set air-fuel ratio leaner than the stoichiometric air-fuel ratio, the air-fuel ratio control device, in rich control where the target air-fuel ratio is set to the rich set air-fuel ratio, switches the target air-fuel ratio to the lean set air-fuel ratio when the air-fuel ratio detected by the downstream side air-fuel ratio sensor reaches a rich judged air-fuel ratio richer than the stoichiometric air-fuel ratio and, in lean control where the target air-fuel ratio is set to the lean set air-fuel ratio, switches the target air-fuel ratio to the rich set air-fuel ratio when it is estimated that the oxygen storage amount of the catalyst has reached a reference oxygen storage amount smaller than the maximum oxygen storage amount, oxygen storage amount of the catalyst being calculated based on the air-fuel ratio detected by the upstream side air-fuel ratio sensor when the blow-through amount is the reference blow-through amount or less and is calculated based on the target air-fuel ratio when the blow-through amount is greater than the reference blow-through amount in the first invention.

In a forth invention, the air-fuel ratio control device, in lean control, switches the target air-fuel ratio to the rich set air-fuel ratio when the air-fuel ratio detected by the downstream side air-fuel ratio sensor reaches a lean judged air-fuel ratio leaner than the stoichiometric air-fuel ratio if the air-fuel ratio detected by the downstream side air-fuel ratio sensor reaches the lean judged air-fuel ratio before it has estimated that the oxygen storage amount of the catalyst has reached the reference oxygen storage amount in the third invention.

In a fifth invention, the target air-fuel ratio is set to any of a rich set air-fuel ratio richer than a stoichiometric air-fuel ratio, a weakly rich set air-fuel ratio richer than the stoichiometric air-fuel ratio and closer to the stoichiometric air-fuel ratio than the rich set air-fuel ratio, a lean set air-fuel ratio leaner than the stoichiometric air-fuel ratio, and a weakly lean set air-fuel ratio leaner than the stoichiometric air-fuel ratio and closer to the stoichiometric air-fuel ratio than the lean set air-fuel ratio, the air-fuel ratio control device, in rich control where the target air-fuel ratio is set to the rich set air-fuel ratio, switches the target air-fuel ratio to the weakly rich set air-fuel ratio when it is estimated that the oxygen storage amount of the catalyst has reached a first reference oxygen storage amount smaller than the maximum oxygen storage amount, in weakly rich control where the target air-fuel ratio is set to the weakly rich set air-fuel ratio, switches the target air-fuel ratio to the lean set air-fuel ratio when the air-fuel ratio detected by the downstream side air-fuel ratio sensor reaches a rich judged air-fuel ratio richer than the stoichiometric air-fuel ratio, in lean control where the target air-fuel ratio is set to the lean set air-fuel ratio, switches the target air-fuel ratio to the weakly lean set air-fuel ratio when it is estimated that the oxygen storage amount of the catalyst has reached a second reference oxygen storage amount smaller than the maximum oxygen storage amount, and, in weakly lean control where the target air-fuel ratio is set to the weakly lean set air-fuel ratio, switches the target air-fuel ratio to the rich set air-fuel ratio when the air-fuel ratio detected by the downstream side air-fuel ratio sensor has reached a lean judged air-fuel ratio leaner than the stoichiometric air-fuel ratio, the oxygen storage amount of the catalyst being calculated based on the air-fuel ratio detected by the upstream side air-fuel ratio sensor when the blow-through amount is the reference blow-through amount or less and is calculated based on the target air-fuel ratio when the blow-through amount is larger than the reference blow-through amount in the first invention.

In a sixth invention, the air-fuel ratio control device, in the rich control, switches the target air-fuel ratio to the lean set air-fuel ratio when the air-fuel ratio detected by the downstream side air-fuel ratio sensor reaches the rich judged air-fuel ratio if the air-fuel ratio detected by the downstream side air-fuel ratio sensor reaches the rich judged air-fuel ratio before the oxygen storage amount of the catalyst reaches the first reference oxygen storage amount and, in the lean control, switches the target air-fuel ratio to the rich set air-fuel ratio when the air-fuel ratio detected by the downstream side air-fuel ratio sensor reaches the lean judged air-fuel ratio if the air-fuel ratio detected by the downstream side air-fuel ratio sensor reaches the lean judged air-fuel ratio before the oxygen storage amount of the catalyst reaches the second reference oxygen storage amount in the fifth invention.

In a seventh invention, the weakly lean set air-fuel ratio when the blow-through amount is larger than the reference blow-through amount is larger than the weakly lean set air-fuel ratio when the blow-through amount is the reference blow-through amount or less, and the weakly rich set air-fuel ratio when the blow-through amount is larger than the reference blow-through amount is smaller than the weakly rich set air-fuel ratio when the blow-through amount is the reference blow-through amount or less in the fifth or sixth invention.

In an eighth invention, the lean set air-fuel ratio when the blow-through amount is larger than the reference blow-through amount is larger than the lean set air-fuel ratio when the blow-through amount is the reference blow-through amount or less and the rich set air-fuel ratio when the blow-through amount is larger than the reference blow-through amount is smaller than the rich set air-fuel ratio when the blow-through amount is the reference blow-through amount or less in any one of the third to seventh inventions.

In a ninth invention, the air-fuel ratio control device calculates an amount of oxygen stored in the catalyst in the time period from when switching the target air-fuel ratio to the lean set air-fuel ratio to when switching the target air-fuel ratio to the rich set air-fuel ratio, constituting a first oxygen amount, and an amount of oxygen released from the catalyst in the time period from when switching the target air-fuel ratio to the rich set air-fuel ratio to when switching the target air-fuel ratio to the lean set air-fuel ratio, constituting a second oxygen amount, based on the air-fuel ratio detected by the upstream side air-fuel ratio sensor, and the air-fuel ratio control device updates a learning value based on the difference between the first oxygen amount and the second oxygen amount and corrects a parameter relating to the air-fuel ratio based on the updated learning value so that the difference between the first oxygen amount and the second oxygen amount becomes smaller when the blow-through amount is the reference blow-through amount or less and, without updating the learning value, corrects the parameter based on the current learning value when the blow-through amount is greater than the reference blow-through amount in any one of the third to eighth inventions.

Advantageous Effects of Invention

According to the present invention, there is provided an internal combustion engine which can suppress deterioration of the exhaust emissions which accompanies occurrence of scavenging.

DESCRIPTION OF EMBODIMENTS

Figure 1:
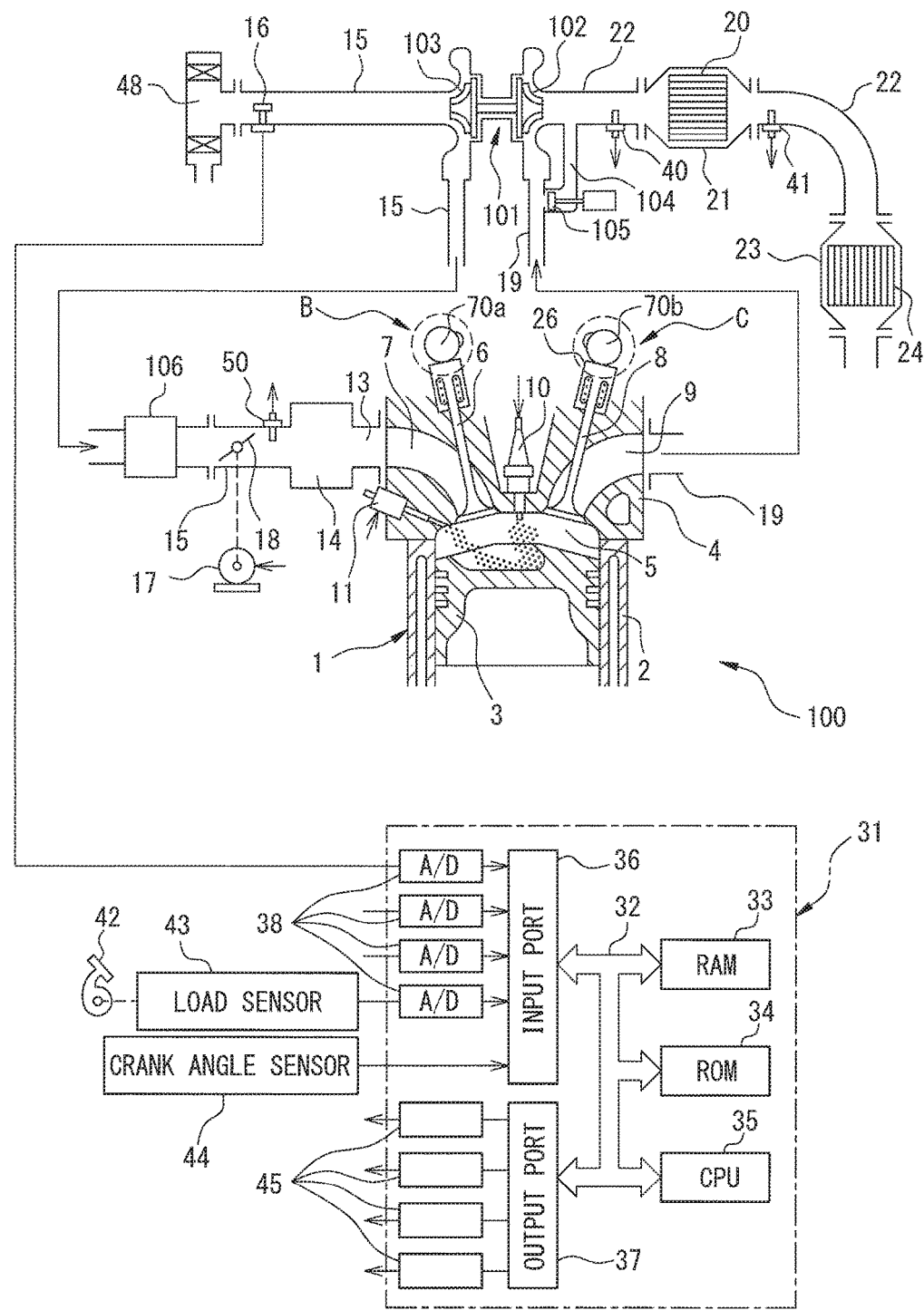
FIG. 1 is a schematic view of an internal combustion engine in a first embodiment of the present invention.

Below, referring to the drawings, embodiments of the present invention will be explained in detail. Note that, in the following explanation, similar component elements are assigned the same reference notations.

<First Embodiment>

First, referring to FIG. 1 to FIG. 13, a first embodiment of the present invention will be explained.

<Explanation of Internal Combustion Engine as a Whole>

FIG. 1 is a schematic view of an internal combustion engine 100 in a first embodiment of the present invention. The internal combustion engine 100 is provided with an engine body 1 which contains a cylinder block 2 and a cylinder head 4. At the inside of the cylinder block 2, pistons 3 which reciprocate at the inside of the cylinder block 2 are arranged. The internal combustion engine 100 has a plurality of cylinders.

A combustion chamber 5 is formed for each cylinder between the piston 3 and the cylinder head 4. The cylinder head 4 is formed with intake ports 7 and exhaust ports 9. The intake ports 7 and exhaust ports 9 are connected to the combustion chambers 5. An intake valve 6 is arranged at an end part of each intake port 7 and is formed to be able to open and close the intake port 7. An exhaust valve 8 is arranged at an end part of each exhaust port 9 and is formed to be able to open and close the exhaust port 9. Further, the internal combustion engine 100 is provided with a variable valve timing mechanism B which can control the opening timing and the closing timing of each intake valve 6 and a variable valve timing mechanism C which can control the opening timing and the closing timing of each exhaust valve 8.

The internal combustion engine 100 is comprised of fuel injectors 11 for feeding fuel to the combustion chambers 5 and spark plugs 10 for igniting the air-fuel mixture at the combustion chambers 5. The spark plugs 10 are fastened to the cylinder head 4. The fuel injectors 11 are arranged at the circumferential parts of the inner wall surfaces in the cylinder head 4 so as to directly inject fuel into the combustion chambers 5. That is, the internal combustion engine 100 is a cylinder injection type of internal combustion engine. Further, the internal combustion engine 100 uses fuel constituted by gasoline which has a stoichiometric air-fuel ratio of 14.6. However, in the internal combustion engine 100, other fuel may also be used.

The internal combustion engine 100 is provided with a supercharger constituted by a turbocharger 101. The turbocharger 101 includes a turbine 102 which is arranged in the exhaust passage, a compressor 103 which is arranged in the intake passage, and a shaft which connects the turbine 102 and the compressor 103. If the flow of exhaust causes the turbine 102 to turn, the compressor 103 also turns and raises the pressure of the intake air. Therefore, the turbocharger 101 uses the energy of the exhaust gas to compress the intake air to increase the intake air amount.

The intake port 7 of each cylinder is connected through a corresponding intake runner 13 to a surge tank 14. The surge tank 14 is connected through an intake pipe 15 to an outlet part of the compressor 103 of the turbocharger 101. At the inside of the intake pipe 15 which connects the surge tank 14 and compressor 103, a throttle valve 18 which is driven by a throttle valve drive actuator 17 is arranged. The throttle valve 18 can change the opening area of the intake passage by being turned by the throttle valve drive actuator 17. Further, in the intake pipe 15 between the compressor 103 and throttle valve 18, a cooler (intercooler) 106 which cools the intake air which is compressed by the turbocharger 101 is arranged.

An inlet part of the compressor 103 is connected through the intake pipe 15 to an air cleaner 48. At the inside of the intake pipe 15 between the air cleaner 48 and compressor 103, an air flowmeter 16 which detects the amount of intake air is arranged. An intake port 7, intake runner 13, intake pipe 15, etc. define an intake passage which guides air to the combustion chamber 5.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to the inlet part of the turbine 102 of the turbocharger 101. The outlet part of the turbine 102 is connected through an exhaust pipe 22 to an upstream side casing 21. The upstream side casing 21 has an upstream side exhaust purification catalyst 20 built into it. The upstream side casing 21 is connected through the exhaust pipe 22 to a downstream side casing 23. The downstream side casing 23 has a downstream side exhaust purification catalyst 24 built into it. An exhaust port 9, exhaust manifold 19, exhaust pipe 22, etc. define an exhaust passage which discharges the exhaust gas which is produced due to combustion of the air-fuel mixture from a combustion chamber 5.

Further, inside the exhaust pipe 22 between the turbine 102 and the upstream side casing 21, an upstream side air-fuel ratio sensor 40 which detects the air-fuel ratio of the exhaust gas which flows through the inside of the exhaust pipe 22 (that is, the exhaust gas which flows into the upstream side exhaust purification catalyst 20) is arranged. Furthermore, inside the exhaust pipe 22 between the upstream side casing 21 and the downstream side casing 23, a downstream side air-fuel ratio sensor 41 which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24) is arranged.

Between the exhaust manifold 19 upstream of the turbine 102 and the exhaust pipe 22 downstream of the turbine 102, a bypass passage 104 which bypasses the turbine 102 is arranged. At the bypass passage 104, a bypass valve which opens and closes the bypass passage 104 constituted by a wastegate valve 105 is arranged. By adjusting the opening degree of the wastegate valve 105, the amount of exhaust gas which runs through the turbine 102 can be adjusted. Therefore, by controlling the wastegate valve 105, the pressure of the intake air (supercharging pressure) can be controlled. Note that, the supercharging pressure control means which is used to control the supercharging pressure may be any mechanism besides a wastegate valve 105.

The internal combustion engine 100 is provided with a pressure acquiring means for acquiring the supercharging pressure. The pressure acquiring means is for example a supercharging pressure sensor 50. The supercharging pressure sensor 50 is arranged in the intake passage at the downstream side from the throttle valve 18. Note that, the supercharging pressure is estimated from the operating state etc. of the internal combustion engine 100.

The internal combustion engine 100 is provided with an electronic control unit 31 (ECU) which is comprised of a digital computer. The ECU 31 includes components which are connected with each other through bidirectional buses 32, such as a RAM (random access memory) 33, ROM (read only memory) 34, CPU (microprocessor) 35, input port 36, and output port 37.

The output signal of the air flowmeter 16 is input through a corresponding AD converter 38 to the input port 36. The internal combustion engine 100 is provided with an accelerator pedal 42. The accelerator pedal 42 has a load sensor 43 connected to it. The load sensor 43 generates an output voltage which is proportional to the amount of depression of the accelerator pedal 42. The output voltage of the load sensor 43 is input through a corresponding AD converter 38 to the input port 36.

The internal combustion engine 100 is provided with a crank angle sensor 44. The crank angle sensor 44 for example generates an output pulse every time the crankshaft rotates by a predetermined angle. This output pulse is input to the input port 36. In the CPU 35, the engine speed is calculated from the output pulse of this crank angle sensor 44. Further, the output of the crank angle sensor 44 can be used to detect the crank angle. The outputs of the supercharging pressure sensor 50 and air-fuel ratio sensors 40 and 41 are respectively input through corresponding AD converters 38 to the input port 36.

The output port 37 of the ECU 31 is connected through corresponding drive circuits 45 to the spark plugs 10, fuel injectors 11, throttle valve drive actuator 17, wastegate valve 105, and variable valve timing mechanisms B and C. The ECU 31 can control the ignition timings of the spark plugs 10, the fuel injection timings and fuel injection amounts of the fuel injectors 11, the opening degree of the throttle valve 18, the opening degree of the wastegate valve 105, the opening timings and the closing timings of the intake valves 6, and the opening timings and the closing timings of the exhaust valves 8.

<Explanation of Variable Valve Timing Mechanism>

Figure 2:
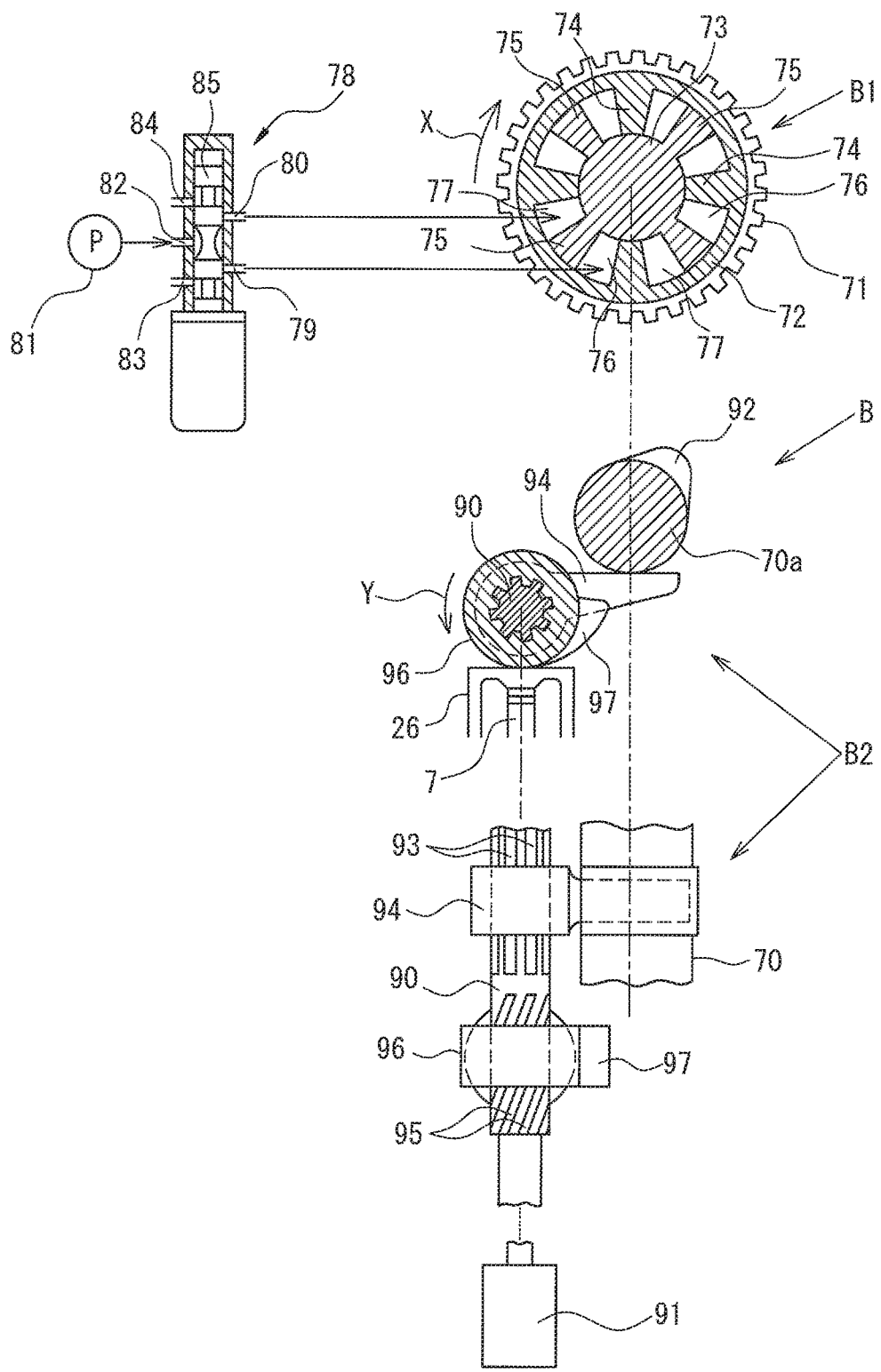
FIG. 2 is a view which shows a variable valve timing mechanism.

FIG. 2 shows the variable valve timing mechanism B which is provided at a camshaft 70a so as to drive the intake valve 6 in FIG. 1. As shown in FIG. 2, the variable valve timing mechanism B is comprised of a cam phase changing part B1 which is attached to one end of the camshaft 70a and changes the phase of the cam of the camshaft 70a and a cam operating angle changing part B2 which is arranged between the camshaft 70a and a valve lifter 26 of the intake valve 6 and changes the operating angle of the cam of the camshaft 70a to a different operating angle. Note that, the cam operating angle changing part B2 is shown by a side cross-sectional view and plan view in FIG. 2.

First, explaining the cam phase changing part B1 of the variable valve timing mechanism B will be explained. This cam phase changing part B1 is provided with a timing pulley 71 which can be made to rotate in the arrow direction through a timing belt by a crankshaft of the engine, a cylindrical housing 72 which rotates together with the timing pulley 71, a shaft 73 which can rotate together with the camshaft 70a and can rotate relative to the cylindrical housing 72, a plurality of partition walls 74 which extend from the inner circumferential surface of the cylindrical housing 72 to the outer circumferential surface of the shaft 73, and vanes 75 which extend between the partition walls 74 from the outer circumferential surface of the shaft 73 to the inner circumferential surface of the cylindrical housing 72. At the both sides of the vanes 75, advancing use hydraulic chambers 76 and retarding use hydraulic chambers 77 are formed.

The control for feeding hydraulic fluid to the hydraulic chambers 76 and 77 is performed by a hydraulic fluid feed control valve 78. This hydraulic fluid feed control valve 78 is provided with hydraulic ports 79 and 80 which are connected to the hydraulic chambers 76 and 77, a feed port 82 of hydraulic fluid which is discharged from the hydraulic pump 81, a pair of drain ports 83 and 84, and a spool valve 85 which performs control for opening and closing the ports 79, 80, 82, 83, and 84.

When making the phase of the cam of the camshaft 70a advance, in FIG. 2, the spool valve 85 is made to move downward, the hydraulic fluid which is fed from the feed port 82 is fed through the hydraulic port 79 to the advancing use hydraulic chamber 76, and hydraulic fluid in the retarding use hydraulic chamber 77 is discharged from the drain port 84. At this time, the shaft 73 is made to rotate relative to the cylindrical housing 72 in the arrow X-direction.

As opposed to this, when the phase of the cam of the camshaft 70a should be retarded, in FIG. 2, the spool valve 85 is made to move upward. Hydraulic fluid which is fed from the feed port 82 is fed through the hydraulic port 80 to the retarding use hydraulic chamber 77 and hydraulic fluid in the advancing use hydraulic chamber 76 is discharged from the drain port 83. At this time, the shaft 73 is made to rotate relative to the cylindrical housing 72 in a direction opposite to the arrow X.

Figure 3A:
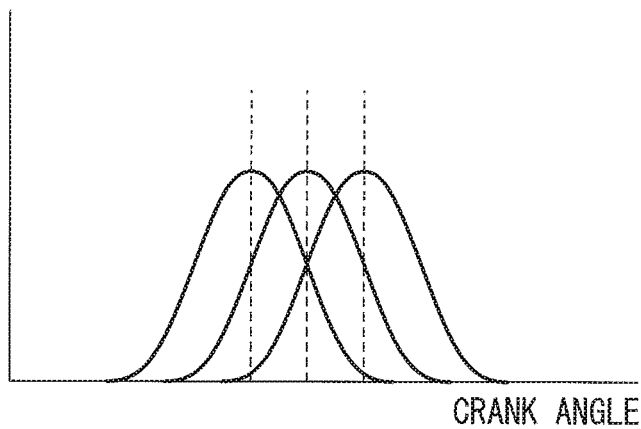
FIGS. 3A and 3B are views which show amounts of lift of an intake valve and exhaust valve.

When the shaft 73 is made to rotate relative to the cylindrical housing 72, if the spool valve 85 is returned to the neutral position which is shown in FIG. 2, the relative rotating operation of the shaft 73 is made to stop. The shaft 73 is held at the relative rotation position at that time. Therefore, the cam phase changing part B1 can be used to advance or retard the phase of the cam of the camshaft 70a by exactly the desired amount. That is, as shown in FIG. 3A by the broken line, the cam phase changing part B1 can be used to make the phase angle of the intake valve 6 advance or be retarded in any way. Note that, when changing only the phase of the cam, as shown in FIG. 3A, the operating angle does not change. Note that, in this Description, the "phase angle" means the center angle of the operating angle.

Next, the cam operating angle changing part B2 of the variable valve timing mechanism B will be explained. This cam operating angle changing part B2 is provided with a control rod 90 which is arranged in parallel with the camshaft 70a and which is made to move in the axial direction by the actuator 91, an intermediate cam 94 which is engaged with the cam 92 of the camshaft 70a and which is made to slidably engage with a spline 93 which is formed on the control rod 90 and extends in the axial direction, and a rocking cam 96 which engages with the valve lifter 26 for driving the intake valve 6 and which slidably engages with the spline 95 which is formed on the control rod 90 and extends in a spiral manner. A cam 97 is formed on the rocking cam 96.

If the camshaft 70a rotates, the cam 92 causes the intermediate cam 94 to constantly rock by exactly a certain angle. At this time, the rocking cam 96 is also made to rock by a certain angle. On the other hand, the intermediate cam 94 and rocking cam 96 are supported to be unable to move in the axial direction of the control rod 90. Therefore, when the control rod 90 is made to move in the axial direction by the actuator 91, the rocking cam 96 is made to rotate relative to the intermediate cam 94.

Figure 3B:
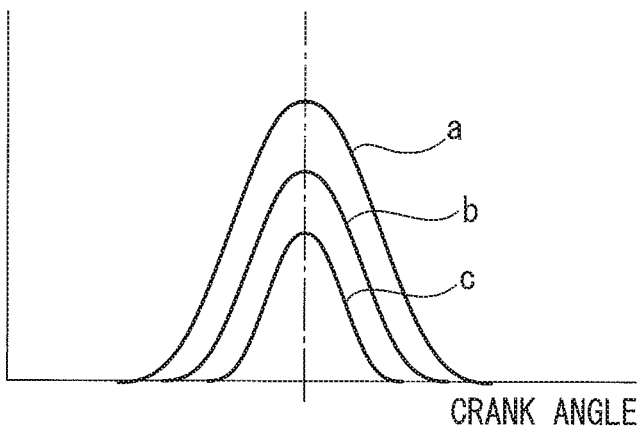

When, due to the positional relationship in relative rotation of the intermediate cam 94 and the rocking cam 96, the cam 92 of the camshaft 70a starts to engage with the intermediate cam 94 and the cam 97 of the rocking cam 96 starts to engage with the valve lifter 26, as shown in FIG. 3B by "a", the operating angle and amount of lift of the intake valve 6 become largest. As opposed to this, if using the actuator 91 to make the rocking cam 96 rotate relative to the intermediate cam 94 in the arrow Y-direction of FIG. 2, the cam 92 of the camshaft 70a engages with the intermediate cam 94, then after a while, the cam 97 of the rocking cam 96 engages with the valve lifter 26. In this case, as shown in FIG. 3B by "b", the operating angle and amount of lift of the intake valve 6 become smaller compared with "a".

If the rocking cam 96 is made to further rotate relative to the intermediate cam 94 in the arrow Y-direction of FIG. 2, as shown in FIG. 3B by "c", the operating angle and amount of lift of the intake valve 6 become further smaller. That is, by using the actuator 91 to change the relative rotational positions of the intermediate cam 94 and the rocking cam 96, it is possible to change the operating angle of the intake valve 6 in any way. However, in this case, the amount of lift of the intake valve 6 becomes smaller the shorter the operating angle of the intake valve 6.

In this way, it is possible to use the cam phase changing part B1 to change the phase angle of the intake valve 6 in any way and possible to use the cam operating angle changing part B2 to change the operating angle of the intake valve 6 in any way. Therefore, the variable valve timing mechanism B which has the cam phase changing part B1 and the cam operating angle changing part B2 can be used to freely change the phase angle and operating angle of the intake valve 6, that is, the opening timing and the closing timing of the intake valve 6.

Note that, the variable valve timing mechanism B which is shown in FIG. 1 and FIG. 2 is one example. Various types of variable valve timing mechanisms other than the example shown in FIG. 1 and FIG. 2 can be used. Further, the variable valve timing mechanism C of the exhaust valve 8 also has a similar configuration as the variable valve timing mechanism B of the intake valve 6 and can freely change the phase angle and operating angle of the exhaust valve 8, that is, the opening timing and the closing timing of the exhaust valve 8. Therefore, in the internal combustion engine 100, at least one of the variable valve timing mechanisms B and C can be controlled to freely change the amount of valve overlap where the open period of the intake valve 6 and the open period of the exhaust valve 8 partially overlap.

<Explanation of Exhaust Purification Catalyst>

The upstream side exhaust purification catalyst 20 and downstream side exhaust purification catalyst 24 have similar configurations. The exhaust purification catalysts 20 and 24 are three-way catalysts which have oxygen storage abilities. Specifically, the exhaust purification catalysts 20 and 24 are comprised of carriers which are comprised of ceramic on which a precious metal which has a catalytic action (for example, platinum (Pt)) and a substance which has an oxygen storage ability (for example, ceria ($CeO_2$)) are carried. The exhaust purification catalysts 20 and 24 exhibit a catalytic action of simultaneously removing unburned gas (HC, CO, etc.) and nitrogen oxides ($NO_X$) when reaching a predetermined activation temperature and, in addition, an oxygen storage ability.

According to the oxygen storage ability of the exhaust purification catalysts 20 and 24, the exhaust purification catalysts 20 and 24 store the oxygen in the exhaust gas when the air-fuel ratio of the exhaust gas which flows into the exhaust purification catalysts 20 and 24 is leaner than the stoichiometric air-fuel ratio (lean air-fuel ratio). On the other hand, the exhaust purification catalysts 20 and 24 release the oxygen which is stored in the exhaust purification catalysts 20 and 24 when the inflowing exhaust gas has an air-fuel ratio which is richer than the stoichiometric air-fuel ratio (rich air-fuel ratio).

Figure 4A:
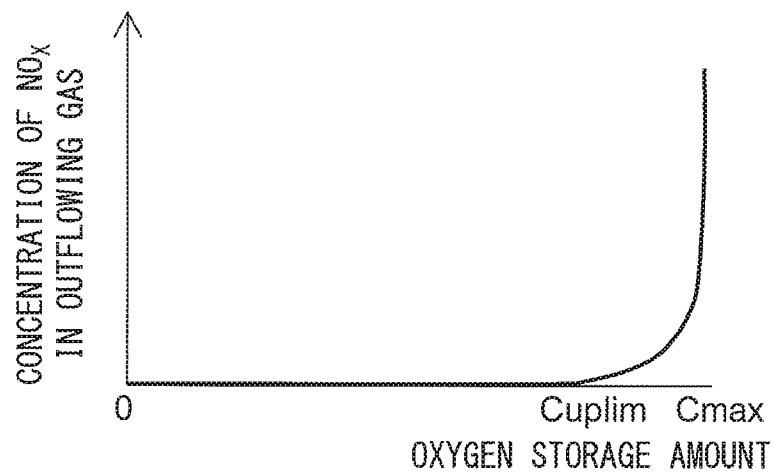
FIGS. 4A and 4B are views which shows relationships of an oxygen storage amount of an exhaust purification catalyst and an $NO_X$ concentration or HC, CO concentration in exhaust gas which flows out from the exhaust purification catalyst.

The exhaust purification catalysts 20 and 24 have a catalytic action and oxygen storage ability and thereby have the action of removing $NO_X$ and unburned gas according to the stored amount of oxygen. That is, as shown in FIG. 4A, if the air-fuel ratio of the exhaust gas which flows into the exhaust purification catalysts 20 and 24 is a lean air-fuel ratio, when the stored amount of oxygen is small, the exhaust purification catalysts 20 and 24 store the oxygen in the exhaust gas. Further, along with this, the $NO_X$ in the exhaust gas is removed by reduction. Further, if the stored amount of oxygen becomes larger, the exhaust gas which flows out from the exhaust purification catalysts 20 and 24 rapidly rises in concentration of oxygen and $NO_X$ at a certain stored amount near the maximum storable oxygen amount Cmax (in the figure, Cuplim).

Figure 4B:
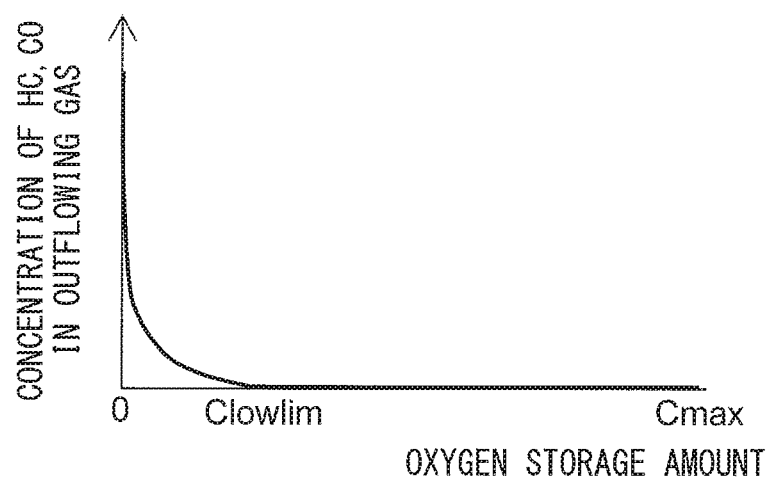

On the other hand, as shown in FIG. 4B, if the air-fuel ratio of the exhaust gas which flows into the exhaust purification catalysts 20 and 24 is the rich air-fuel ratio, when the stored amount of oxygen is large, the oxygen which is stored in the exhaust purification catalysts 20 and 24 is released, and the unburned gas in the exhaust gas is removed by oxidation. Further, if the stored amount of oxygen becomes small, the exhaust gas which flows out from the exhaust purification catalysts 20 and 24 rapidly rises in concentration of unburned gas at a certain stored amount near zero (in the figure, Clowlim).

In the above way, according to the exhaust purification catalysts 20 and 24 which are used in the present embodiment, the characteristics of removal of $NO_X$ and unburned gas in the exhaust gas change depending on the air-fuel ratio of the exhaust gas which flows into the exhaust purification catalysts 20 and 24 and stored amount of oxygen. Note that, if having a catalytic action and oxygen storage ability, the exhaust purification catalysts 20 and 24 may also be catalysts different from the three-way catalyst.

<Configuration of Air-Fuel Ratio Sensor>

Figure 5:
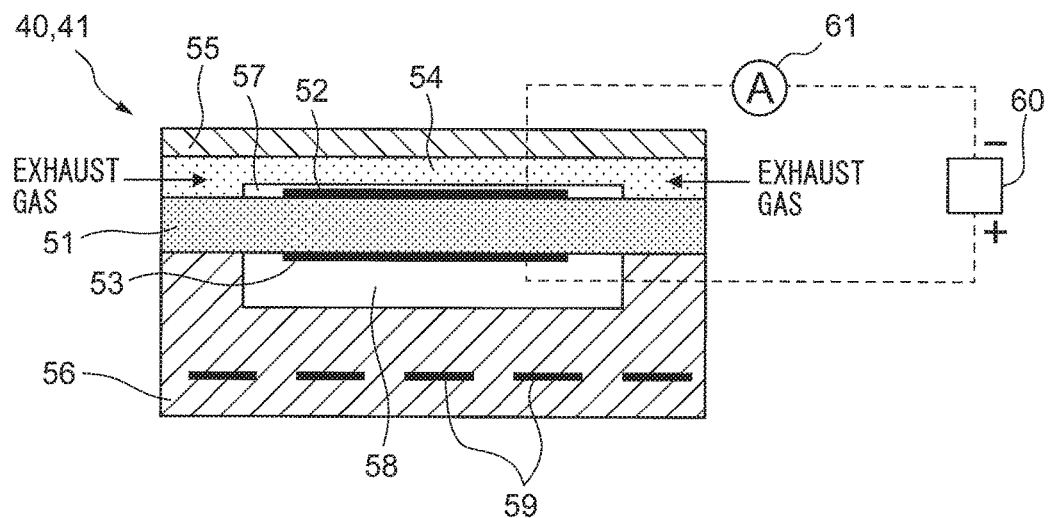
FIG. 5 is a schematic cross-sectional view of an air-fuel ratio sensor.

Next, referring to FIG. 5, the configurations of air-fuel ratio sensors 40 and 41 in the present embodiment will be explained. FIG. 5 is a schematic cross-sectional view of air-fuel ratio sensors 40 and 41. As will be understood from FIG. 5, the air-fuel ratio sensors 40 and 41 in the present embodiment are single-cell type air-fuel ratio sensors each comprised of a solid electrolyte layer and a pair of electrodes forming a single cell.

As shown in FIG. 5, each of the air-fuel ratio sensors 40 and 41 is provided with a solid electrolyte layer 51, an exhaust side electrode (first electrode) 52 which is arranged at one side surface of the solid electrolyte layer 51, an atmosphere side electrode (second electrode) 53 which is arranged at the other side surface of the solid electrolyte layer 51, a diffusion regulation layer 54 which regulates the diffusion of the passing exhaust gas, a protective layer 55 which protects the diffusion regulation layer 54, and a heater part 56 which heats the air-fuel ratio sensor 40 or 41.

On one side surface of the solid electrolyte layer 51, the diffusion regulation layer 54 is provided. On the side surface of the diffusion regulation layer 54 at the opposite side from the side surface of the solid electrolyte layer 51 side, a protective layer 55 is provided. In the present embodiment, a measured gas chamber 57 is formed between the solid electrolyte layer 51 and the diffusion regulation layer 54. In this measured gas chamber 57, the gas to be detected by the air-fuel ratio sensors 40 and 41, that is, the exhaust gas, is introduced through the diffusion regulation layer 54. Further, the exhaust side electrode 52 is arranged inside the measured gas chamber 57, therefore, the exhaust side electrode 52 is exposed to the exhaust gas through the diffusion regulation layer 54. Note that, the measured gas chamber 57 does not necessarily have to be provided. The diffusion regulation layer 54 may directly contact the surface of the exhaust side electrode 52.

On the other side surface of the solid electrolyte layer 51, the heater part 56 is provided. Between the solid electrolyte layer 51 and the heater part 56, a reference gas chamber 58 is formed. Inside this reference gas chamber 58, a reference gas is introduced. In the present embodiment, the reference gas chamber 58 is open to the atmosphere. Therefore, inside the reference gas chamber 58, the atmosphere is introduced as the reference gas. The atmosphere side electrode 53 is arranged inside the reference gas chamber 58, therefore, the atmosphere side electrode 53 is exposed to the reference gas (reference atmosphere).

The heater part 56 is provided with a plurality of heaters 59. These heaters 59 can be used to control the temperature of the air-fuel ratio sensor 40 or 41, in particular, the temperature of the solid electrolyte layers 51. The heater part 56 has a sufficient heat generation capacity for heating the solid electrolyte layer 51 until activating it.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc. is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 are formed by platinum or other precious metal with a high catalytic activity.

Further, between the exhaust side electrode 52 and the atmosphere side electrode 53, sensor voltage Vr is supplied by the voltage supply device 60 which is mounted on the ECU 31. In addition, the ECU 31 is provided with a current detection device 61 which detects the current which flows between these electrodes 52 and 53 through the solid electrolyte layer 51 when the voltage supply device 60 supplies the sensor voltage Vr. The current which is detected by this current detection device 61 is the output current of the air-fuel ratio sensors 40 and 41.

Figure 6:
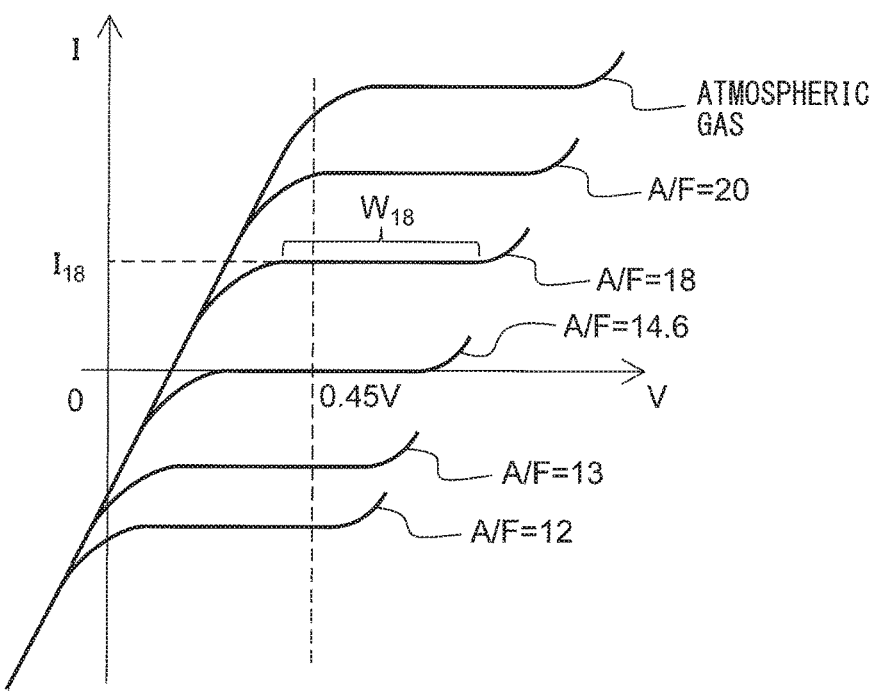
FIG. 6 is a view which shows a relationship between a sensor applied voltage and output current at different exhaust air-fuel ratios.

The thus configured air-fuel ratio sensors 40 and 41 have the voltage-current (V-I) characteristic such as shown in FIG. 6. As will be understood from FIG. 6, the output current I becomes larger the higher the exhaust air-fuel ratio (the leaner). Further, at the line V-I of each exhaust air-fuel ratio, there is a region parallel to the V axis, that is, a region where the output current does not change much at all even if the sensor voltage changes. This voltage region is called the "limit current region". The current at this time is called the "limit current". In FIG. 6, the limit current region and limit current when the exhaust air-fuel ratio is 18 are shown by $W_{18}$ and $I_{18}$.

Figure 7:
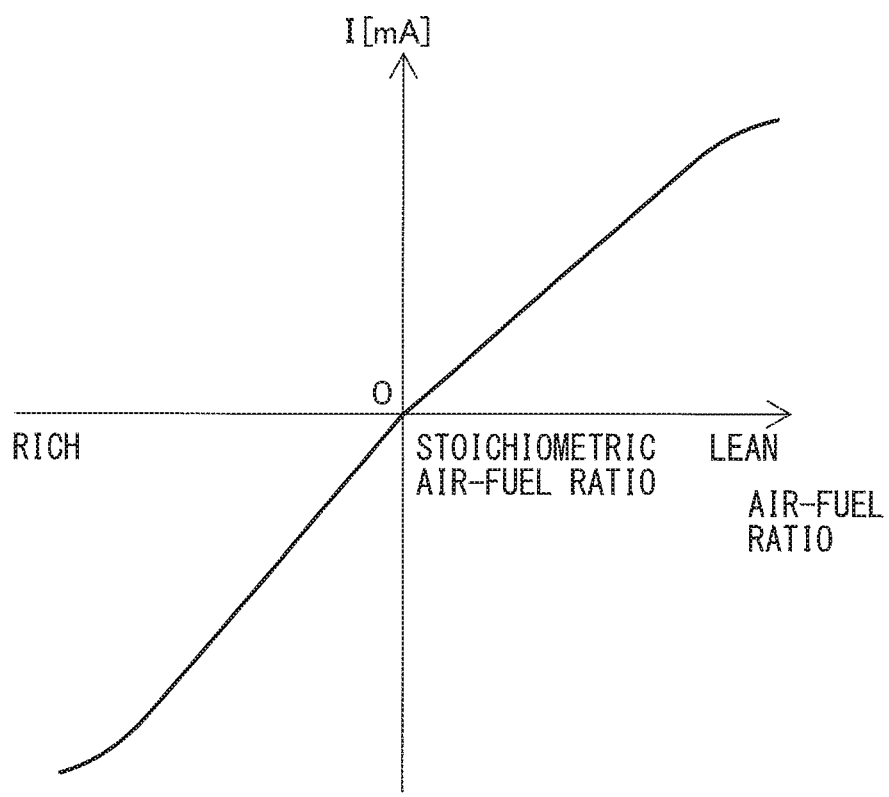
FIG. 7 is a view which shows a relationship of an exhaust air-fuel ratio and output current when making the sensor applied voltage constant.

FIG. 7 is a view which shows the relationship between the exhaust air-fuel ratio and the output current I when making the supplied voltage constant at about 0.45V. As will be understood from FIG. 7, in the air-fuel ratio sensors 40 and 41, the higher the exhaust air-fuel ratio (that is, the leaner), the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio. Accordingly, the air-fuel ratio sensors 40 and 41 can continuously (linearly) detect the exhaust air-fuel ratio. Further, when the exhaust air-fuel ratio becomes larger by a certain extent or more or when it becomes smaller by a certain extent or more, the ratio of change of the output current to the change of the exhaust air-fuel ratio becomes smaller.

In the above example, as the air-fuel ratio sensors 40 and 41, limit current type air-fuel ratio sensors of the structure which is shown in FIG. 5 are used. However, as the air-fuel ratio sensors 40 and 41, for example, it is also possible to use a cup-type limit current type air-fuel ratio sensor or other structure of limit current type air-fuel ratio sensor or air-fuel ratio sensor not a limit current type or any other air-fuel ratio sensor.

<Basic Air Fuel Ratio Control>

Next, an outline of the basic air-fuel ratio control in a control device of an internal combustion engine of the present invention will be explained. In an air-fuel control of the present embodiment, feedback control is performed based on the output air-fuel ratio of the upstream side air-fuel ratio sensor 40 to control the fuel injection amount from the fuel injector 11 so that the output air-fuel ratio of the upstream side air-fuel ratio sensor 40 becomes the target air-fuel ratio. Note that, the "output air-fuel ratio" means the air-fuel ratio which corresponds to the output value of the air-fuel ratio sensor.

On the other hand, in the present embodiment, control for setting the target air-fuel ratio is performed based on the output current of the downstream side air-fuel ratio sensor 41 etc. In the control for setting the target air-fuel ratio, when the output current of the downstream side air-fuel ratio sensor 41 becomes a rich air-fuel ratio, the target air-fuel ratio is made a lean set air-fuel ratio. After this, it is maintained at this air-fuel ratio. In this regard, the "lean set air-fuel ratio" is a predetermined air-fuel ratio which is leaner than the stoichiometric air-fuel ratio (air-fuel ratio serving as center of control) by a certain extent, and, for example, is 14.65 to 20, preferably 14.65 to 18, more preferably 14.65 to 16 or so. Further, the lean set air-fuel ratio can be expressed as an air-fuel ratio of the air-fuel ratio forming the center of control (in the present embodiment, stoichiometric air-fuel ratio) plus a lean correction amount. Further, in the present embodiment, when the output air-fuel ratio of the downstream side air-fuel ratio sensor 41 becomes a rich judged air-fuel ratio (for example, 14.55), which is slightly richer than the stoichiometric air-fuel ratio, or less, it is judged that the output air-fuel ratio of the downstream side air-fuel ratio sensor 41 has become the rich air-fuel ratio.

If the target air-fuel ratio is changed to the lean set air-fuel ratio, the oxygen excess/deficiency of the exhaust gas which flows into the upstream side exhaust purification catalyst 20 (below, referred to simply as the "inflowing exhaust gas") is cumulatively added. The "oxygen excess/deficiency" means the oxygen which becomes excessive or the oxygen which becomes deficient (amount of excess unburned gas etc.) when trying to make the air-fuel ratio of the inflowing exhaust gas the stoichiometric air-fuel ratio. In particular, when the target air-fuel ratio is the lean set air-fuel ratio, the inflowing exhaust gas becomes excessive in oxygen. This excess oxygen is stored in the upstream side exhaust purification catalyst 20. Therefore, the cumulative value of the oxygen excess/deficiency (below, referred to as the "cumulative oxygen excess/deficiency") can be the to express the estimated value of the stored amount of oxygen of the upstream side exhaust purification catalyst 20.

The oxygen excess/deficiency OED is, for example, calculated by the following formula (1):

$$ODE=0.23 \times (AFup-AFR) \times Qi \quad (1)$$

where 0.23 indicates the concentration of oxygen in the air, Qi indicates the amount of fuel injection, AFup indicates the output air-fuel ratio of the upstream side air-fuel ratio sensor 40, and AFR indicates the air-fuel ratio forming the center of control (in the present embodiment, stoichiometric air-fuel ratio (14.6)).

If the cumulative oxygen excess/deficiency which was obtained by cumulatively adding the oxygen excess/deficiency which was calculated in this way becomes a predetermined switching reference value (corresponding to a predetermined switching reference storage amount Cref) or more, the target air-fuel ratio which had up to then been the lean set air-fuel ratio is made the rich set air-fuel ratio and after that is maintained at that air-fuel ratio. The rich set air-fuel ratio is a predetermined air-fuel ratio which is richer than the stoichiometric air-fuel ratio (air-fuel ratio forming center of control) by a certain extent. For example, it is made 12 to 14.58, preferably 13 to 14.57, more preferably 14 to 14.55 or so. Further, the rich set air-fuel ratio can be expressed as an air-fuel ratio of the air-fuel ratio forming the center of control (in the present embodiment, stoichiometric air-fuel ratio) minus a rich correction amount. Note that, in the present embodiment, the difference of the rich set air-fuel ratio from the stoichiometric air-fuel ratio (rich degree) is made the difference of the lean set air-fuel ratio from the stoichiometric air-fuel ratio (lean degree) or less.

After that, when the output air-fuel ratio of the downstream side air-fuel ratio sensor 41 again becomes the rich judged air-fuel ratio or less, the target air-fuel ratio is again made the lean set air-fuel ratio. After that, a similar operation is repeated. In this way, in the present embodiment, the target air-fuel ratio of inflowing exhaust gas is alternately set to the lean set air-fuel ratio and the rich set air-fuel ratio.

However, even if performing the above-mentioned such control, sometimes the actual oxygen storage amount of the upstream side exhaust purification catalyst 20 reaches the maximum storable oxygen amount before the cumulative oxygen excess/deficiency reaches the switching reference value. As the reason for this, for example, the maximum storable oxygen amount of the upstream side exhaust purification catalyst 20 falling and the air-fuel ratio of the inflowing exhaust gas temporarily suddenly changing may be mentioned. If the oxygen storage amount reaches the maximum storable oxygen amount in this way, exhaust gas of the lean air-fuel ratio flows out from the upstream side exhaust purification catalyst 20. Therefore, in the present embodiment, when the output air-fuel ratio of the downstream side air-fuel ratio sensor 41 becomes the lean air-fuel ratio before the cumulative oxygen excess/deficiency reaches the switching reference value, the target air-fuel ratio is switched to the rich set air-fuel ratio when the output air-fuel ratio of the downstream side air-fuel ratio sensor 41 becomes the lean air-fuel ratio. In particular, in the present embodiment, when the output air-fuel ratio of the downstream side air-fuel ratio sensor 41 becomes a lean judged air-fuel ratio which is slightly leaner than the stoichiometric air-fuel ratio (for example, 14.65) or more, it is judged that the output air-fuel ratio of the downstream side air-fuel ratio sensor 41 has become a lean air-fuel ratio.

<Explanation of Air-Fuel Ratio Control Using Time Chart>

Figure 8:
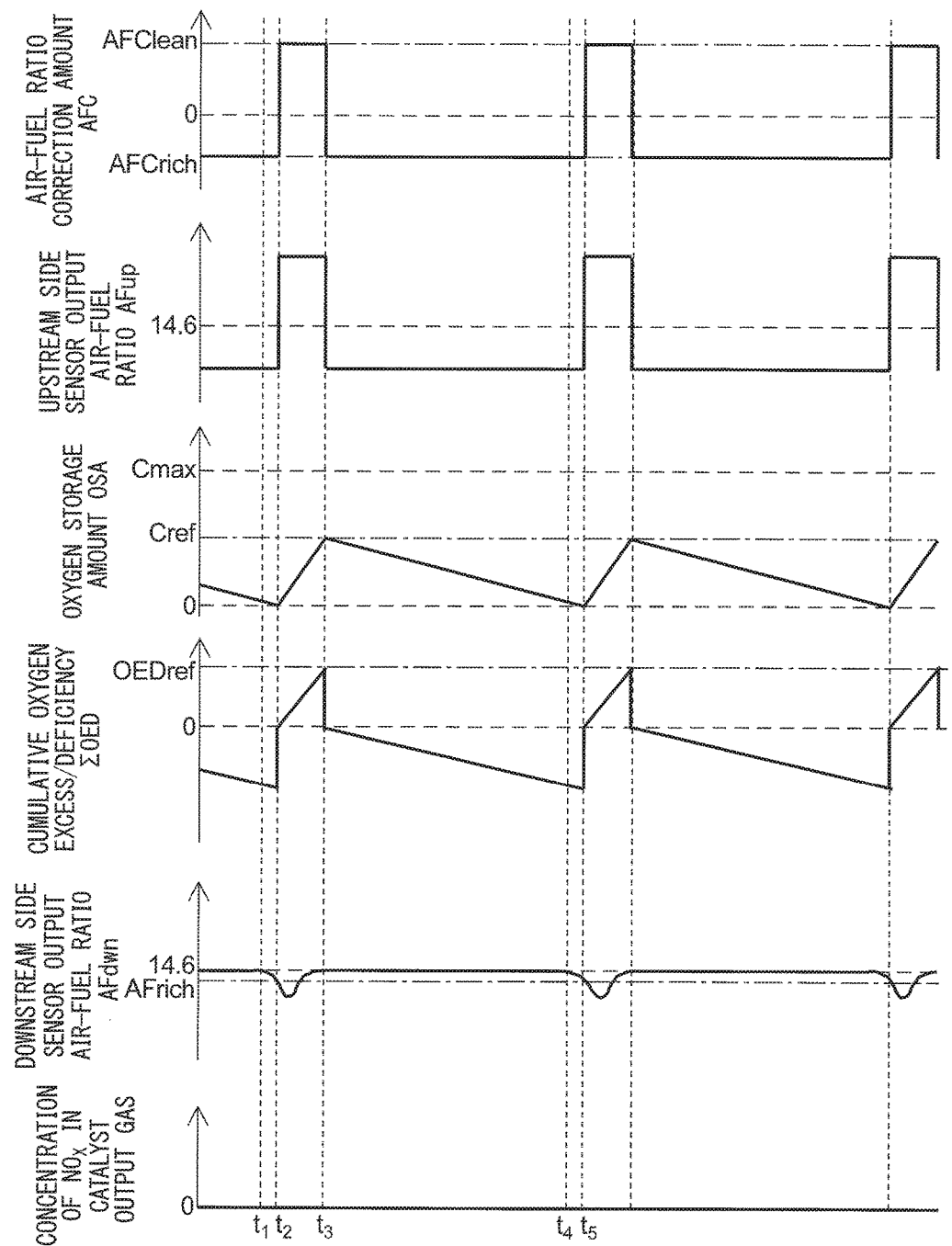
FIG. 8 is a time chart of an air-fuel ratio correction amount etc. relating to a target air-fuel ratio.

Referring to FIG. 8, the above-mentioned such operation will be explained in detail. FIG. 8 is a time chart of the air-fuel ratio correction amount AFC, output air-fuel ratio AFup of the upstream side air-fuel ratio sensor 40, oxygen storage amount OSA of the upstream side exhaust purification catalyst 20, cumulative oxygen excess/deficiency ΣOED, output air-fuel ratio AFdwn of the downstream side air-fuel ratio sensor 41, and concentration of $NO_X$ in the exhaust gas which flows out from the upstream side exhaust purification catalyst 20 (below, referred to simply as the "outflowing exhaust gas") when performing the air-fuel ratio control of the present embodiment.

The cumulative oxygen excess/deficiency ΣOED which is shown in FIG. 8 shows the cumulative value of the oxygen excess/deficiency OED which is calculated by the above formula (1). The cumulative oxygen excess/deficiency ΣOED is reset and made zero when the target air-fuel ratio is switched between the rich set air-fuel ratio TAFrich and the lean set air-fuel ratio TAFlean.

Note that the air-fuel ratio correction amount AFC is a correction amount relating to the target air-fuel ratio of the inflowing exhaust gas. When the air-fuel ratio correction amount AFC is 0, the target air-fuel ratio is set to an air-fuel ratio which is equal to the air-fuel ratio serving as the control center (below, referred to as the "control center air-fuel ratio") (in the present embodiment, the stoichiometric air-fuel ratio). When the air-fuel ratio correction amount AFC is a positive value, the target air-fuel ratio becomes an air-fuel ratio leaner than the control center air-fuel ratio (in the present embodiment, a lean air-fuel ratio), while when the air-fuel ratio correction amount AFC is a negative value, the target air-fuel ratio becomes an air-fuel ratio richer than the control center air-fuel ratio (in the present embodiment, a rich air-fuel ratio). Further, the "control center air-fuel ratio" means the air-fuel ratio to which of the air-fuel ratio correction amount AFC is added in accordance with the engine operating state, that is, the air-fuel ratio which is the reference when changing the target air-fuel ratio in accordance with the air-fuel ratio correction amount AFC.

In the illustrated example, in the state before the time $t_1$, the air-fuel ratio correction amount AFC is made the rich set correction amount AFCrich (corresponding to the rich set air-fuel ratio). That is, the target air-fuel ratio is made the rich air-fuel ratio. Along with this, the output air-fuel ratio of the upstream side air-fuel ratio sensor 40 becomes a rich air-fuel ratio. The unburned gas contained in the inflowing exhaust gas is purified in the upstream side exhaust purification catalyst 20. Further, along with this, oxygen storage amount OSA of the upstream side exhaust purification catalyst 20 is gradually decreased.

Accordingly, the cumulative oxygen excess/deficiency ΣOED is also gradually decreased. Further, the unburned gas is not contained in the outflowing exhaust gas due to the purification at the upstream side exhaust purification catalyst 20, so the output air-fuel ratio AFdwn of the downstream side air-fuel ratio sensor 41 becomes substantially the stoichiometric air-fuel ratio. At this time, the air-fuel ratio of the inflowing exhaust gas which becomes the rich air-fuel ratio, so the amount of $NO_X$ which is exhausted from the upstream side exhaust purification catalyst 20 becomes substantially zero.

If the upstream side exhaust purification catalyst 20 gradually decreases in stored amount of oxygen OSA, the stored amount of oxygen OSA approaches zero at the time $t_1$. Along with this, part of the unburned gas which flows into the upstream side exhaust purification catalyst 20 starts to flow out without being purified by the upstream side exhaust purification catalyst 20. Due to this, from the time $t_1$ on, the output air-fuel ratio AFdwn of the downstream side air-fuel ratio sensor 41 gradually falls. As a result, at the time $t_2$, the output air-fuel ratio AFdwn of the downstream side air-fuel ratio sensor 41 reaches the rich judgment air-fuel ratio AFrich.

In the present embodiment, when the output air-fuel ratio AFdwn of the downstream side air-fuel ratio sensor 41 becomes the rich judgment air-fuel ratio or less, to make the stored amount of oxygen OSA increase, the air-fuel ratio correction amount AFC is switched to the lean set correction amount AFClean (corresponding to the lean set air-fuel ratio). Therefore, the target air-fuel ratio is switched from the rich air-fuel ratio to the lean air-fuel ratio. Further, at this time, the cumulative oxygen excess/deficiency ΣOED is reset to 0.

Note that, in the present embodiment, the air-fuel ratio correction amount AFC is switched after the output air-fuel ratio AFdwn of the downstream side air-fuel ratio sensor 41 reaches the rich judgment air-fuel ratio AFrich. This is because even if the stored amount of oxygen of the upstream side exhaust purification catalyst 20 is sufficient, the air-fuel ratio of the outflowing exhaust gas which sometimes ends up being slightly offset from the stoichiometric air-fuel ratio. Conversely speaking, the rich judgment air-fuel ratio is made an air-fuel ratio which the air-fuel ratio of the outflowing exhaust gas will never reach when the stored amount of oxygen of the upstream side exhaust purification catalyst 20 is sufficient.

At the time $t_2$, when the target air-fuel ratio is switched to the lean air-fuel ratio, the air-fuel ratio of the inflowing exhaust gas changes from the rich air-fuel ratio to the lean air-fuel ratio. Further, along with this, the output air-fuel ratio AFup of the upstream side air-fuel ratio sensor 40 becomes a lean air-fuel ratio (in actuality, a delay occurs from when the target air-fuel ratio is switched to when the air-fuel ratio of the inflowing exhaust gas changes, but in the illustrated example, it is deemed for convenience that the change is simultaneous). If at the time $t_2$ the air-fuel ratio of the inflowing exhaust gas changes to the lean air-fuel ratio, the upstream side exhaust purification catalyst 20 increases in the stored amount of oxygen OSA. Further, along with this, the cumulative oxygen excess/deficiency ΣOED also gradually increases.

Due to this, the air-fuel ratio of the outflowing exhaust gas changes to the stoichiometric air-fuel ratio, and the output air-fuel ratio AFdwn of the downstream side air-fuel ratio sensor 41 converges to the stoichiometric air-fuel ratio. At this time, the air-fuel ratio of the inflowing exhaust gas which becomes the lean air-fuel ratio, but there is sufficient leeway in the oxygen storage ability of the upstream side exhaust purification catalyst 20, so the oxygen in the inflowing exhaust gas is stored in the upstream side exhaust purification catalyst 20 and the $NO_X$ is removed by reduction. For this reason, the exhaust of $NO_X$ from the upstream side exhaust purification catalyst 20 becomes substantially zero.

After this, if the upstream side exhaust purification catalyst 20 increases in stored amount of oxygen OSA, at the time $t_3$, the stored amount of oxygen OSA of the upstream side exhaust purification catalyst 20 reaches the switching reference storage amount Cref. For this reason, the cumulative oxygen excess/deficiency ΣOED reaches the switching reference value OEDref which corresponds to the switching reference storage amount Cref. In the present embodiment, if the cumulative oxygen excess/deficiency ΣOED becomes the switching reference value OEDref or more, the storage of oxygen in the upstream side exhaust purification catalyst 20 is suspended by switching the air-fuel ratio correction amount AFC to the rich set correction amount AFCrich. Therefore, the target air-fuel ratio is made the rich air-fuel ratio. Further, at this time, the cumulative oxygen excess/deficiency ΣOED is reset to 0.

Here, in the example which is shown in FIG. 8, at the time $t_3$, the target air-fuel ratio is switched and simultaneously the oxygen storage amount OSA falls, but in actuality, a delay occurs from when switching the target air-fuel ratio to when the oxygen storage amount OSA falls. Further, when acceleration of the vehicle mounting the internal combustion engine causes the engine load to become higher and the intake air amount to greatly deviate for an instant etc., the air-fuel ratio of the inflowing exhaust gas sometimes unintentionally greatly deviates from the target air-fuel ratio for an instant.

As opposed to this, the switching reference storage amount Cref is set sufficiently lower than the maximum storable oxygen amount Cmax when the upstream side exhaust purification catalyst 20 is new. For this reason, even if the above mentioned delay occurs or the air-fuel ratio of the actual exhaust gas unintentionally greatly deviates from the target air-fuel ratio for an instant, the stored amount of oxygen OSA does not reach the maximum storable oxygen amount Cmax. Conversely, the switching reference storage amount Cref is made an amount sufficiently small so that the stored amount of oxygen OSA does not reach the maximum storable oxygen amount Cmax even if the above mentioned delay or unintentional deviation of air-fuel ratio occurs. For example, the switching reference storage amount Cref is made ¾ or less of the maximum storable oxygen amount Cmax when the upstream side exhaust purification catalyst 20 is new, preferably ½ or less, more preferably ⅕ or less.

At the time $t_3$, if the target air-fuel ratio is switched to the rich air-fuel ratio, the air-fuel ratio of the inflowing exhaust gas changes from the lean air-fuel ratio to the rich air-fuel ratio. Along with this, the output air-fuel ratio AFup of the upstream side air-fuel ratio sensor 40 becomes a rich air-fuel ratio (in actuality, a delay occurs from when the target air-fuel ratio is switched to when the inflowing exhaust gas changes in air-fuel ratio, but in the illustrated example, it is deemed for convenience that the change is simultaneous). The inflowing exhaust gas contains unburned gas, so the upstream side exhaust purification catalyst 20 gradually decreases in stored amount of oxygen OSA. At the time $t_4$, in the same way as the time $t_1$, the output air-fuel ratio AFdwn of the downstream side air-fuel ratio sensor 41 starts to fall. At this time as well, the air-fuel ratio of the inflowing exhaust gas is the rich air-fuel ratio, so substantially zero $NO_X$ is exhausted from the upstream side exhaust purification catalyst 20.

Next, at the time $t_5$, in the same way as time $t_2$, the output air-fuel ratio AFdwn of the downstream side air-fuel ratio sensor 41 reaches the rich judgment air-fuel ratio AFrich. Due to this, the air-fuel ratio correction amount AFC is switched to the value AFClean which corresponds to the lean set air-fuel ratio. After this, the cycle of the above mentioned times $t_1$ to $t_5$ is repeated.

Further, in the present embodiment, while the above-mentioned cycle of the times $t_1$ to $t_5$ is repeated, the amount of fuel which is fed to the combustion chamber 5 is controlled by feedback so that the output air-fuel ratio AFup of the upstream side air-fuel ratio sensor 40 becomes the target air-fuel ratio. For example, when the output air-fuel ratio AFup of the upstream side air-fuel ratio sensor 40 is lower (richer) than the target air-fuel ratio, the amount of fuel which is fed to the combustion chamber 5 is made smaller. On the other hand, when the output air-fuel ratio AFup of the upstream side air-fuel ratio sensor 40 is higher (leaner) than the value corresponding to the target air-fuel ratio, the amount of fuel which is fed to the combustion chamber 5 becomes greater.

As will be understood from the above explanation, according to the present embodiment, it is possible to constantly suppress the amount of discharge of $NO_X$ from the upstream side exhaust purification catalyst 20. That is, so long as performing the above-mentioned control, basically, the amount of discharge of $NO_X$ from the upstream side exhaust purification catalyst 20 can be made substantially zero. Further, the cumulative time when calculating the cumulative oxygen excess/deficiency ΣOED is short, so there is less of a chance of calculation error compared with when calculating the cumulative amount over a long period of time. For this reason, error in calculation of the cumulative oxygen excess/deficiency ΣOED can be kept from causing $NO_X$ to end up being discharged.

Further, in general, if the stored amount of oxygen of the exhaust purification catalyst is maintained constant, the exhaust purification catalyst falls in oxygen storage ability. That is, to maintain the exhaust purification catalyst high in oxygen storage ability, the stored amount of oxygen of the exhaust purification catalyst has to fluctuate. As opposed to this, according to the present embodiment, as shown in FIG. 8, the stored amount of oxygen OSA of the upstream side exhaust purification catalyst 20 constantly fluctuates up and down, so the oxygen storage ability is kept from falling.

Note that, in the above embodiment, at the times $t_2$ to $t_3$, the air-fuel ratio correction amount AFC is maintained at the lean set correction amount AFClean. However, at this time period, the air-fuel ratio correction amount AFC does not necessarily have to be maintained constant. It may be set to gradually decrease or otherwise fluctuate. Alternatively, in the time period of the times $t_2$ to $t_3$, it is also possible to temporarily make the air-fuel ratio correction amount AFC a value smaller than 0 (for example, the rich set correction amount etc). That is, in the time period of the times $t_2$ to $t_3$, the target air-fuel ratio may also temporarily be made the rich air-fuel ratio.

Similarly, in the above embodiment, at the times $t_3$ to $t_5$, the air-fuel ratio correction amount AFC is maintained at the rich set correction amount AFCrich. However, at this time period, the air-fuel ratio correction amount AFC does not necessarily have to be maintained constant. It may be set to gradually increase or otherwise fluctuate. Alternatively, in the time period of the times $t_3$ to $t_5$, it is also possible to temporarily make the air-fuel ratio correction amount AFC a value larger than 0 (for example, the lean set correction amount etc.). That is, in the time period of the times $t_3$ to $t_5$, the target air-fuel ratio may also temporarily be made the lean air-fuel ratio.

However, in this case as well, the air-fuel ratio correction amount AFC at the times $t_2$ to $t_3$ is set so that the difference between the average value of the target air-fuel ratio and the stoichiometric air-fuel ratio at the times $t_2$ to $t_3$ becomes larger than the difference between the average value of the target air-fuel ratio and the stoichiometric air-fuel ratio at the times $t_3$ to $t_5$.

Further, in the above embodiment, the cumulative oxygen excess/deficiency ΣOED is calculated based on the output air-fuel ratio AFup etc. However, the stored amount of oxygen OSA may also be calculated based on other parameters in addition to these parameters and may be estimated based on parameters which are different from these parameters. Further, in the above embodiment, if the cumulative oxygen excess/deficiency ΣOED becomes the switching reference value OEDref or more, the target air-fuel ratio is switched from the lean set air-fuel ratio to the rich set air-fuel ratio. However, the timing of switching the target air-fuel ratio from the lean set air-fuel ratio to the rich set air-fuel ratio may, for example, also be based on the engine operating time or the cumulative amount of intake air from when switching the target air-fuel ratio from the rich set air-fuel ratio to the lean set air-fuel ratio or other parameter. However, in this case as well, the target air-fuel ratio has to be switched from the lean set air-fuel ratio to the rich set air-fuel ratio while the stored amount of oxygen OSA of the upstream side exhaust purification catalyst 20 is estimated to be smaller than the maximum storable oxygen amount.

<Deviation in Upstream Side Air-Fuel Ratio Sensor>

In this regard, an air-fuel ratio sensor gradually deteriorates along with use and sometimes changes in gain characteristics. For example, if the gain characteristics of the upstream side air-fuel ratio sensor 40 change, sometimes deviation occurs between the output air-fuel ratio of the upstream side air-fuel ratio sensor 40 and the actual air-fuel ratio of the exhaust gas. In this case, the output air-fuel ratio of the upstream side air-fuel ratio sensor 40 deviates to the rich side or lean side from the actual air-fuel ratio of the exhaust gas.

Further, hydrogen, among unburned gas, has a fast speed of passage through the diffusion regulation layer of the air-fuel ratio sensor. For this reason, if the concentration of hydrogen in the exhaust gas is high, the output air-fuel ratio of the upstream side air-fuel ratio sensor 40 deviates to the lower side with respect to the actual air-fuel ratio of the exhaust gas (that is, the rich side).

When deviation occurs in the output air-fuel ratio of the upstream side air-fuel ratio sensor 40 in this way, even if performing the above mentioned control, sometimes NOx and oxygen flow out from the upstream side exhaust purification catalyst 20 or the frequency of outflow of unburned gas from the upstream side exhaust purification catalyst 20 becomes higher. Below, this phenomenon will be explained with reference to FIG. 9.

Figure 9:
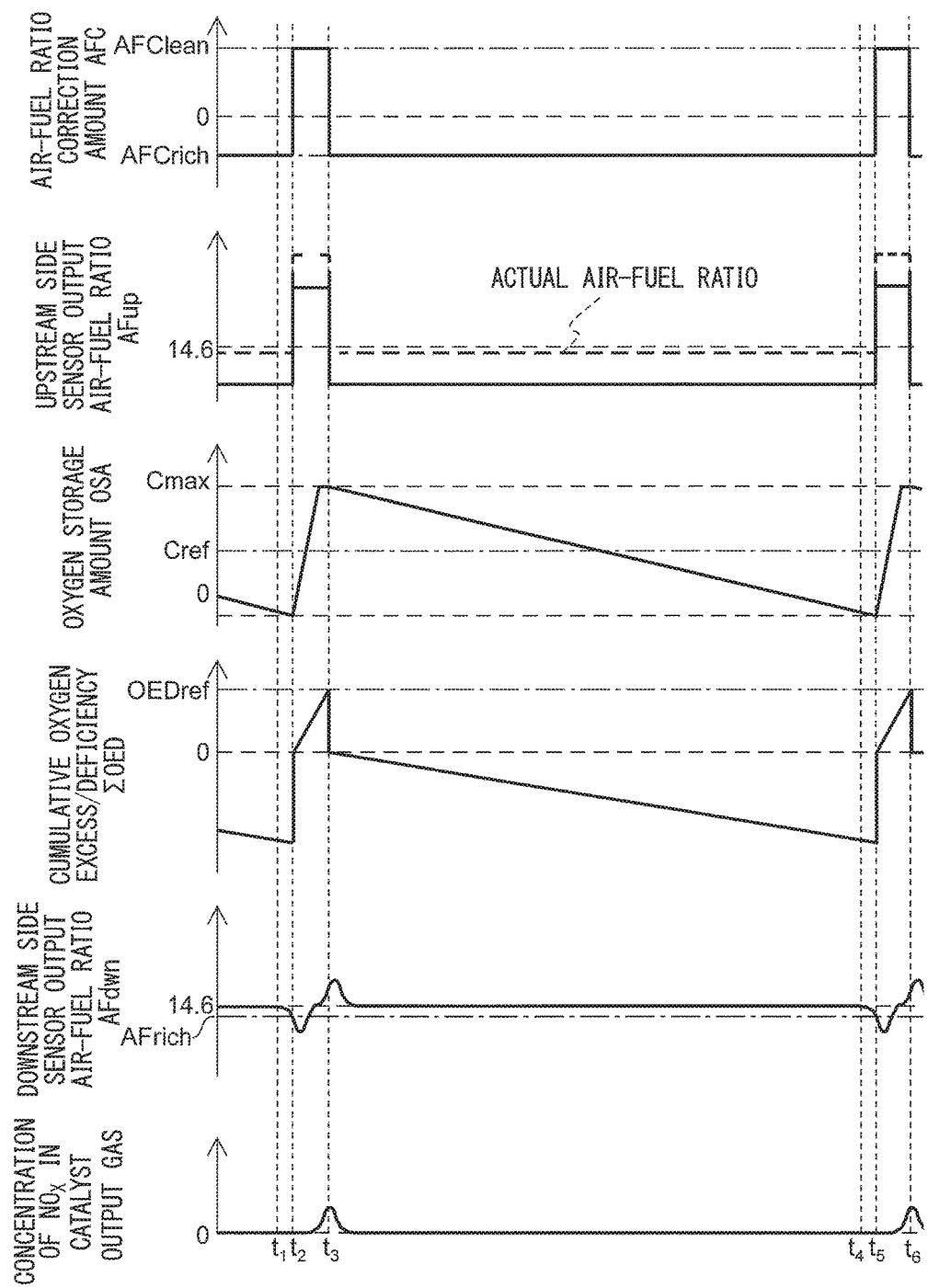
FIG. 9 is a time chart of an air-fuel ratio correction amount etc. when deviation occurs in an output air-fuel ratio of an upstream side air-fuel ratio sensor.

FIG. 9 is a time chart of the oxygen storage amount OSA of the upstream side exhaust purification catalyst 20, etc., similar to FIG. 8. FIG. 9 shows the case where the output air-fuel ratio of the upstream side air-fuel ratio sensor 40 deviates to the rich side. In the figure, the solid line in the output air-fuel ratio AFup of the upstream side air-fuel ratio sensor 40 shows the actual output air-fuel ratio. On the other hand, the broken line shows the actual air-fuel ratio of the inflowing exhaust gas.

In the case which is shown in FIG. 9 as well, in the state before the time $t_1$, the air-fuel ratio correction amount AFC is made the rich set correction amount AFCrich. Accordingly, the target air-fuel ratio is made the rich set air-fuel ratio. Along with this, the output air-fuel ratio AFup of the upstream side air-fuel ratio sensor 40 becomes an air-fuel ratio equal to the rich set air-fuel ratio. However, as explained above, the output air-fuel ratio of the upstream side air-fuel ratio sensor 40 deviates to the rich side, so the actual air-fuel ratio of the exhaust gas becomes an air-fuel ratio at the lean side from the rich set air-fuel ratio. That is, the output air-fuel ratio AFup of the upstream side air-fuel ratio sensor 40 becomes lower (richer) than the actual air-fuel ratio (broken line in the figure). For this reason, the speed of decrease of the oxygen storage amount OSA of the upstream side exhaust purification catalyst 20 becomes slow.

Further, in the example which is shown in FIG. 9, at the time $t_2$, the output air-fuel ratio AFdwn of the downstream side air-fuel ratio sensor 41 reaches the rich judged air-fuel ratio AFrich. For this reason, as explained above, at the time $t_2$, the air-fuel ratio correction amount AFC is switched to the lean set correction amount AFClean. That is, the target air-fuel ratio is switched to the lean set air-fuel ratio.

Along with this, the output air-fuel ratio AFup of the upstream side air-fuel ratio sensor 40 becomes an air-fuel ratio equal to the lean set air-fuel ratio. However, as explained above, the output air-fuel ratio of the upstream side air-fuel ratio sensor 40 deviates to the rich side, so the actual air-fuel ratio of the exhaust gas becomes an air-fuel ratio which is leaner than the lean set air-fuel ratio. That is, the output air-fuel ratio AFup of the upstream side air-fuel ratio sensor 40 becomes lower (richer) than the actual air-fuel ratio (broken line in the figure). For this reason, the speed of increase of the oxygen storage amount OSA of the upstream side exhaust purification catalyst 20 is fast.

In addition, if the deviation of the output air-fuel ratio of the upstream side air-fuel ratio sensor 40 is large, the speed of increase of the oxygen storage amount OSA of the upstream side exhaust purification catalyst 20 becomes extremely fast. Therefore, in this case, as shown in FIG. 9, before the cumulative oxygen excess/deficiency ΣOED which is calculated based on the output air-fuel ratio AFup of the upstream side air-fuel ratio sensor 40 reaches the switching reference value OEDref, the actual oxygen storage amount OSA reaches the maximum storable oxygen amount Cmax. As a result, $NO_X$ and oxygen flow out from the upstream side exhaust purification catalyst 20.

On the other hand, conversely to the above-mentioned example, if the output air-fuel ratio of the upstream side air-fuel ratio sensor 40 deviates to the lean side, the speed of increase of the oxygen storage amount OSA becomes slower and the speed of decrease becomes faster. In this case, the cycle from the time $t_2$ to the time $t_5$ becomes faster and the frequency of outflow of unburned gas from the upstream side exhaust purification catalyst 20 becomes higher.

Due to the above, it is necessary to detect the deviation of the output air-fuel ratio of the upstream side air-fuel ratio sensor 40 and is necessary to correct the output air-fuel ratio, etc., based on the detected deviation.

<Learning Control>

Therefore, in an embodiment of the present invention, learning control is performed during normal operation (that is, when performing feedback control based on the above mentioned target air-fuel ratio) to compensate for deviation in the output air-fuel ratio of the upstream side air-fuel ratio sensor 40.

In this regard, the time period from when switching the target air-fuel ratio to the lean air-fuel ratio to when the output air-fuel ratio of the downstream side air-fuel ratio sensor 41 becomes the switching reference value OEDref or more, is defined as the oxygen increase time period (first time period). Similarly, the time period from when the target air-fuel ratio is switched to the rich air-fuel ratio to when the output air-fuel ratio of the downstream side air-fuel ratio sensor 41 becomes the rich judgment air-fuel ratio or less, is defined as the oxygen decrease time period (second time period). In the learning control of the present embodiment, as the absolute value of the cumulative oxygen excess/deficiency ΣOED in the oxygen increase time period, the lean cumulative value of oxygen amount (first cumulative value of oxygen amount) is calculated. In addition, as the absolute value of the cumulative oxygen excess/deficiency in the oxygen decrease time period, the rich cumulative value of oxygen amount (second cumulative value of oxygen amount) is calculated. Further, the control center air-fuel ratio AFR is corrected so that the difference between the lean cumulative value of oxygen amount and rich cumulative value of oxygen amount becomes smaller.

Note that, the lean cumulative value of oxygen amount corresponds to the estimated value of the oxygen storage amount which is stored in the upstream side exhaust purification catalyst 20 in the time period from when switching the target air-fuel ratio to the lean set air-fuel ratio to when switching the target air-fuel ratio to the rich set air-fuel ratio. On the other hand, the rich cumulative value of oxygen amount corresponds to the estimated value of the oxygen release amount which is released from the upstream side exhaust purification catalyst 20 in the time period from when switching the target air-fuel ratio to the rich set air-fuel ratio to when switching the target air-fuel ratio to the lean set air-fuel ratio.

Figure 10:
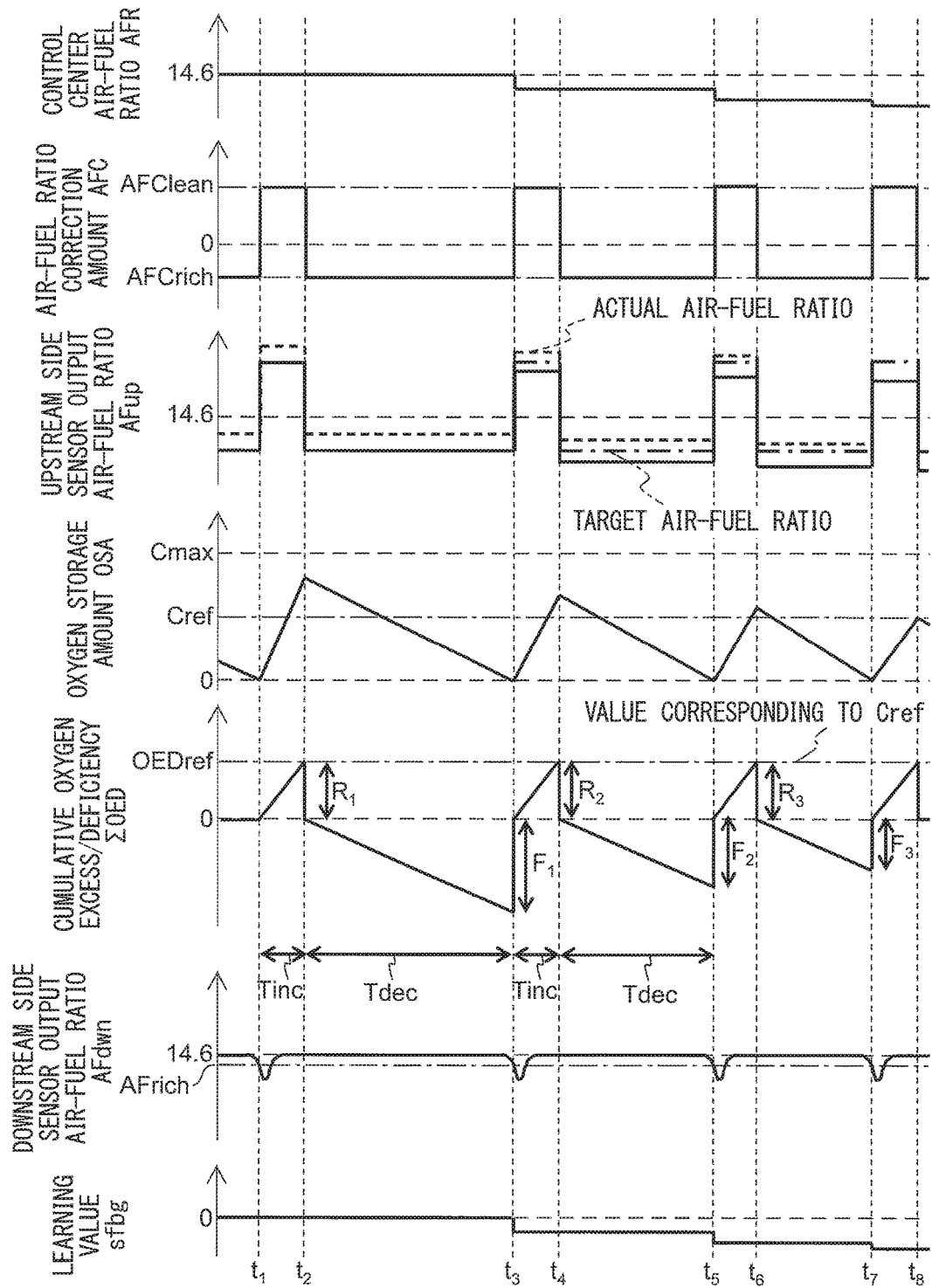
FIG. 10 is a time chart of an air-fuel ratio correction amount etc. at the time of performing learning control.

Below, referring to FIG. 10, learning control in the first embodiment is explained. FIG. 10 is a time chart of the control center air-fuel ratio AFR, the air-fuel ratio correction amount AFC, the output air-fuel ratio AFup of the upstream side air-fuel ratio sensor 40, the oxygen storage amount OSA of the upstream side exhaust purification catalyst 20, the cumulative oxygen excess/deficiency ΣOED, the output air-fuel ratio AFdwn of the downstream side air-fuel ratio sensor 41, and the learning value sfbg. FIG. 10 shows the case, like FIG. 9, where the output air-fuel ratio AFup of the upstream side air-fuel ratio sensor 40 deviates to the low side (rich side). Note that, the learning value sfbg is a value which changes in accordance with the deviation of the output air-fuel ratio (output current) of the upstream side air-fuel ratio sensor 40 and, in the present embodiment, is used for correction of the control center air-fuel ratio AFR. Further, in the figure, the solid line in the output air-fuel ratio AFup of the upstream side air-fuel ratio sensor 40 shows the air-fuel ratio corresponding to the output detected by the upstream side air-fuel ratio 40, while the broken line shows the actual air-fuel ratio of the inflowing exhaust gas. In addition, one-dot chain line shows the target air-fuel ratio, that is, an air-fuel ratio corresponding to the air-fuel ratio correction amount AFC.

In the illustrated example, in the same way as FIG. 8 and FIG. 9, in the state before the time $t_1$, the control center air-fuel ratio is set to the stoichiometric air-fuel ratio and the air-fuel ratio correction amount AFC is set to the rich set correction amount AFCrich. At this time, the output air-fuel ratio AFup of the upstream side air-fuel ratio sensor 40, as shown by the solid line, becomes an air-fuel ratio which corresponds to the rich set air-fuel ratio. However, since the output air-fuel ratio AFup of the upstream side air-fuel ratio sensor 40 deviates, the actual air-fuel ratio of the exhaust gas becomes an air-fuel ratio which is leaner than the rich set air-fuel ratio (broken line in FIG. 10). However, in the example shown in FIG. 10, as will be understood from the broken line in FIG. 10, the actual air-fuel ratio of the exhaust gas before the time $t_1$ is a rich air-fuel ratio, while it is leaner than the rich set air-fuel ratio. Therefore, the upstream side exhaust purification catalyst 20 is gradually decreased in the oxygen storage amount.

At the time $t_1$, the output air-fuel ratio AFdwn of the downstream side air-fuel ratio sensor 41 reaches the rich judged air-fuel ratio AFrich. Due to this, as explained above, the air-fuel ratio correction amount AFC is switched to the lean set correction amount AFClean. After the time $t_1$, the output air-fuel ratio of the upstream side air-fuel ratio sensor 40 becomes an air-fuel ratio which corresponds to the lean set air-fuel ratio. However, due to deviation of the output air-fuel ratio of the upstream side air-fuel ratio sensor 40, the actual air-fuel ratio of the exhaust gas becomes an air-fuel ratio which is leaner than the lean set air-fuel ratio, that is, an air-fuel ratio with a larger lean degree (see broken line in FIG. 10). Therefore, the oxygen storage amount OSA of the upstream side exhaust purification catalyst 20 rapidly increases.

On the other hand, the oxygen excess/deficiency is calculated based on the output air-fuel ratio AFup of the upstream side air-fuel ratio sensor 40 (more accurately, the difference between the output air-fuel ratio AFup and the control center air-fuel ratio AFR). However, as explained above, deviation occurs in the output air-fuel ratio AFup of the upstream side air-fuel ratio sensor 40. Therefore, the calculated oxygen excess/deficiency becomes a value smaller than the actual oxygen excess/deficiency (that is, a smaller amount of oxygen). As a result, the calculated cumulative oxygen excess/deficiency ΣOED becomes smaller than the actual value.

At the time $t_2$, the cumulative oxygen excess/deficiency ΣOED reaches the switching reference value OEDref. For this reason, the air-fuel ratio correction amount AFC is switched to the rich set correction amount AFCrich. Therefore, the target air-fuel ratio is made the rich air-fuel ratio. At this time, the actual oxygen storage amount OSA, as shown in FIG. 10, becomes greater than the switching reference storage amount Cref.

After the time $t_2$, in the same way as the state before the time $t_1$, the air-fuel ratio correction amount AFC is made the rich set correction amount AFCrich and therefore the target air-fuel ratio is made the rich air-fuel ratio. At this time as well, the actual air-fuel ratio of the exhaust gas becomes an air-fuel ratio which is leaner than the rich set air-fuel ratio. As a result, the speed of decrease of the oxygen storage amount OSA of the upstream side exhaust purification catalyst 20 becomes slower. In addition, as explained above, at the time $t_2$, the actual oxygen storage amount OSA of the upstream side exhaust purification catalyst 20 becomes greater than the switching reference storage amount Cref. For this reason, time is taken until the actual oxygen storage amount OSA of the upstream side exhaust purification catalyst 20 reaches zero.

At the time $t_3$, the output air-fuel ratio AFdwn of the downstream side air-fuel ratio sensor 41 reaches the rich judged air-fuel ratio AFrich. Due to this, as explained above, the air-fuel ratio correction amount AFC is switched to the lean set correction amount AFClean. Accordingly, the target air-fuel is switched from the rich set air-fuel ratio to the lean set air-fuel ratio.

Here, if referring to the time period from when switching the target air-fuel ratio to the lean air-fuel ratio (time $t_1$) to when the cumulative oxygen excess/deficiency ΣOED reaches the switching reference value OEDref (time $t_2$) as the "oxygen increasing time period Tinc", in the present embodiment, the absolute value $R_1$ of the cumulative oxygen excess/deficiency ΣOED in the oxygen increasing time period Tinc is calculated.

The absolute value $R_1$ of cumulative oxygen excess/deficiency ΣOED in this oxygen increase time period Tinc corresponds to the estimated value of the oxygen storage amount OSA at the time $t_3$. However, as explained above, the oxygen excess/deficiency is estimated by using the output air-fuel ratio AFup of the upstream side air-fuel ratio sensor 40, and deviation occurs in this output air-fuel ratio AFup. For this reason, in the example shown in FIG. 10, the absolute value $R_1$ of the cumulative oxygen excess/deficiency ΣOED in the oxygen increase time period Tinc from the time $t_1$ to time $t_2$ becomes smaller than the value which corresponds to the actual oxygen storage amount OSA at the time $t_2$.

Further, in the present embodiment, if referring to the time period from when switching the target air-fuel ratio to the rich air-fuel ratio (time $t_2$) to when the output air-fuel ratio AFdwn of the downstream side air-fuel ratio sensor 41 reaches the rich judgment air-fuel ratio AFrich (time $t_3$) as the "oxygen decreasing time period Tdec", in the present embodiment, the absolute value $F_1$ of the cumulative oxygen excess/deficiency ΣOED in the oxygen decreasing time period Tdec is calculated.

The absolute value $F_1$ of the cumulative oxygen excess/deficiency ΣOED in this oxygen decrease time period Tdec corresponds to the estimated value of oxygen release amount which is released from the upstream side exhaust purification catalyst 20 from the time $t_2$ to the time $t_3$. However, as explained above, deviation occurs in the output air-fuel ratio AFup of the upstream side air-fuel ratio sensor 40. Therefore, in the example shown in FIG. 10, the absolute value $F_1$ of the cumulative oxygen excess/deficiency ΣOED in the oxygen decrease time period Tdec from the time $t_2$ to time $t_3$ is larger than the value which corresponds to the oxygen release amount which is actually released from the upstream side exhaust purification catalyst 20 from the time $t_2$ to the time $t_3$.

In this regard, in the oxygen increase time period Tinc, oxygen is stored at the upstream side exhaust purification catalyst 20, while in the oxygen decrease time period Tdec, the stored oxygen is completely released. Therefore, the absolute value $R_1$ of the cumulative oxygen excess/deficiency ΣOED at the oxygen increase time period Tinc and the absolute value $F_1$ of the cumulative oxygen excess/deficiency ΣOED at the oxygen decrease time period Tdec must be basically the same value as each other. However, as explained above, when deviation occurs in the output air-fuel ratio AFup of the upstream side air-fuel ratio sensor 40, the cumulative values change in accordance with the deviation. As explained above, when the output air-fuel ratio of the upstream side air-fuel ratio sensor 40 deviates to the low side (rich side), the absolute value $F_1$ becomes greater than the absolute value $R_1$. Conversely, when the output air-fuel ratio of the upstream side air-fuel ratio sensor 40 deviates to the high side (lean side), the absolute value $F_1$ becomes smaller than the absolute value $R_1$. In addition, the difference ΔΣOED of the absolute value $R_1$ of the cumulative oxygen excess/deficiency ΣOED in the oxygen increase time period Tinc and the absolute value $F_1$ of the cumulative oxygen excess/deficiency ΣOED at the oxygen decrease time period Tdec (=$R_1-F_1$. below, also referred to as the "excess/deficiency error") expresses the extent of deviation at the output air-fuel ratio of the upstream side air-fuel ratio sensor 40. The larger the difference between these absolute values $R_1$ and $F_1$, the greater the deviation in the output air-fuel ratio of the upstream side air-fuel ratio sensor 40.

Therefore, in the present embodiment, the control center air-fuel ratio AFR is corrected based on the excess/deficiency error ΔΣOED. In particular, in the present embodiment, the control center air-fuel ratio AFR is corrected so that the excess/deficiency error ΔΣOED becomes smaller.

Specifically, in the present embodiment, the learning value sfbg is calculated by the following formula (2), and the control center air-fuel ratio AFR is corrected by the following formula (3).

$$sfbg(n)=sfbg(n-1)+k_1 \cdot \Delta\Sigma OED \quad (2)$$

$$AFR=AFRbase+sfbg(n) \quad (3)$$

Note that, in the above formula (2), "n" expresses the number of calculations or time. Therefore, sfbg(n) is the current calculated value or current learning value. In addition, "$k_1$" in the above formula (2) is the gain which shows the extent by which the excess/deficiency error ΔΣOED is reflected in the control center air-fuel ratio AFR. The larger the value of the gain "$k_1$", the larger the correction amount of the control center air-fuel ratio AFR. In addition, in the above formula (3), the base control center air-fuel ratio AFRbase is a control center air-fuel ratio which is used as base, and is the stoichiometric air-fuel ratio in the present embodiment.

At the time $t_3$ of FIG. 10, as explained above, the learning value sfbg is calculated based on the absolute values $R_1$ and $F_1$. In particular, in the example shown in FIG. 10, the absolute value $F_1$ of the cumulative oxygen excess/deficiency ΣOED in the oxygen decrease time period Tdec is larger than the absolute value $R_1$ of the cumulative oxygen excess/deficiency ΣOED in the oxygen increase time period Tinc, and therefore at the time $t_3$, the learning value sfbg is decreased.

In this regard, the control center air-fuel ratio AFR is corrected based on the learning value sfbg by using the above formula (3). In the example shown in FIG. 10, since the learning value sfbg is a negative value, the control center air-fuel ratio AFR becomes a value smaller than the base control center air-fuel ratio AFRbase, that is, the rich side value. Due to this, the actual air-fuel ratio of the inflowing exhaust gas is corrected to the rich side.

As a result, after the time $t_3$, the deviation of the actual air-fuel ratio of the inflowing exhaust gas with respect to the target air-fuel ratio becomes smaller than before the time $t_3$. Therefore, as shown in FIG. 10, the difference between the broken line showing the actual air-fuel ratio and the one-dot chain line showing the target air-fuel ratio after the time $t_3$ becomes smaller than the difference before the time $t_3$.

Further, after the time $t_3$ as well, an operation similar to the operation during the time $t_1$ to time $t_3$ is performed. Therefore, at the time $t_4$, if the cumulative oxygen excess/deficiency ΣOED reaches the switching reference value OEDref, the target air-fuel ratio is switched from the lean set air-fuel ratio to the rich set air-fuel ratio. After this, at the time $t_5$, when the output air-fuel ratio AFdwn of the downstream side air-fuel ratio sensor 41 reaches the rich judgment air-fuel ratio AFrich, the target air-fuel ratio is again switched to the lean set air-fuel ratio.

The time $t_3$ to time $t_4$, as explained above, corresponds to the oxygen increase time period Tinc, and therefore, the absolute value of the cumulative oxygen excess/deficiency ΣOED during this period is expressed by $R_2$ of FIG. 10. Further, the time $t_4$ to time $t_5$, as explained above, corresponds to the oxygen decrease time period Tdec, and therefore the absolute value of the cumulative oxygen excess/deficiency ΣOED during this period is expressed by $F_2$ of FIG. 10. Further, the learning value sfbg is updated based on the difference ΔΣOED (=$R_2-F_2$) of these absolute values $R_2$ and $F_2$ by using the above formula (2). In the present embodiment, similar control is repeated after the time $t_5$ and thus the learning value sfbg is repeatedly updated.

By updating the learning value sfbg in this way by means of the learning control, the output air-fuel ratio AFup of the upstream side air-fuel ratio sensor 40 is gradually separated from the target air-fuel ratio, but the actual air-fuel ratio of the inflowing exhaust gas gradually approaches the target air-fuel ratio. Due to this, it is possible to compensate the deviation at the output air-fuel ratio of the upstream side air-fuel ratio sensor 40.

Further, in the above embodiment, the target air-fuel ratio is switched before the oxygen storage amount OSA of the upstream side exhaust purification catalyst 20 reaches the maximum storable oxygen amount Cmax. For this reason, compared with when switching the target air-fuel ratio after the oxygen storage amount OSA reaches the maximum storable oxygen amount, that is, after the output air-fuel ratio AFdwn of the downstream side air-fuel ratio sensor 41 becomes the lean judged air-fuel ratio AFlean or more, it is possible to increase the frequency of updating of the learning value. Further, the cumulative oxygen excess/deficiency ΣOED becomes more susceptible to error the longer the calculation time period. According to the present embodiment, the target air-fuel ratio is switched before the oxygen storage amount OSA reaches the maximum storable oxygen amount Cmax, so the calculation time period can be shortened. For this reason, the error in calculating the cumulative oxygen excess/deficiency ΣOED can be made smaller.

Note that, as explained above, the learning value sfbg is preferably updated based on the cumulative oxygen excess/deficiency ΣOED in the oxygen increase time period Tinc and the cumulative oxygen excess/deficiency ΣOED in the oxygen decrease time period Tdec which follows this oxygen increase time period Tinc. This is because, as explained above, the total amount of oxygen stored at the upstream side exhaust purification catalyst 20 in the oxygen increase time period Tinc and the total amount of oxygen released from the upstream side exhaust purification catalyst 20 in the directly following oxygen decrease time period Tdec, become equal.

In addition, in the above embodiment, the learning value sfbg is updated based on the cumulative oxygen excess/deficiency ΣOED in a single oxygen increase time period Tinc and the cumulative oxygen excess/deficiency ΣOED in a single oxygen decrease time period Tdec. However, the learning value sfbg may be updated based on the total value or average value of the cumulative oxygen excess/deficiency ΣOED in a plurality of oxygen increase time periods Tinc and the total value or average value of the cumulative oxygen excess/deficiency ΣOED in a plurality of oxygen decrease time periods Tdec.

Further, in the above embodiment, the control center air-fuel ratio AFR is corrected based on the learning value sfbg. However, a parameter which is corrected based on the learning value sfbg may be another parameter relating to the air-fuel ratio. The other parameter, for example, includes the amount of fuel fed to the inside of the combustion chamber 5, the output air-fuel ratio of the upstream side air-fuel ratio sensor 40, the air-fuel ratio correction amount, etc.

<Occurrence of Scavenging>

In this regard, if valve overlap occurs when the pressure inside the intake port 7 is higher than the pressure inside the exhaust port 9, scavenging wherein air is blown from the intake passage through the cylinder to the exhaust passage occures. Note that, "valve overlap" means partial overlap of the open period of the intake valve 6 and the open period of the exhaust valve 8. The ECU 31 can control at least any one of the variable valve timing mechanism B of the intake valve 6 and the variable valve timing mechanism C of the exhaust valve 8 to cause valve overlap. Specifically, valve overlap is caused by at least any one of causing the opening timing of the intake valve 6 to advance and causing the closing timing of the exhaust valve 8 to be retarded.

When the amount of intake air is insufficient for the torque demand, scavenging is used. By causing scavenging, the amount of exhaust gas sweeping through increases and the speed of the turbine 102 of the turbocharger 101 is raised. As a result, the pressure of the intake air is raised and the amount of intake air is made to increase.

<Problem of Air-Fuel Ratio Control During Occurrence of Scavenging>

As explained above, in the present embodiment, the amount of fuel which is fed to the combustion chamber 5 is controlled by feedback so that the output air-fuel ratio AFup of the upstream side air-fuel ratio sensor 40 becomes the target air-fuel ratio. Further, the cumulative oxygen excess/deficiency ΣOED is calculated based on the output air-fuel ratio AFup of the upstream side air-fuel ratio sensor 40 and the target air-fuel ratio is set based on the cumulative oxygen excess/deficiency ΣOED. Note that, during occurrence of scavenging, the amount of fuel fed to the combustion chamber 5 is controlled by feedback so that the average air-fuel ratio of the inflowing exhaust gas, including the air which is blown from the intake passage through a cylinder to the exhaust passage, becomes the target air-fuel ratio.

However, if scavenging occurs, the air in the cylinder decreases, so the combustion air-fuel ratio in the cylinder becomes rich. If the scavenging amount is large and the rich degree of the combustion air-fuel ratio becomes high, the concentration of hydrogen in the exhaust gas becomes higher. If the exhaust gas contains hydrogen, the difference in gas diffusion between the hydrogen with its fast diffusion speed and the other exhaust components causes the hydrogen to reach the electrode surface first through the diffusion regulating layer 54 of the upstream side air-fuel ratio sensor 40. As a result, the electrode surface of the upstream side air-fuel ratio sensor 40 becomes a rich atmosphere and the output of the upstream side air-fuel ratio sensor 40 deviates to the rich side. If the air-fuel ratio is controlled based on the air-fuel ratio which is detected by the upstream side air-fuel ratio sensor 40 and which deviates to the rich side, the actual combustion air-fuel ratio in the cylinder becomes leaner than the target air-fuel ratio. As a result, the efficiency of removal of the unburned gas etc. at the exhaust purification catalysts 20, 24 falls and the exhaust emissions are liable to deteriorate.

On the other hand, the hydrogen in the exhaust gas which is produced in large amounts during the occurrence of scavenging is removed by oxidation in the upstream side exhaust purification catalyst 20, so the downstream side air-fuel ratio sensor 41 is not affected much at all by hydrogen. Therefore, in the present embodiment, the air-fuel ratio control device of the internal combustion engine 100 sets the target air-fuel ratio of the inflowing exhaust based on the air-fuel ratio which is detected by the downstream side air-fuel ratio sensor 41 and controls the amount of fuel fed to a combustion chamber 5 by feedback so that the air-fuel ratio which is detected by the upstream side air-fuel ratio sensor 40 matches the target air-fuel ratio when the blow-through amount of air which is blown from the intake passage through a cylinder to the exhaust passage, that is, the scavenging amount, becomes greater than a reference blow-through amount, and sets the target air-fuel ratio of the inflowing exhaust based on the air-fuel ratio which is detected by the downstream side air-fuel ratio sensor 41 and, without performing feedback control, feeds the amount of fuel which is calculated from the target air-fuel ratio to a combustion chamber 5 when the scavenging amount is greater than the reference blow-through amount.

In the present embodiment, when the scavenging amount is greater than the reference blow-through amount, the feedback control based on the air-fuel ratio which is detected by the upstream side air-fuel ratio sensor 40 is stopped so it is possible to keep the actual air-fuel ratio of the inflowing exhaust gas from becoming leaner than the target air-fuel ratio during scavenging. Further, the downstream side air-fuel ratio sensor 41, in the same way as the upstream side air-fuel ratio sensor 40, as will be understood from FIG. 7, can continuously (linearly) and precisely detect the air-fuel ratio. For this reason, in the present embodiment, it is possible to suitably set the target air-fuel ratio of inflowing exhaust gas based on the air-fuel ratio which is detected by the downstream side air-fuel ratio sensor 41, which is resistant to the effects of hydrogen even during the occurrence of scavenging. Therefore, it is possible to suppress deterioration of exhaust emissions along with the occurrence of scavenging.

Further, the above-mentioned learning control has as its object to compensate for the regular deviation between the output air-fuel ratio of the upstream side air-fuel ratio sensor 40 and the actual air-fuel ratio of the inflowing exhaust gas which occurs due to deterioration of the upstream side air-fuel ratio sensor 40, etc. For this reason, as shown in FIG. 10, in learning control, the deviation in the output air-fuel ratio of the upstream side air-fuel ratio sensor 40 is gradually made smaller by updating of the learning value so that the air-fuel ratio control is not disturbed by the sporadic deviation of the output air-fuel ratio of the upstream side air-fuel ratio sensor 40. Further, if updating the learning value during the occurrence of scavenging, sometimes the air-fuel ratio of the inflowing exhaust gas after occurrence of scavenging ends greatly deviates from the target air-fuel ratio.

Therefore, in the present embodiment, the air-fuel ratio control device calculates an amount of oxygen which is stored in the upstream side exhaust purification catalyst 20 in the time period from when switching the target air-fuel ratio to the lean set air-fuel ratio to when switching the target air-fuel ratio to the rich set air-fuel ratio, constituting a first oxygen amount, and an amount of oxygen which is released from the upstream side exhaust purification catalyst 20 in the time period from when switching the target air-fuel ratio to the rich set air-fuel ratio to when switching the target air-fuel ratio to the lean set air-fuel ratio, constituting a second oxygen amount, based on the air-fuel ratio which was detected by the upstream side air-fuel ratio sensor 40. The air-fuel ratio control device updates a learning value based on the difference between the first oxygen amount and the second oxygen amount, and corrects a parameter relating to the air-fuel ratio based on the updated learning value so that the difference between the first oxygen amount and the second oxygen amount becomes smaller when the scavenging amount is the reference blow-through amount or less, and, without updating the learning value, corrects the parameter relating to the air-fuel ratio based on the current learning value when the scavenging amount is greater than the reference blow-through amount. In the present embodiment, it is possible to suppress deterioration of the exhaust emissions accompanying the occurrence of scavenging by prohibiting updating of the learning value when the scavenging amount is greater than the reference blow-through amount.

<Control Routine of Air-Fuel Ratio Control>

Figure 11:
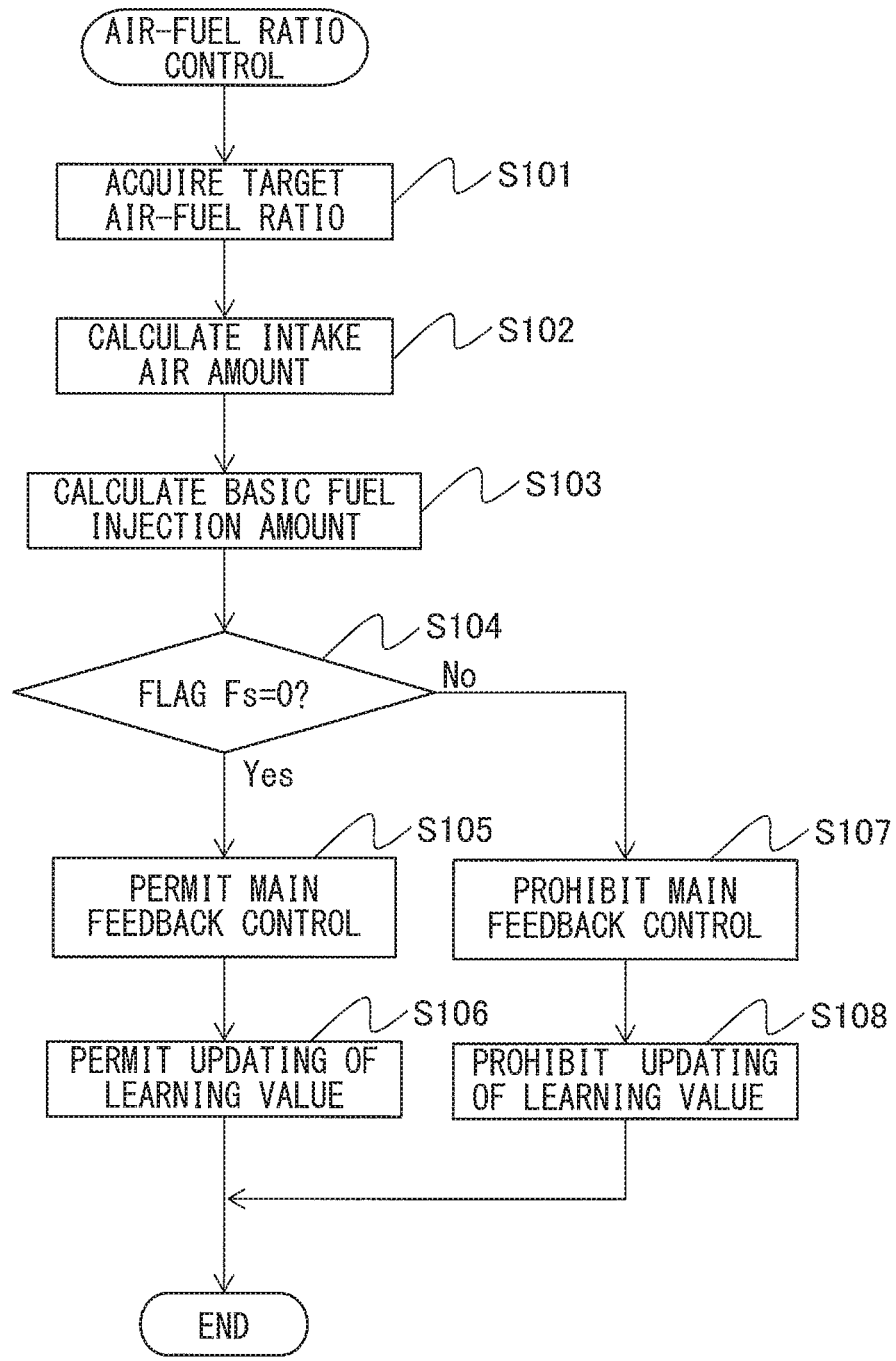
FIG. 11 is a flow chart which shows a control routine of air-fuel ratio control in a first embodiment of the present invention.

FIG. 11 is a flow chart which shows a control routine of air-fuel ratio control in a first embodiment of the present invention. The illustrated control routine is performed by interruption at certain time intervals.

First, at step S101, the target air-fuel ratio of inflowing exhaust gas is acquired. Note that, the target air-fuel ratio is set at the later explained processing for setting a target air-fuel ratio. Next, at step S102, the intake air amount IA is calculated. The intake air amount IA is for example calculated from the output of the air flowmeter 16. Next, at step S103, the basic fuel injection amount is calculated. The basic fuel injection amount BFI is, for example, calculated by the following formula (4) based on the target air-fuel ratio TAF and intake air amount IA.

$$BFI=IA/TAF \tag{4}$$

Next, at step S104, it is judged if a scavenging judgment flag Fs has been set to zero. The scavenging judgment flag Fs is a flag which is set in a later explained scavenging judgment processing. It is set to zero when the scavenging amount is the reference blow-through amount or less, while is set to "1" when the scavenging amount is larger than the reference blow-through amount. If it is judged that the scavenging judgment flag Fs is set to zero, the routine proceeds to step S105.

At step S105, main feedback control is permitted. Specifically, feedback control to control the amount of fuel which is fed to a combustion chamber 5 so that the air-fuel ratio which is detected by the upstream side air-fuel ratio sensor 40 matches the target air-fuel ratio is permitted. Due to the feedback control, the basic fuel injection amount which was calculated at step S103 is corrected. Due to this, when the scavenging amount is the reference blow-through amount or less, it is possible to make the air-fuel ratio of the inflowing exhaust gas approach the target air-fuel ratio based on the output of the upstream side air-fuel ratio sensor 40.

Next, at step S106, updating of the learning value is permitted. Specifically, it is permitted that the amount of oxygen which is stored in the upstream side exhaust purification catalyst 20 in the time period from when the target air-fuel ratio is switched to the lean set air-fuel ratio to when the target air-fuel ratio is switched to the rich set air-fuel ratio, constituting the first oxygen amount, and the amount of oxygen which is released from the upstream side exhaust purification catalyst 20 in the time period from when the target air-fuel ratio is switched to the rich set air-fuel ratio to when the target air-fuel ratio is switched to the lean set air-fuel ratio, constituting the second oxygen amount, are calculated based on the air-fuel ratio which is detected by the upstream side air-fuel ratio sensor 40, and the learning value is updated based on the difference between the first oxygen amount and the second oxygen amount. A parameter relating to the air-fuel ratio is corrected based on the updated learning value so that the difference between the first oxygen amount and the second oxygen amount becomes smaller. Due to this, even if deviation occurs between the air-fuel ratio which is detected by the upstream side air-fuel ratio sensor 40 and the actual air-fuel ratio of the inflowing exhaust gas, this deviation can be decreased. Based on the output air-fuel ratio of the upstream side air-fuel ratio sensor 40, the air-fuel ratio of the inflowing exhaust gas can be made to approach the target air-fuel ratio. After step S106, the present control routine is ended.

On the other hand, when, at step S104, it is judged that the scavenging judgment flag Fs has been set to "1", the routine proceeds to step S107. At step S107, main feedback control is prohibited. Specifically, the amount of fuel which is fed to a combustion chamber 5 being controlled by feedback so that the air-fuel ratio which is detected by the upstream side air-fuel ratio sensor 40 matches the target air-fuel ratio is prohibited and the fuel of the basic fuel injection amount which is calculated at step S103 is fed to the combustion chamber 5. Due to this, it is possible to keep the actual air-fuel ratio of the inflowing exhaust gas from becoming leaner than the target air-fuel ratio during the occurrence of scavenging. As a result, it is possible to suppress deterioration of the exhaust emissions accompanying the occurrence of scavenging.

Next, at step S108, updating of the learning value is prohibited. Specifically, updating of the learning value based on the difference between the first oxygen amount and the second oxygen amount is prohibited, and a parameter relating to the air-fuel ratio is corrected based on the current learning value. Due to this, it is possible to suppress deterioration of the exhaust emissions accompanying occurrence of scavenging. After step S108, the present control routine is ended.

<Processing for Setting Target Air-Fuel Ratio>

In the first embodiment, the air-fuel ratio control device alternately sets the target air-fuel ratio of inflowing exhaust gas to a rich set air-fuel ratio TAFrich which is richer than the stoichiometric air-fuel ratio and a lean set air-fuel ratio TAFlean which is leaner than the stoichiometric air-fuel ratio.

Further, the air-fuel ratio control device, in rich control where the target air-fuel ratio is set to the rich set air-fuel ratio TAFrich, switches the target air-fuel ratio to the lean set air-fuel ratio TAFlean when the air-fuel ratio which is detected by the the downstream side air-fuel ratio sensor 41 reaches a rich judged air-fuel ratio which is richer than the stoichiometric air-fuel ratio and, in lean control where the target air-fuel ratio is set to the lean set air-fuel ratio TAFlean, switches the target air-fuel ratio to the rich set air-fuel ratio TAFrich when it is estimated that the oxygen storage amount of the upstream side exhaust purification catalyst 20 has reached a reference oxygen storage amount which is smaller than the maximum oxygen storage amount. In this case, the oxygen storage amount of the upstream side exhaust purification catalyst 20 is calculated based on the air-fuel ratio which is detected by the upstream side air-fuel ratio sensor 40 when the scavenging amount is a reference blow-through amount or less and is calculated based on the current target air-fuel ratio when the scavenging amount is larger than the reference blow-through amount.

Note that, the air-fuel ratio control device, in lean control, switches the target air-fuel ratio to the rich set air-fuel ratio TAFrich when the air-fuel ratio which is detected by the downstream side air-fuel ratio sensor 41 reaches the lean judged air-fuel ratio if the air-fuel ratio which is detected by the downstream side air-fuel ratio sensor 41 reaches a lean judged air-fuel ratio which is leaner than the stoichiometric air-fuel ratio before it is estimated that the oxygen storage amount of the upstream side exhaust purification catalyst 20 has reached the reference oxygen storage amount.

Figure 12:
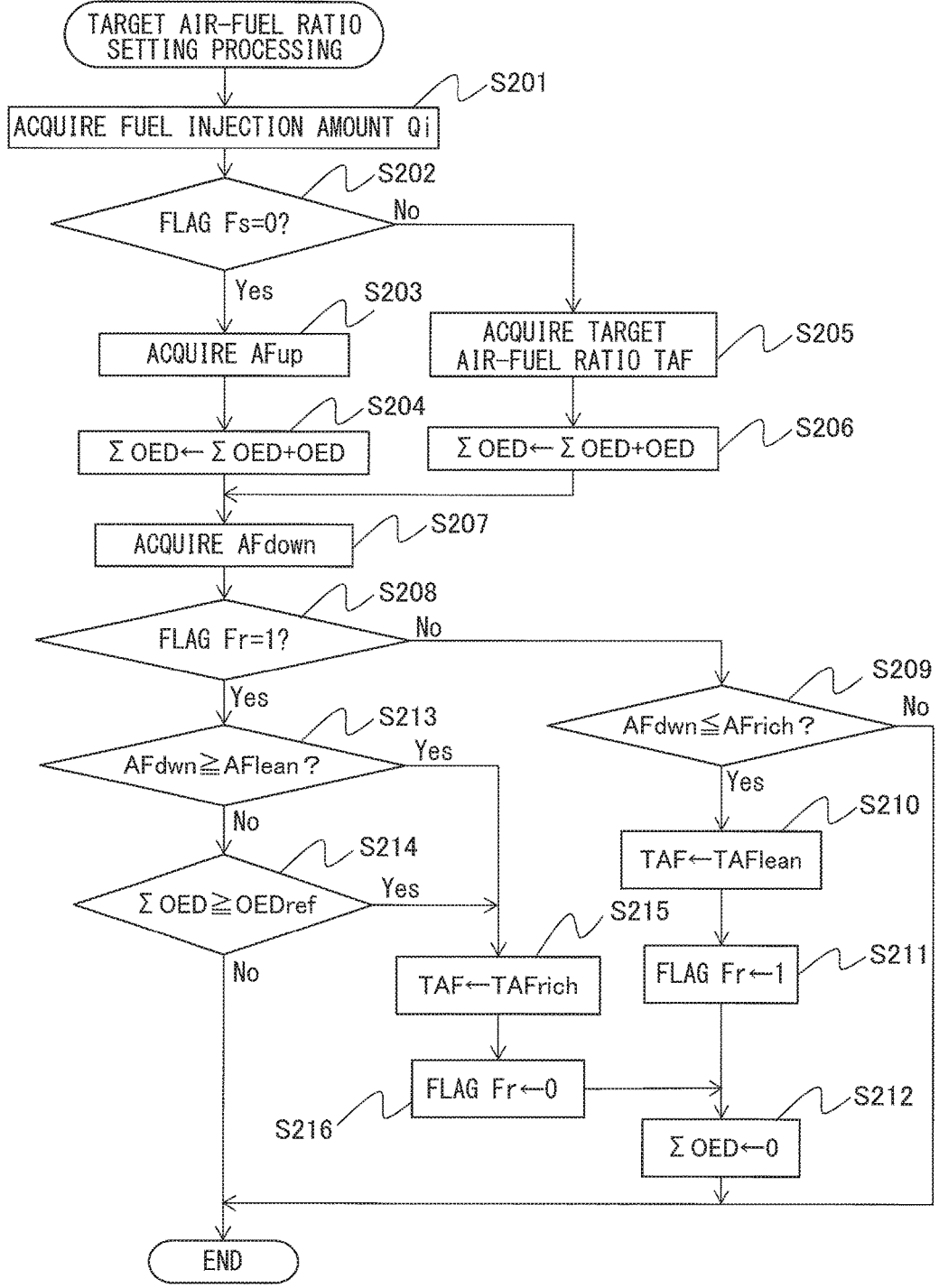
FIG. 12 is a flow chart which shows a control routine of processing for setting a target air-fuel ratio in the first embodiment of the present invention.

FIG. 12 is a flow chart which shows a control routine of processing for setting a target air-fuel ratio in a first embodiment of the present invention. The illustrated control routine is performed by interruption at certain time intervals.

First, at step S201, the fuel injection amount Qi is acquired. Next, at step S202, it is judged if a scavenging judgment flag Fs is set to zero. The scavenging judgment flag Fs is a flag which is set in a later explained scavenging judgment processing. It is set to zero when the scavenging amount is the reference blow-through amount or less, while is set to "1" when the scavenging amount is larger than the reference blow-through amount. If it is judged that the scavenging judgment flag Fs is set to zero, the routine proceeds to step S203.

At step S203, the output air-fuel ratio AFup of the upstream side air-fuel ratio sensor 40 is acquired. Next, at step S204, the cumulative oxygen excess/deficiency ΣOED of the upstream side exhaust purification catalyst 20 is increased by the current oxygen excess/deficiency OED. The current oxygen excess/deficiency OED is calculated by the above formula (1) based on the output air-fuel ratio AFup of the upstream side air-fuel ratio sensor 40 etc. After step S204, the present control routine proceeds to step S207.

On the other hand, if, at step S202, it is judged that the scavenging judgment flag Fs is set to "1", the routine proceeds to step S205. At step S205, the current target air-fuel ratio TAF of the inflowing exhaust gas is acquired. Next, at step S206, the cumulative oxygen excess/deficiency ΣOED of the upstream side exhaust purification catalyst 20 is increased by the current oxygen excess/deficiency OED. The current oxygen excess/deficiency OED is calculated by the following formula (6) based on the current target air-fuel ratio TAF of the inflowing exhaust gas etc.

$$OED = 0.23 \times (TAF - AFR) \times Qi \tag{6}$$

Here, 0.23 is the concentration of oxygen in the air, Qi is the fuel injection amount, and AFR is the air-fuel ratio forming the center of control (in the present embodiment, stoichiometric air-fuel ratio (14.6)). After step S206, the present control routine proceeds to step S207.

At step S207, the output air-fuel ratio AFdwn of the downstream side air-fuel ratio sensor 41 is acquired. Next, at step S208, it is judged if the lean set flag Fr is set to zero. Note that, the lean set flag Fr is a flag which is set to "1" if the target air-fuel ratio TAF is set to the lean set air-fuel ratio TAFlean and is set to zero if the target air-fuel ratio TAF is set to the rich set air-fuel ratio TAFrich. When, at step S207, it is judged that the lean set flag Fr is set to zero, that is, when the target air-fuel ratio TAF is set to the rich set air-fuel ratio TAFrich, the routine proceeds to step S209.

At step S209, it is judged if the output air-fuel ratio AFdwn of the downstream side air-fuel ratio sensor 41 is the predetermined rich judged air-fuel ratio AFrich or less. The rich judged air-fuel ratio AFrich is a predetermined air-fuel ratio which is slightly richer than the stoichiometric air-fuel ratio (for example, 14.55).

At step S209, when it is judged that the output air-fuel ratio AFdwn of the downstream side air-fuel ratio sensor 41 is larger than the rich judged air-fuel ratio AFrich, the present control routine is ended. In this case, the target air-fuel ratio TAF is maintained at the rich set air-fuel ratio TAFrich.

On the other hand, at step S209, when it is judged that the output air-fuel ratio AFdwn of the downstream side air-fuel ratio sensor 41 is the rich judged air-fuel ratio AFrich or less, that is, when the output air-fuel ratio AFdwn of the downstream side air-fuel ratio sensor 41 reaches the rich judged air-fuel ratio AFrich, the routine proceeds to step S210. At step S210, the target air-fuel ratio TAF is set to the lean set air-fuel ratio TAFlean. Therefore, the target air-fuel ratio TAF is switched from the rich set air-fuel ratio TAFrich to the lean set air-fuel ratio TAFlean. The lean set air-fuel ratio TAFlean is a predetermined air-fuel ratio which is leaner to a certain extent than the stoichiometric air-fuel ratio. For example, it is made 14.65 to 20, preferably 14.68 to 18, more preferably 14.7 to 16 or so.

After step S210, at step S211, the lean set flag Fr is set to "1". Next, at step S212, the cumulative oxygen excess/deficiency ΣOED is reset and made zero. After that, the present control routine is ended.

On the other hand, at step S208, when it is judged that the lean set flag Fr is set to "1", that is, when the target air-fuel ratio TAF is set to the lean set air-fuel ratio TAFlean, the routine proceeds to step S213.

At step S213, it is judged if the output air-fuel ratio AFdwn of the downstream side air-fuel ratio sensor 41 is the predetermined lean judged air-fuel ratio AFlean or more. The lean judged air-fuel ratio AFlean is a predetermined air-fuel ratio which is slightly leaner than the stoichiometric air-fuel ratio (for example, 14.65).

At step S213, when it is judged that the output air-fuel ratio AFdwn of the downstream side air-fuel ratio sensor 41 is smaller than the lean judged air-fuel ratio AFlean, the routine proceeds to step S214. At step S214, it is judged if the cumulative oxygen excess/deficiency ΣOED of the upstream side exhaust purification catalyst 20 is the predetermined switching reference value OEDref or more. At step S214, when it is judged that the cumulative oxygen excess/deficiency ΣOED of the upstream side exhaust purification catalyst 20 is smaller than the switching reference value OEDref, the present control routine is ended. In this case, the target air-fuel ratio TAF is maintained at the lean set air-fuel ratio TAFlean.

On the other hand, at step S214, when it is judged that the cumulative oxygen excess/deficiency ΣOED of the upstream side exhaust purification catalyst 20 is the switching reference value OEDref or more, that is, when it is estimated that the oxygen storage amount of the upstream side exhaust purification catalyst 20 has reached a reference oxygen storage amount which is smaller than the maximum oxygen storage amount, the routine proceeds to step S215. At step S215, the target air-fuel ratio TAF is set to the rich set air-fuel ratio TAFrich. Therefore, the target air-fuel ratio TAF is switched from the lean set air-fuel ratio TAFlean to the rich set air-fuel ratio TAFrich. Next, at step S216, the lean set flag Fr is set to zero. Next, at step S212, the cumulative oxygen excess/deficiency ΣOED of the upstream side exhaust purification catalyst 20 is reset and made zero. After that, the present control routine is ended.

On the other hand, at step S213, when it is judged that the output air-fuel ratio AFdwn of the downstream side air-fuel ratio sensor 41 is the lean judged air-fuel ratio AFlean or more, that is, when the output air-fuel ratio AFdwn of the downstream side air-fuel ratio sensor 41 reaches the lean judged air-fuel ratio AFlean, the routine proceeds to step S215. At step S215, the target air-fuel ratio TAF is set to the rich set air-fuel ratio TAFrich. Therefore, the target air-fuel ratio TAF is switched from the lean set air-fuel ratio TAFlean to the rich set air-fuel ratio TAFrich.

Note that, in ordinary air-fuel ratio control, the target air-fuel ratio TAF is switched from the lean set air-fuel ratio TAFlean to the rich set air-fuel ratio TAFrich when the cumulative oxygen excess/deficiency ΣOED of the upstream side exhaust purification catalyst 20 reaches the switching reference value OEDref. However, if deviation occurs between the oxygen storage amount of the upstream side exhaust purification catalyst 20 which is estimated from the cumulative oxygen excess/deficiency ΣOED of the upstream side exhaust purification catalyst 20, and the actual oxygen storage amount of the upstream side exhaust purification catalyst 20, sometimes the output air-fuel ratio AFdwn of the downstream side air-fuel ratio sensor 41 will reach the lean judged air-fuel ratio AFlean before the cumulative oxygen excess/deficiency ΣOED of the upstream side exhaust purification catalyst 20 reaches the switching reference value OEDref. In this case, the target air-fuel ratio TAF is switched from the lean set air-fuel ratio TAFlean to the rich set air-fuel ratio TAFrich when the output air-fuel ratio AFdwn of the downstream side air-fuel ratio sensor 41 reaches the lean judged air-fuel ratio AFlean. Due to this, even when deviation occurs between the oxygen storage amount of the upstream side exhaust purification catalyst 20 which is estimated from the cumulative oxygen excess/deficiency ΣOED of the upstream side exhaust purification catalyst 20, and the actual oxygen storage amount of the upstream side exhaust purification catalyst 20, it is possible to more reliably suppress deterioration of exhaust emissions, in particular, deterioration of exhaust emissions accompanying occurrence of scavenging.

<Scavenging Judgment Processing>

Figure 13:
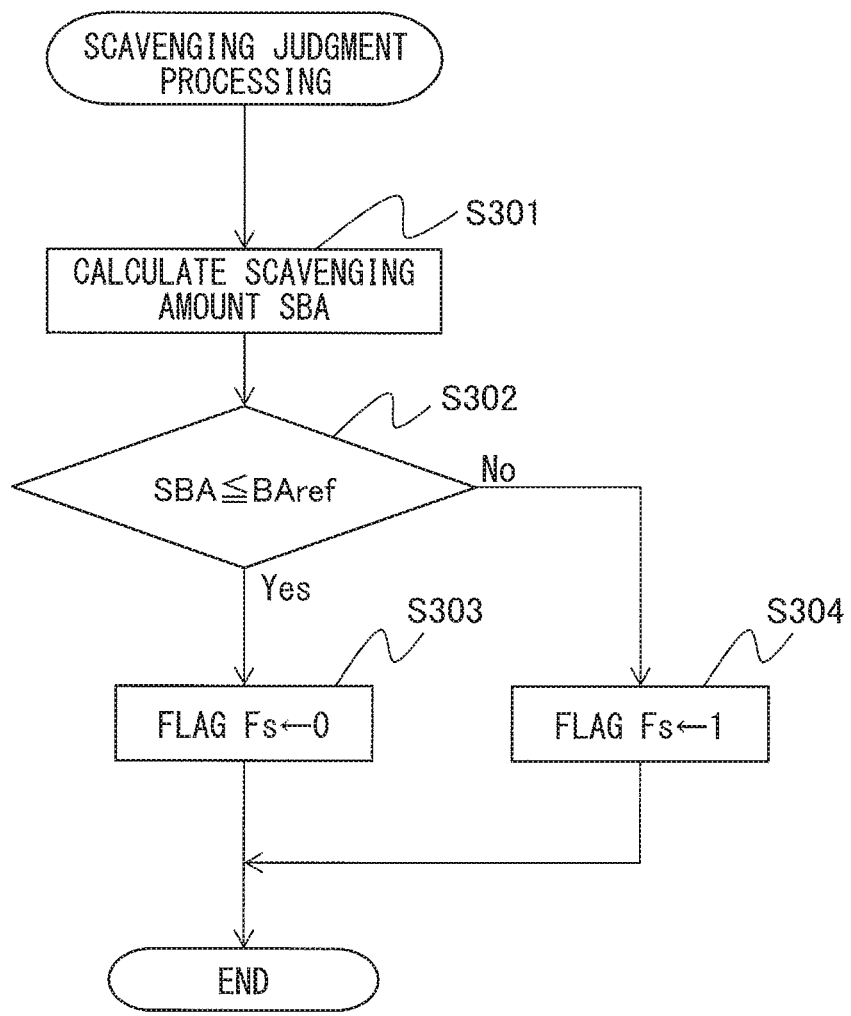
FIG. 13 is a flow chart which shows a control routine of scavenging judgment processing in the first embodiment of the present invention.

FIG. 13 is a flow chart which shows a control routine of scavenging judgment processing in the first embodiment of the present invention. The illustrated control routine is performed by interruption at certain time intervals.

First, at step S301, the scavenging amount SBA is calculated. The scavenging amount SBA is, for example, calculated based on the amount of valve overlap of the intake valve 6 and the exhaust valve 8, and the differential pressure of the intake pressure and the exhaust pressure. The amount of valve overlap is, for example, calculated based on the closing timing of the exhaust valve 8 which is changed by controlling the variable valve timing mechanism C and the opening timing of the intake valve 6 which is changed by controlling the variable valve timing mechanism B.

The intake pressure is, for example, directly detected by the supercharging pressure sensor 50 or is calculated by known model calculations based on the output of the intake temperature sensor which is provided at the intake passage at the downstream side of the throttle valve 18, the output of the air flowmeter 16, the opening degree of the throttle valve 18, etc. The exhaust pressure may, for example, be directly detected by an exhaust pressure sensor which is provided at the exhaust manifold 19 or may be calculated based on a map which is shown as a function of the engine speed and the intake pressure. Specifically, in the map, the exhaust pressure is shown as becoming higher as the the engine speed increases, and is shown as becoming higher as the intake pressure increases.

Further, the scavenging amount SBA may be calculated based on the map which is shown as a function of the amount of valve overlap and the differential pressure of the intake pressure and the exhaust pressure. Specifically, in the map, the scavenging amount SBA is shown as becoming greater the larger the amount of valve overlap and is shown as becoming greater the larger the differential pressure between the intake pressure and the exhaust pressure.

Next, at step S302, it is judged if the scavenging amount SBA which was calculated at step S301 is a predetermined reference blow-through amount BAref or less. When it is judged that the scavenging amount SBA is the reference blow-through amount BAref or less, the routine proceeds to step S303. At step S303, the scavenging judgment flag Fs is set to zero. After that, the present control routine is ended. The reference blow-through amount BAref is made an upper limit value of the amount where occurrence of scavenging will not cause the output of the upstream side air-fuel ratio sensor 40 to deviate to the rich side. Note that, the reference blow-through amount BAref may also be zero. By making the reference blow-through amount BAref zero, it is possible to more reliably suppress deterioration of the exhaust emissions along with the occurrence of scavenging.

On the other hand, at step S302, when it is judged that the scavenging amount SBA is greater than the reference blow-through amount BAref, the routine proceeds to step S304. At step S304, the scavenging judgment flag Fs is set to "1". After that, the present control routine is ended.

<Second Embodiment>

Next, referring to FIG. 14 to FIG. 17, a second embodiment of the present invention will be explained. Note that, the configuration and control of the internal combustion engine of the second embodiment are basically similar to the internal combustion engine of the first embodiment, so in the following explanation, mainly parts different from the first embodiment will be explained.

In the second embodiment, the air-fuel ratio control device sets the target air-fuel ratio of inflowing exhaust gas to any one of a rich set air-fuel ratio which is richer than the stoichiometric air-fuel ratio, a weakly rich set air-fuel ratio which is richer than the stoichiometric air-fuel ratio and is closer to the stoichiometric air-fuel ratio than the rich set air-fuel ratio, a lean set air-fuel ratio which is leaner than the stoichiometric air-fuel ratio, and a weakly lean set air-fuel ratio which is leaner than the stoichiometric air-fuel ratio and is closer to the stoichiometric air-fuel ratio than the lean set air-fuel ratio.

Further, the air-fuel ratio control device, in rich control where the target air-fuel ratio is set to a rich set air-fuel ratio, switches the target air-fuel ratio to the weakly rich set air-fuel ratio when it is estimated that the oxygen storage amount of the upstream side exhaust purification catalyst 20 has reached a first reference oxygen storage amount which is smaller than the maximum oxygen storage amount. The air-fuel ratio control device, in weakly rich control where the target air-fuel ratio is set to the weakly rich set air-fuel ratio, switches the target air-fuel ratio to the lean set air-fuel ratio when the air-fuel ratio which was detected by the downstream side air-fuel ratio sensor 41 reaches the rich judged air-fuel ratio. The air-fuel ratio control device, in lean control where the target air-fuel ratio is set to the lean set air-fuel ratio, switches the target air-fuel ratio to the weakly lean set air-fuel ratio when it is estimated that the oxygen storage amount of the upstream side exhaust purification catalyst 20 has reached a second reference oxygen storage amount which is smaller than the maximum oxygen storage amount. The air-fuel ratio control device, in weakly lean control where the target air-fuel ratio is set to the weakly lean set air-fuel ratio, switches the target air-fuel ratio to the rich set air-fuel ratio when the air-fuel ratio which was detected by the downstream side air-fuel ratio sensor 41 has reached the lean judged air-fuel ratio.

In this case, the oxygen storage amount of the upstream side exhaust purification catalyst 20 is calculated based on the air-fuel ratio which is detected by the upstream side air-fuel ratio sensor 40 when the scavenging amount is the reference blow-through amount or less, and is calculated based on the current target air-fuel ratio when the scavenging amount is greater than the reference blow-through amount.

Note that, the air-fuel ratio control device, in rich control, switches the target air-fuel ratio to the lean set air-fuel ratio TAFlean when the air-fuel ratio which is detected by the downstream side air-fuel ratio sensor 41 reaches the rich judged air-fuel ratio if the air-fuel ratio which is detected by the downstream side air-fuel ratio sensor 41 reaches the rich judged air-fuel ratio before it is estimated that the oxygen storage amount of the upstream side exhaust purification catalyst 20 has reached the first reference oxygen storage amount. The air-fuel ratio control device, in lean control, switches the target air-fuel ratio to the rich set air-fuel ratio TAFrich when the air-fuel ratio which is detected by the downstream side air-fuel ratio sensor 41 reaches the lean judged air-fuel ratio if the air-fuel ratio which is detected by the downstream side air-fuel ratio sensor 41 reaches the lean judged air-fuel ratio before it is estimated that the oxygen storage amount of the upstream side exhaust purification catalyst 20 has reached the second reference oxygen storage amount.

<Explanation of Control Using Time Chart>

Figure 14:
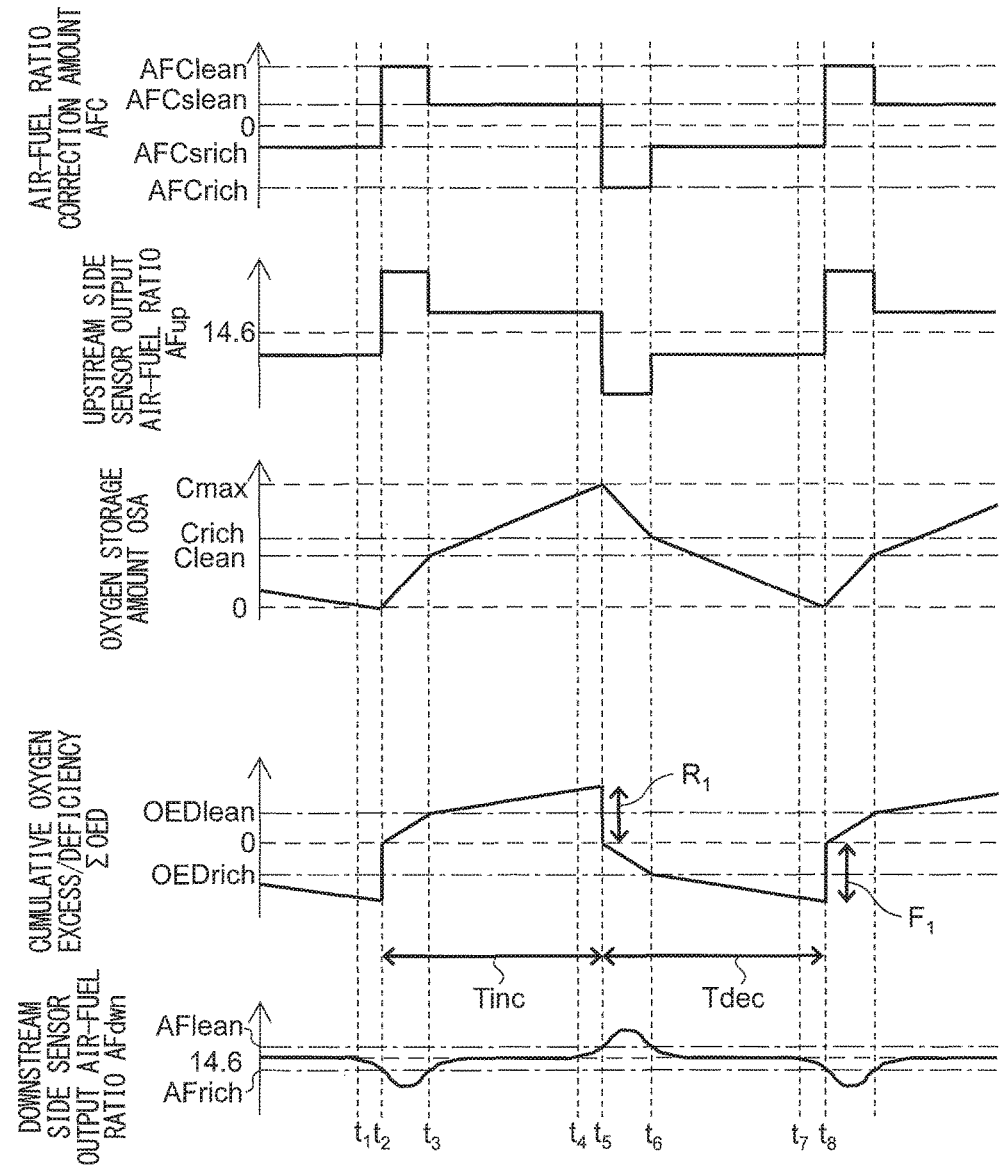
FIG. 14 is a time chart of an air-fuel ratio correction amount etc. relating to the target air-fuel ratio.

Referring to FIG. 14, the above-mentioned operation will be specifically explained. FIG. 14 is a time chart of the air-fuel ratio correction amount AFC, the output air-fuel ratio AFup of the upstream side air-fuel ratio sensor 40, the oxygen storage amount OSA of the upstream side exhaust purification catalyst 20, the cumulative oxygen excess/deficiency ΣOED, and the output air-fuel ratio AFdwn of the downstream side air-fuel ratio sensor 41, in the case of performing basic air-fuel ratio control by the air-fuel ratio control device of an internal combustion engine according to a second embodiment of the present invention.

In the illustrated example, in the state before the time $t_1$, the air-fuel ratio correction amount AFC is set to the weakly rich set correction amount AFCsrich (corresponding to weakly rich set air-fuel ratio). That is, the target air-fuel ratio is set to the rich air-fuel ratio. Along with this, the output air-fuel ratio of the upstream side air-fuel ratio sensor 40 becomes the rich air-fuel ratio. The unburned gas, which is contained in the inflowing exhaust gas, is purified by the upstream side exhaust purification catalyst 20. Along with this, the oxygen storage amount OSA of the upstream side exhaust purification catalyst 20 gradually decreases. On the other hand, due to purification at the upstream side exhaust purification catalyst 20, the outflowing exhaust gas does not contain unburned gas, and therefore the output air-fuel ratio AFdwn of the downstream side air-fuel ratio sensor 41 becomes substantially the stoichiometric air-fuel ratio.

If the oxygen storage amount OSA of the upstream side exhaust purification catalyst 20 gradually decreases, the oxygen storage amount OSA approaches zero at the time $t_1$. Along with this, part of the unburned gas flowing into the upstream side exhaust purification catalyst 20 starts to flow out without being purified by the upstream side exhaust purification catalyst 20. Due to this, after the time $t_1$, the output air-fuel ratio AFdwn of the downstream side air-fuel ratio sensor 41 gradually falls. As a result, in the illustrated example, at the time $t_2$, the oxygen storage amount OSA becomes substantially zero and the output air-fuel ratio AFdwn of the downstream side air-fuel ratio sensor 41 reaches the rich judged air-fuel ratio AFrich.

In the present embodiment, when the output air-fuel ratio AFdwn of the downstream side air-fuel ratio sensor 41 becomes the rich judged air-fuel ratio AFrich or less, in order to make the oxygen storage amount OSA increase, the air-fuel ratio correction amount AFC is switched to the lean set correction amount AFClean (corresponding to lean set air-fuel ratio). Therefore, the target air-fuel ratio is switched from the rich air-fuel ratio to the lean air-fuel ratio.

If switching the target air-fuel ratio to the lean air-fuel ratio at the time $t_2$, the air-fuel ratio of the inflowing exhaust gas changes from the rich air-fuel ratio to the lean air-fuel ratio. Further, along with this, the output air-fuel ratio AFup of the upstream side air-fuel ratio sensor 40 becomes the lean air-fuel ratio. After the air-fuel ratio of the inflowing exhaust gas changes to the lean air-fuel ratio at the time $t_2$, the oxygen storage amount OSA of the upstream side exhaust purification catalyst 20 increases.

If the oxygen storage amount OSA of the upstream side exhaust purification catalyst 20 increases in this way, the air-fuel ratio of the outflowing exhaust gas changes toward the stoichiometric air-fuel ratio. In the example shown in FIG. 14, at the time $t_3$, the cumulative oxygen excess/deficiency ΣOED of the upstream side exhaust purification catalyst 20 becomes greater than a weakly lean switching reference value OEDlean. This means that the oxygen storage amount OSA of the upstream side exhaust purification catalyst 20 has become larger by a certain extent.

Therefore, in the present embodiment, when the cumulative oxygen excess/deficiency ΣOED of the upstream side exhaust purification catalyst 20 becomes greater than the weakly lean switching reference value OEDlean, that is, when it is estimated that the oxygen storage amount OSA of the upstream side exhaust purification catalyst 20 becomes greater than a weakly lean switching reference storage amount Clean, the air-fuel ratio correction amount AFC is switched to the weakly lean set correction amount AFCslean (corresponding to weakly lean set air-fuel ratio). Therefore, at the time $t_3$, the lean degree of the target air-fuel ratio falls. Below, the time $t_3$ will be referred to as the "lean degree change timing".

At the lean degree change timing of the time $t_3$, if switching the air-fuel ratio correction amount AFC to the weakly lean set correction amount AFCslean, the lean degree of the exhaust gas flowing into the upstream side exhaust purification catalyst 20 also becomes smaller. Along with this, the output air-fuel ratio AFup of the upstream side air-fuel ratio sensor 40 becomes smaller and the speed of increase of the oxygen storage amount OSA of the upstream side exhaust purification catalyst 20 falls.

After the time $t_3$, the oxygen storage amount OSA of the upstream side exhaust purification catalyst 20 gradually increases, through the speed of increase is slow. If the oxygen storage amount OSA of the upstream side exhaust purification catalyst 20 gradually increases, the oxygen storage amount OSA will finally approach the maximum storable oxygen amount Cmax. If at the time $t_4$ the oxygen storage amount OSA approaches the maximum storable oxygen amount Cmax, part of the oxygen flowing into the upstream side exhaust purification catalyst 20 will start to flow out without being stored at the upstream side exhaust purification catalyst 20. Due to this, the output air-fuel ratio AFdwn of the downstream side air-fuel ratio sensor 41 will gradually rise. As a result, in the illustrated example, at the time $t_5$, the oxygen storage amount OSA reaches the maximum storable oxygen amount Cmax and the output air-fuel ratio AFdwn of the downstream side air-fuel ratio sensor 41 reaches the lean judged air-fuel ratio AFlean.

In the present embodiment, if the output air-fuel ratio AFdwn of the downstream side air-fuel ratio sensor 41 becomes the lean judged air-fuel ratio AFlean or more, the air-fuel ratio correction amount AFC is switched to the rich set correction amount AFCrich so as to make the oxygen storage amount OSA decrease. Therefore, the target air-fuel ratio is switched from the lean air-fuel ratio to the rich air-fuel ratio.

If, at the time $t_5$, the target air-fuel ratio is switched to the rich air-fuel ratio, the air-fuel ratio of the inflowing exhaust gas changes from the lean air-fuel ratio to the rich air-fuel ratio. Further, along with this, the output air-fuel ratio AFup of the upstream side air-fuel ratio sensor 40 becomes the rich air-fuel ratio If, at the time $t_5$, the air-fuel ratio of the inflowing exhaust gas changes to the rich air-fuel ratio, the oxygen storage amount OSA of the upstream side exhaust purification catalyst 20 decreases.

If the oxygen storage amount OSA of the upstream side exhaust purification catalyst 20 decreases in this way, the air-fuel ratio of the exhaust gas flowing out from the upstream side exhaust purification catalyst 20 changes toward the stoichiometric air-fuel ratio. In the example shown in FIG. 5, at the time $t_6$, the cumulative oxygen excess/deficiency ΣOED of the upstream side exhaust purification catalyst 20 becomes smaller than a weakly rich switching reference value OEDrich. This means that the oxygen storage amount OSA of the upstream side exhaust purification catalyst 20 has become smaller by a certain extent.

Therefore, in the present embodiment, when the cumulative oxygen excess/deficiency ΣOED of the upstream side exhaust purification catalyst 20 becomes smaller than the weakly rich switching reference value OEDrich, that is, when it is estimated that the oxygen storage amount OSA of the upstream side exhaust purification catalyst 20 becomes smaller than a weakly rich switching reference storage amount Crich, the air-fuel ratio correction amount AFC is switched from the rich set correction amount AFCrich to the weakly rich set correction amount AFCsrich (corresponding to weakly rich set air-fuel ratio).

If, at the time $t_6$, the air-fuel ratio correction amount AFC is switched to the weakly rich set correction amount AFCsrich, the rich degree of the air-fuel ratio of the exhaust gas flowing into the upstream side exhaust purification catalyst 20 also becomes smaller. Along with this, the output air-fuel ratio AFup of the upstream side air-fuel ratio sensor 40 increases and the speed of decrease of the oxygen storage amount OSA of the upstream side exhaust purification catalyst 20 falls.

After the time $t_6$, the oxygen storage amount OSA of the upstream side exhaust purification catalyst 20 gradually decreases, though the speed of decrease is slow. If the oxygen storage amount OSA of the upstream side exhaust purification catalyst 20 gradually decreases, the oxygen storage amount OSA finally approaches zero at the time $t_7$ in the same way as the time $t_1$ and decreases to the Cdwnlim of FIG. 4. Then, at the time $t_8$, in the same way as the time $t_2$, the output air-fuel ratio AFdwn of the downstream side air-fuel ratio sensor 41 reaches the rich judged air-fuel ratio AFrich. After that, an operation similar to the operation of the times $t_1$ to $t_6$ is repeated.

Further, in the present embodiment, while the above-mentioned cycle of the times $t_1$ to $t_5$ is repeated, the amount of fuel which is fed to the combustion chamber 5 is controlled by feedback so that the output air-fuel ratio AFup of the upstream side air-fuel ratio sensor 40 becomes the target air-fuel ratio. For example, when the output air-fuel ratio AFup of the upstream side air-fuel ratio sensor 40 is lower than the target air-fuel ratio (is rich), the amount of fuel which is fed to the combustion chamber 5 is made smaller. On the other hand, when the output air-fuel ratio AFup of the upstream side air-fuel ratio sensor 40 is higher than the target air-fuel ratio (is lean), the amount of fuel which is fed to the combustion chamber 5 is made greater.

As explained in the first embodiment, if deviation occurs between the output air-fuel ratio of the upstream side air-fuel ratio sensor 40 and the actual air-fuel ratio of the inflowing exhaust gas, even if performing the above air-fuel ratio control, the exhaust emissions are liable to deteriorate. Therefore, in the second embodiment as well, in the same way as the first embodiment, learning control is performed during normal operation so as to compensate for the deviation in the output air-fuel ratio of the upstream side air-fuel ratio sensor 40. In the learning control in the second embodiment, the learning value sfbg is updated using the above formula (2) based on the difference ΔΣOED (for example $R_1-F_1$) between the absolute value of the cumulative oxygen excess/deficiency ΣOED in the oxygen increasing time period Tinc (for example, $R_1$ in FIG. 14) and the absolute value of the cumulative oxygen excess/deficiency ΣOED in the oxygen decreasing time period Tdec (for example, $F_1$ in FIG. 14). The learning control in the second embodiment is similar to the learning control in the first embodiment, so the explanation will be omitted.

In this regard, as explained in the first embodiment, if scavenging is caused, the exhaust emissions are liable to deteriorate. Therefore, in the second embodiment as well, in the same way as the first embodiment, the control routine of the air-fuel ratio control which is shown in FIG. 11 is performed so as to suppress deterioration of the exhaust emissions along with the occurrence of scavenging. Further, in the same way as the first embodiment, the control routine of the scavenging judgment processing which is shown in FIG. 13 is performed so as to judge if the scavenging amount is the reference blow-through amount or less.

<Processing for Setting Target Air-Fuel Ratio>

Figure 15:
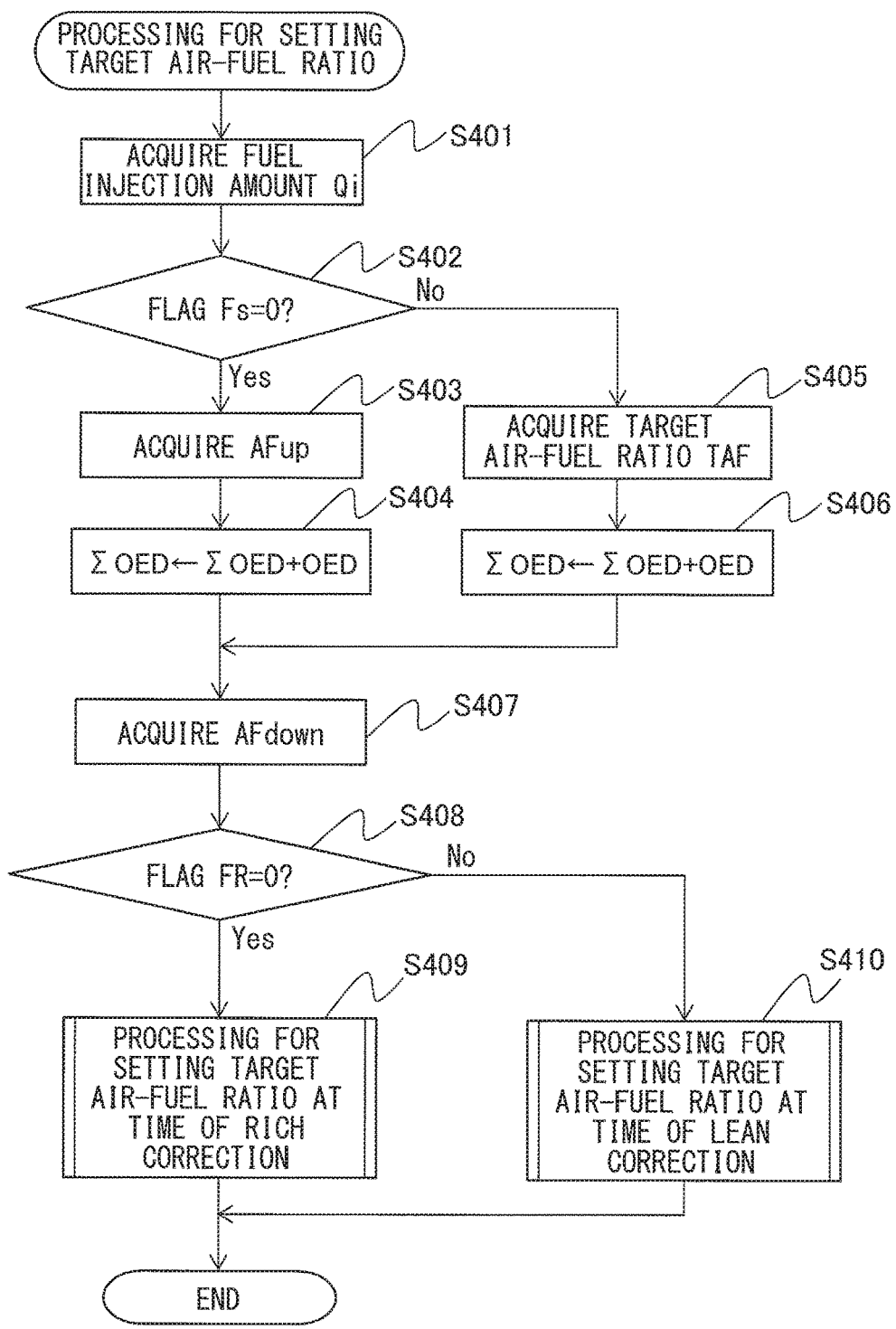
FIG. 15 is a flow chart which shows a control routine of processing for setting the target air-fuel ratio in a second embodiment of the present invention.

FIG. 15 is a flow chart which shows a control routine of processing for setting a target air-fuel ratio in the second embodiment of the present invention. The illustrated control routine is performed by interruption at certain time intervals. Step S401 to step S407 in FIG. 15 are similar to step S201 to step S207 in FIG. 12, so the explanation will be omitted.

After step S407, at step S408, it is judged if the lean set flag Fr is set to zero. Note that, the lean set flag Fr is a flag which is set to "1" when the target air-fuel ratio TAF is set to the lean set air-fuel ratio TAFlean and is set to zero when the target air-fuel ratio TAF is set to the rich set air-fuel ratio TAFrich.

At step S408, when it is judged that the lean set flag Fr is set to "1", that is, when the target air-fuel ratio TAF is set to the lean set air-fuel ratio TAFlean or weakly lean set air-fuel ratio TAFslean, the routine proceeds to step S410. At step S410, the later explained processing for setting a target air-fuel ratio at the time of lean correction is performed. On the other hand, at step S408, when it is judged that the lean set flag Fr is set to zero, that is, when the target air-fuel ratio TAF is set to the rich set air-fuel ratio TAFrich or weakly rich set air-fuel ratio TAFsrich, the routine proceeds to step S409. At step S409, the later explained processing for setting a target air-fuel ratio at the time of rich correction is performed.

Figure 16:
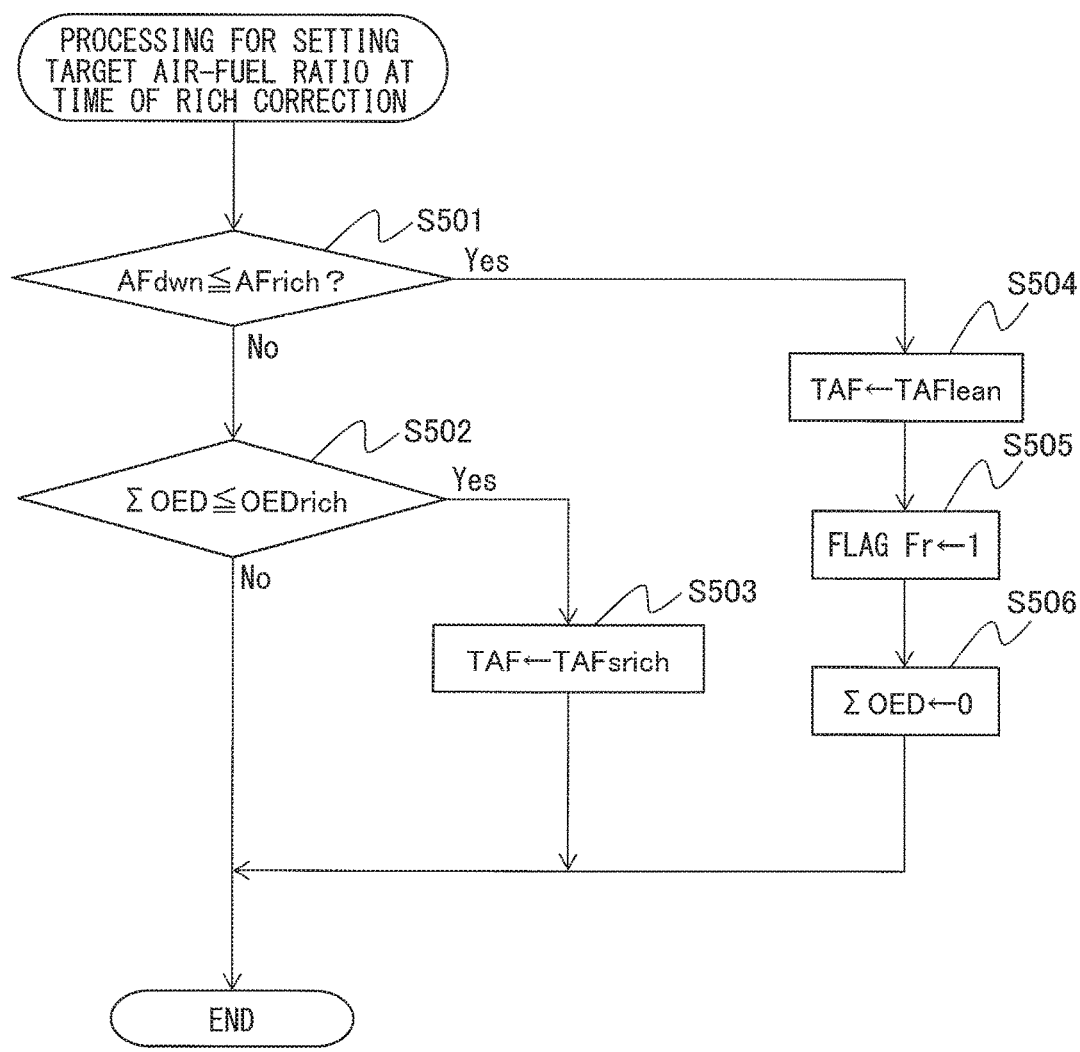
FIG. 16 is a flow chart which shows a control routine of processing for setting the target air-fuel ratio at the time of rich correction in the second embodiment of the present invention.

FIG. 16 is a flow chart which shows a control routine of processing for setting a target air-fuel ratio at the time of rich correction in the second embodiment of the present invention.

First, at step S501, it is judged if the output air-fuel ratio AFdwn of the downstream side air-fuel ratio sensor 41 is a predetermined rich judged air-fuel ratio AFrich or less. The rich judged air-fuel ratio AFrich is a predetermined air-fuel ratio which is slightly richer than the stoichiometric air-fuel ratio (for example, 14.55).

At step S501, when it is judged that the output air-fuel ratio AFdwn of the downstream side air-fuel ratio sensor 41 is larger than the rich judged air-fuel ratio AFrich, the routine proceeds to step S502. At step S502, it is judged if the cumulative oxygen excess/deficiency ΣOED of the upstream side exhaust purification catalyst 20 is a predetermined weakly rich switching reference value OEDrich or less. At step S502, when it is judged that the cumulative oxygen excess/deficiency ΣOED of the upstream side exhaust purification catalyst 20 is greater than the weakly rich switching reference value OEDrich, the present control routine is ended. Therefore, the target air-fuel ratio TAF is maintained at the rich set air-fuel ratio TAFrich.

On the other hand, at step S502, when it is judged that the cumulative oxygen excess/deficiency ΣOED of the upstream side exhaust purification catalyst 20 is the weakly rich switching reference value OEDrich or less, that is, when it is estimated that the oxygen storage amount of the upstream side exhaust purification catalyst 20 has reached a first reference oxygen storage amount which is smaller than the maximum oxygen storage amount, the routine proceeds to step S503. At step S503, the target air-fuel ratio TAF is set to the weakly rich set air-fuel ratio TAFsrich. Therefore, the target air-fuel ratio TAF is switched from the rich set air-fuel ratio TAFrich to the weakly rich set air-fuel ratio TAFsrich or is maintained at the weakly rich set air-fuel ratio TAFsrich. The weakly rich set air-fuel ratio TAFsrich is a rich air-fuel ratio with a smaller rich degree than the rich set air-fuel ratio TAFrich (smaller difference from stoichiometric air-fuel ratio). For example, it is made 13.5 to 14.58, preferably 14 to 14.57, more preferably 14.3 to 14.55 or so. After that, the present control routine is ended.

On the other hand, at step S501, when it is judged that the output air-fuel ratio AFdwn of the downstream side air-fuel ratio sensor 41 is the rich judged air-fuel ratio AFrich or less, that is, when the output air-fuel ratio AFdwn of the downstream side air-fuel ratio sensor 41 reaches the rich judged air-fuel ratio AFrich, the routine proceeds to step S504. At step S504, the target air-fuel ratio TAF is set to the lean set air-fuel ratio TAFlean. Therefore, the target air-fuel ratio TAF is switched from the weakly rich set air-fuel ratio TAFsrich or rich set air-fuel ratio TAFrich to the lean set air-fuel ratio TAFlean. The lean set air-fuel ratio TAFlean is a predetermined air-fuel ratio which is leaner by a certain extent than the stoichiometric air-fuel ratio (air-fuel ratio forming center of control). For example, it is made 14.65 to 20, preferably 14.65 to 18, more preferably 14.65 to 16 or so.

Note that, in normal air-fuel ratio control, the target air-fuel ratio TAF is switched from the rich set air-fuel ratio TAFrich through the weakly rich set air-fuel ratio TAFsrich to the lean set air-fuel ratio TAFlean. However, if deviation occurs between the oxygen storage amount of the upstream side exhaust purification catalyst 20 which is estimated from the cumulative oxygen excess/deficiency ΣOED of the upstream side exhaust purification catalyst 20 and the actual oxygen storage amount of the upstream side exhaust purification catalyst 20, sometimes the output air-fuel ratio AFdwn of the downstream side air-fuel ratio sensor 41 reaches the rich judged air-fuel ratio AFrich before the cumulative oxygen excess/deficiency ΣOED of the upstream side exhaust purification catalyst 20 reaches the weakly rich switching reference value OEDrich. In this case, target air-fuel ratio TAF is directly switched from the rich set air-fuel ratio TAFrich to the lean set air-fuel ratio TAFlean. Due to this, even if deviation occurs between the oxygen storage amount of the upstream side exhaust purification catalyst 20 which is estimated from the cumulative oxygen excess/deficiency ΣOED of the upstream side exhaust purification catalyst 20 and the actual oxygen storage amount of the upstream side exhaust purification catalyst 20, it is possible to more reliably suppress deterioration of the exhaust emissions, in particular, deterioration of the exhaust emissions accompanying scavenging.

After step S504, at step S505, the lean set flag Fr is set to "1". Next, at step S506, the cumulative oxygen excess/deficiency ΣOED of the upstream side exhaust purification catalyst 20 is reset and becomes zero. After that, the present control routine is ended.

Figure 17:
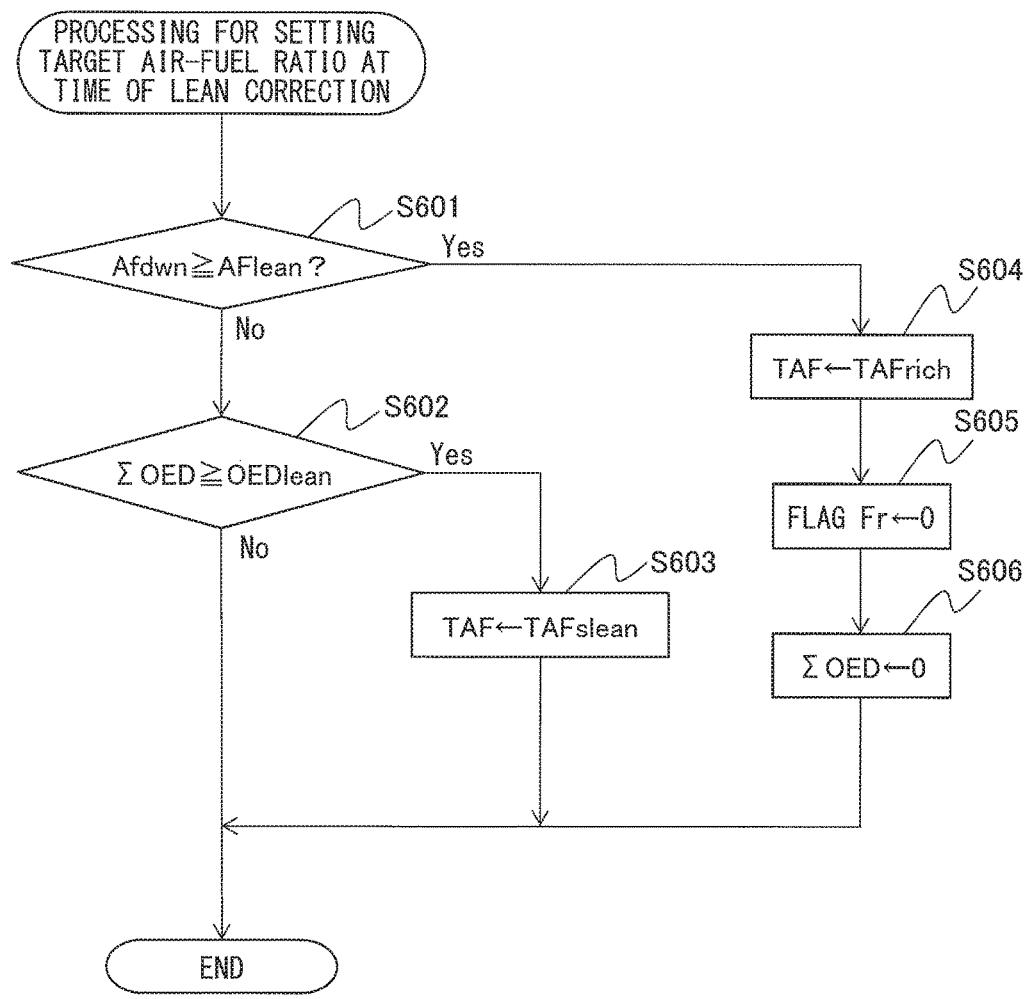
FIG. 17 is a flow chart which shows a control routine of processing for setting a target air-fuel ratio at the time of lean correction in the second embodiment of the present invention.

FIG. 17 is a flow chart which shows a control routine of processing for setting a target air-fuel ratio at the time of lean correction in the second embodiment of the present invention.

First, at step S601, it is judged if the output air-fuel ratio AFdwn of the downstream side air-fuel ratio sensor 41 is the predetermined lean judged air-fuel ratio AFlean or more. The lean judged air-fuel ratio AFlean is a predetermined air-fuel ratio which is slightly leaner than the stoichiometric air-fuel ratio (for example, 14.65).

At step S601, when it is judged that the output air-fuel ratio AFdwn of the downstream side air-fuel ratio sensor 41 is smaller than the lean judged air-fuel ratio AFlean, the routine proceeds to step S602. At step S602, it is judged if the cumulative oxygen excess/deficiency ΣOED of the upstream side exhaust purification catalyst 20 is a predetermined weakly lean switching reference value OEDlean or more. At step S602, when it is judged that the cumulative oxygen excess/deficiency ΣOED of the upstream side exhaust purification catalyst 20 is smaller than the weakly lean switching reference value OEDlean, the present control routine is ended. Therefore, the target air-fuel ratio TAF is maintained at the lean set air-fuel ratio TAFlean.

On the other hand, at step S602, when it is judged that the cumulative oxygen excess/deficiency ΣOED of the upstream side exhaust purification catalyst 20 is the weakly lean switching reference value OEDlean or more, that is, when it is estimated that the oxygen storage amount of the upstream side exhaust purification catalyst 20 reaches the second reference oxygen storage amount which is smaller than the maximum oxygen storage amount, the routine proceeds to step S603. At step S603, the target air-fuel ratio TAF is the weakly lean set air-fuel ratio TAFslean. Therefore, the target air-fuel ratio TAF is switched from the lean set air-fuel ratio TAFlean to the weakly lean set air-fuel ratio TAFslean or maintained at the weakly lean set air-fuel ratio TAFslean. The weakly lean set air-fuel ratio TAFslean is a lean air-fuel ratio with a smaller lean degree than the lean set air-fuel ratio TAFlean (smaller difference from the stoichiometric air-fuel ratio). For example, it is made 14.62 to 15.7, preferably 14.63 to 15.2, more preferably 14.65 to 14.9 or so. After that, the present control routine is ended.

On the other hand, at step S601, when it is judged that the output air-fuel ratio AFdwn of the downstream side air-fuel ratio sensor 41 is the lean judged air-fuel ratio AFlean or more, that is, when the output air-fuel ratio AFdwn of the downstream side air-fuel ratio sensor 41 reaches the lean judged air-fuel ratio AFlean, the routine proceeds to step S604. At step S604, the target air-fuel ratio TAF is set to the rich set air-fuel ratio TAFrich. Therefore, the target air-fuel ratio TAF is switched from the weakly lean set air-fuel ratio TAFslean or lean set air-fuel ratio TAFlean to the rich set air-fuel ratio TAFrich. The rich set air-fuel ratio TAFrich is a predetermined air-fuel ratio which is richer by a certain extent from the stoichiometric air-fuel ratio (air-fuel ratio forming center of control). For example, it is made 10 to 14.55, preferably 12 to 14.52, more preferably 13 to 14.5 or so.

Note that, in normal air-fuel ratio control, the target air-fuel ratio TAF is switched from the lean set air-fuel ratio TAFlean through the weakly lean set air-fuel ratio TAFslean to the rich set air-fuel ratio TAFrich. However, if deviation occurs between the oxygen storage amount of the upstream side exhaust purification catalyst 20 which is estimated from the cumulative oxygen excess/deficiency ΣOED of the upstream side exhaust purification catalyst 20 and the actual oxygen storage amount of the upstream side exhaust purification catalyst 20, sometimes the output air-fuel ratio AFdwn of the downstream side air-fuel ratio sensor 41 will reach the lean judged air-fuel ratio AFlean before the cumulative oxygen excess/deficiency ΣOED of the upstream side exhaust purification catalyst 20 reaches the weakly lean switching reference value OEDlean. In this case, the target air-fuel ratio TAF is directly switched from the lean set air-fuel ratio TAFlean to the rich set air-fuel ratio TAFrich. Due to this, even if deviation occurs between the oxygen storage amount of the upstream side exhaust purification catalyst 20 which is estimated from the cumulative oxygen excess/deficiency ΣOED of the upstream side exhaust purification catalyst 20 and the actual oxygen storage amount of the upstream side exhaust purification catalyst 20, it is possible to more reliably suppress deterioration of the exhaust emission, in particular, deterioration of the exhaust emissions along with the occurrence of scavenging.

After step S604, at step S605, the lean set flag Fr is set to zero. Next, at step S606, the cumulative oxygen excess/deficiency ΣOED of the upstream side exhaust purification catalyst 20 is reset and is made zero. After that, the present control routine is ended.

<Third Embodiment>

Next, referring to FIG. 18 and FIG. 19, a third embodiment of the present invention will be explained. Note that, the configuration and control of the internal combustion engine of the third embodiment are basically similar to the internal combustion engines of the first embodiment and second embodiment, so in the following explanation, mainly parts different from the first embodiment and second embodiment will be explained.

In the third embodiment, the air-fuel ratio control device alternately sets the target air-fuel ratio of inflowing exhaust gas to a rich set air-fuel ratio which is richer than the stoichiometric air-fuel ratio and a lean set air-fuel ratio which is leaner than the stoichiometric air-fuel ratio.

Further, the air-fuel ratio control device, in rich control where the target air-fuel ratio is set to the rich set air-fuel ratio, switches the target air-fuel ratio to the lean set air-fuel ratio when the air-fuel ratio which was detected by the downstream side air-fuel ratio sensor 41 reaches a rich judged air-fuel ratio which is richer than the stoichiometric air-fuel ratio. The air-fuel ratio control device, in lean control where the target air-fuel ratio is set to the lean set air-fuel ratio, switches the target air-fuel ratio to the rich set air-fuel ratio when the air-fuel ratio which was detected by the downstream side air-fuel ratio sensor 41 reaches a lean judged air-fuel ratio which is leaner than the stoichiometric air-fuel ratio.

<Explanation of Air-Fuel Ratio Control Using Time Chart>

Figure 18:
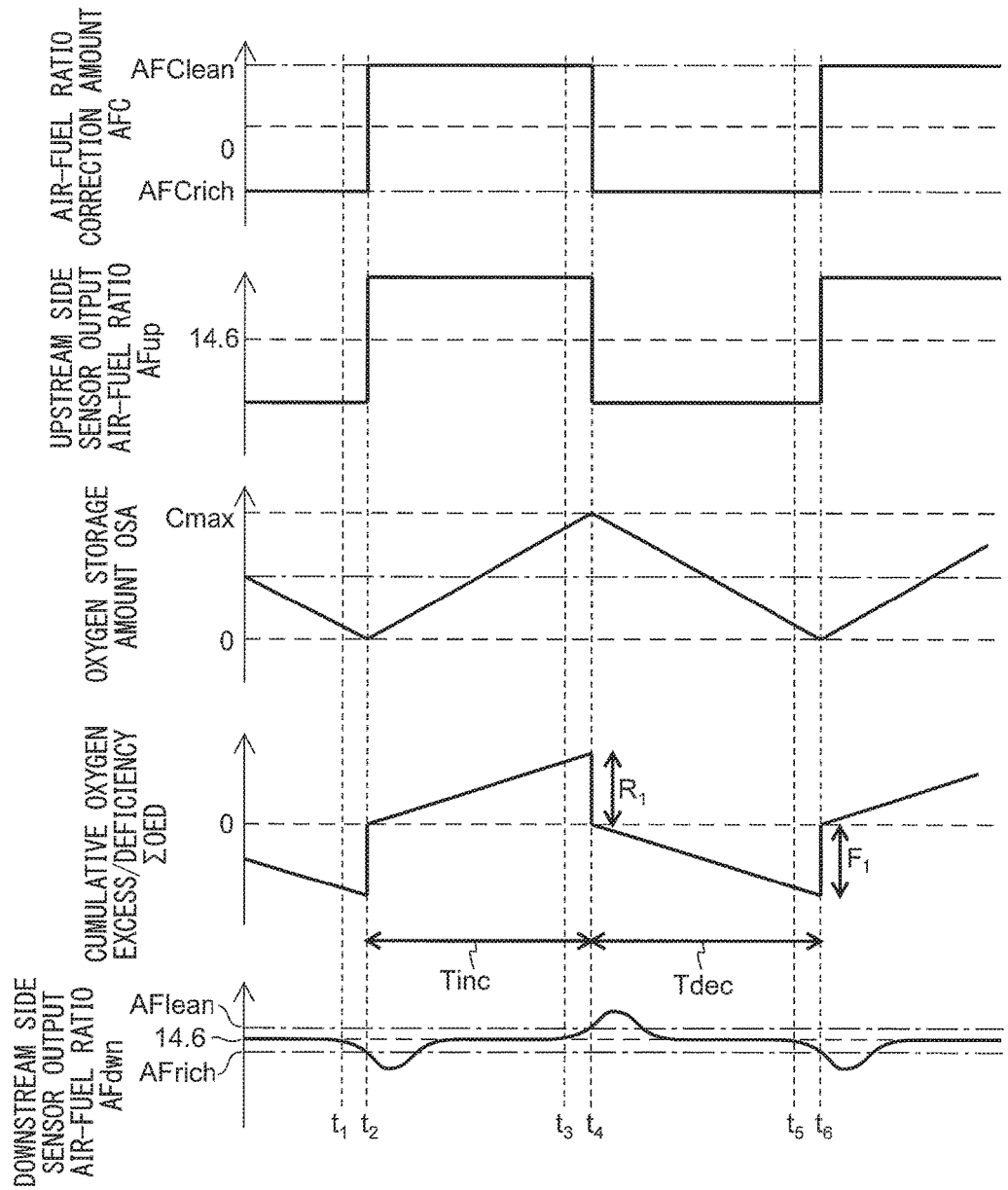
FIG. 18 is a time chart of an air-fuel ratio correction amount etc. relating to the target air-fuel ratio.

Referring to FIG. 18, the above-mentioned such operation will be specifically explained. FIG. 18 is a time chart of the air-fuel ratio correction amount AFC, output air-fuel ratio AFup of the upstream side air-fuel ratio sensor 40, oxygen storage amount OSA of the upstream side exhaust purification catalyst 20, cumulative oxygen excess/deficiency ΣOED, and output air-fuel ratio AFdwn of the downstream side air-fuel ratio sensor 41 in the case of performing basic air-fuel ratio control by the air-fuel ratio control device of an internal combustion engine according to a third embodiment of the present invention.

The cumulative oxygen excess/deficiency ΣOED which is shown in FIG. 18 shows the cumulative value of the oxygen excess/deficiency OED which is calculated by the formula (1). The cumulative oxygen excess/deficiency ΣOED is reset and made zero when the target air-fuel ratio is switched between the rich set air-fuel ratio and the lean set air-fuel ratio.

Note that, the air-fuel ratio correction amount AFC is the correction amount relating to the target air-fuel ratio of inflowing exhaust gas. When the air-fuel ratio correction amount AFC is "0", the target air-fuel ratio is made an air-fuel ratio (in the present embodiment, basically the stoichiometric air-fuel ratio) equal to the air-fuel ratio forming the center of control (below, referred to as "control center air-fuel ratio"). When the air-fuel ratio correction amount AFC is a positive value, the target air-fuel ratio is made an air-fuel ratio which is leaner than the control center air-fuel ratio (in the present embodiment, lean air-fuel ratio). When the air-fuel ratio correction amount AFC is a negative value, the target air-fuel ratio becomes an air-fuel ratio which is richer than the control center air-fuel ratio (in the present embodiment, rich air-fuel ratio).

In the illustrated example, in the state before the time $t_1$, the air-fuel ratio correction amount AFC is set to the rich set correction amount AFCsrich (corresponding to rich set air-fuel ratio). That is, the target air-fuel ratio is made the rich air-fuel ratio. Along with this, the output air-fuel ratio AFup of the upstream side air-fuel ratio sensor 40 becomes the rich air-fuel ratio. The unburned gas which is contained in the inflowing exhaust gas is removed by the upstream side exhaust purification catalyst 20. Along with this, the oxygen storage amount OSA of the upstream side exhaust purification catalyst 20 gradually decreases. On the other hand, due to the purification at the upstream side exhaust purification catalyst 20, the outflowing exhaust gas does not contain unburned gas, so the output air-fuel ratio AFdwn of the downstream side air-fuel ratio sensor 41 becomes substantially the stoichiometric air-fuel ratio.

If the oxygen storage amount OSA of the upstream side exhaust purification catalyst 20 gradually decreases, the oxygen storage amount OSA approaches zero at the time $t_1$. Along with this, part of the unburned gas which flows into the upstream side exhaust purification catalyst 20 starts to flow out without being removed at the upstream side exhaust purification catalyst 20. Due to this, after the time $t_1$, the output air-fuel ratio AFdwn of the downstream side air-fuel ratio sensor 41 gradually falls. As a result, in the illustrated example, at the time $t_2$, the oxygen storage amount OSA becomes substantially zero and the output air-fuel ratio AFdwn of the downstream side air-fuel ratio sensor 41 reaches the rich judged air-fuel ratio AFrich.

In the present embodiment, if the output air-fuel ratio AFdwn of the downstream side air-fuel ratio sensor 41 becomes the rich judged air-fuel ratio AFrich or less, to make the oxygen storage amount OSA increase, the air-fuel ratio correction amount AFC is switched to a lean set correction amount AFClean (corresponding to lean set air-fuel ratio). Therefore, the target air-fuel ratio is switched from the rich air-fuel ratio to the lean air-fuel ratio.

If, at the time $t_2$, the target air-fuel ratio is switched to the lean air-fuel ratio, the air-fuel ratio of the inflowing exhaust gas changes from the rich air-fuel ratio to the lean air-fuel ratio. Further, along with this, the output air-fuel ratio AFup of the upstream side air-fuel ratio sensor 40 becomes the lean air-fuel ratio. If, at the time $t_2$, the air-fuel ratio of the inflowing exhaust gas changes to the lean air-fuel ratio, the oxygen storage amount OSA of the upstream side exhaust purification catalyst 20 increases.

If the oxygen storage amount OSA of the upstream side exhaust purification catalyst 20 increases in this way, the air-fuel ratio of the outflowing exhaust gas changes toward the stoichiometric air-fuel ratio. Further, if the oxygen storage amount OSA of the upstream side exhaust purification catalyst 20 gradually increases, the oxygen storage amount OSA finally approaches the maximum storable oxygen amount Cmax. If, at the time $t_3$, the oxygen storage amount OSA approaches the maximum storable oxygen amount Cmax, part of the oxygen which flows into the upstream side exhaust purification catalyst 20 starts to flow out without being stored by the upstream side exhaust purification catalyst 20. Due to this, the output air-fuel ratio AFdwn of the downstream side air-fuel ratio sensor 41 gradually rises. As a result, in the illustrated example, at the time $t_4$, the oxygen storage amount OSA reaches the maximum storable oxygen amount Cmax and the output air-fuel ratio AFdwn of the downstream side air-fuel ratio sensor 41 reaches the lean judged air-fuel ratio AFlean.

If in the present embodiment, the output air-fuel ratio AFdwn of the downstream side air-fuel ratio sensor 41 becomes the lean judged air-fuel ratio AFlean or more, the air-fuel ratio correction amount AFC is switched to the rich set correction amount AFCrich to make the oxygen storage amount OSA decrease. Therefore, the target air-fuel ratio is switched from the lean air-fuel ratio to the rich air-fuel ratio.

If, at the time $t_4$, the target air-fuel ratio is switched to the rich air-fuel ratio, the air-fuel ratio of the exhaust gas which flows into the upstream side exhaust purification catalyst 20 changes from the lean air-fuel ratio to the rich air-fuel ratio. Further, along with this, the output air-fuel ratio AFup of the upstream side air-fuel ratio sensor 40 becomes the rich air-fuel ratio. If, at the time $t_4$, the air-fuel ratio of the inflowing exhaust gas changes to the rich air-fuel ratio, the oxygen storage amount OSA of the upstream side exhaust purification catalyst 20 decreases.

If, in this way, the oxygen storage amount OSA of the upstream side exhaust purification catalyst 20 decreases, the air-fuel ratio of the exhaust gas which flows out from the upstream side exhaust purification catalyst 20 changes toward the stoichiometric air-fuel ratio. Further, if the oxygen storage amount OSA of the upstream side exhaust purification catalyst 20 gradually decreases, at the time $t_5$, the oxygen storage amount OSA finally approaches zero in the same way as time $t_1$. After that, at the time $t_6$, in the same way as the time $t_2$, the output air-fuel ratio AFdwn of the downstream side air-fuel ratio sensor 41 reaches the rich judged air-fuel ratio AFrich. After that, the same operation as the operation of the times $t_1$ to $t_6$ is repeated.

Further, in the present embodiment, while the above-mentioned cycle of the times $t_1$ to $t_6$ is repeated, the amount of fuel which is fed to the combustion chamber 5 is controlled by feedback so that the output air-fuel ratio AFup of the upstream side air-fuel ratio sensor 40 becomes the target air-fuel ratio. For example, the amount of fuel which is fed to the combustion chamber 5 is made smaller when the output air-fuel ratio AFup of the upstream side air-fuel ratio sensor 40 becomes lower (richer) than the target air-fuel ratio. On the other hand, the amount of fuel which is fed to the combustion chamber 5 is made larger when the output air-fuel ratio AFup of the upstream side air-fuel ratio sensor 40 becomes higher (leaner) than the target air-fuel ratio.

As explained in the first embodiment, if deviation occurs between the output air-fuel ratio of the upstream side air-fuel ratio sensor 40 and the actual air-fuel ratio of the inflowing exhaust gas, even if performing the above such air-fuel ratio control, sometimes the exhaust emissions will deteriorate. Therefore, in the third embodiment as well, in the same way as the first embodiment and the second embodiment, learning control is performed during normal operation so as to make up for deviation of the output air-fuel ratio of the upstream side air-fuel ratio sensor 40. In learning control in the third embodiment, the learning value sfbg is updated using the above formula (2) based on the difference $\Delta\Sigma OED$ (for example $R_1-F_1$) between the absolute value of the cumulative oxygen excess/deficiency $\Sigma OED$ in the oxygen increasing time period Tinc (for example, $R_1$ in FIG. 18) and the absolute value of the cumulative oxygen excess/deficiency $\Sigma OED$ in the oxygen decreasing time period Tdec (for example, $F_1$ in FIG. 18). The learning control in the third embodiment is similar to the learning control in the first embodiment and the second embodiment, so explanation will be omitted.

In this regard, as explained in the first embodiment, if causing scavenging, the exhaust emissions are liable to deteriorate. Therefore, in the third embodiment as well, in the same way as the first embodiment and the second embodiment, the control routine of the air-fuel ratio control which is shown in FIG. 11 is performed so as to suppress deterioration of the exhaust emissions accompanying occurrence of scavenging. Further, in the same way as the first embodiment, the control routine of the scavenging judgment processing which is shown in FIG. 13 is performed so as to judge if the scavenging amount is the reference blow-through amount or less.

<Processing for Setting Target Air-Fuel Ratio>

Figure 19:
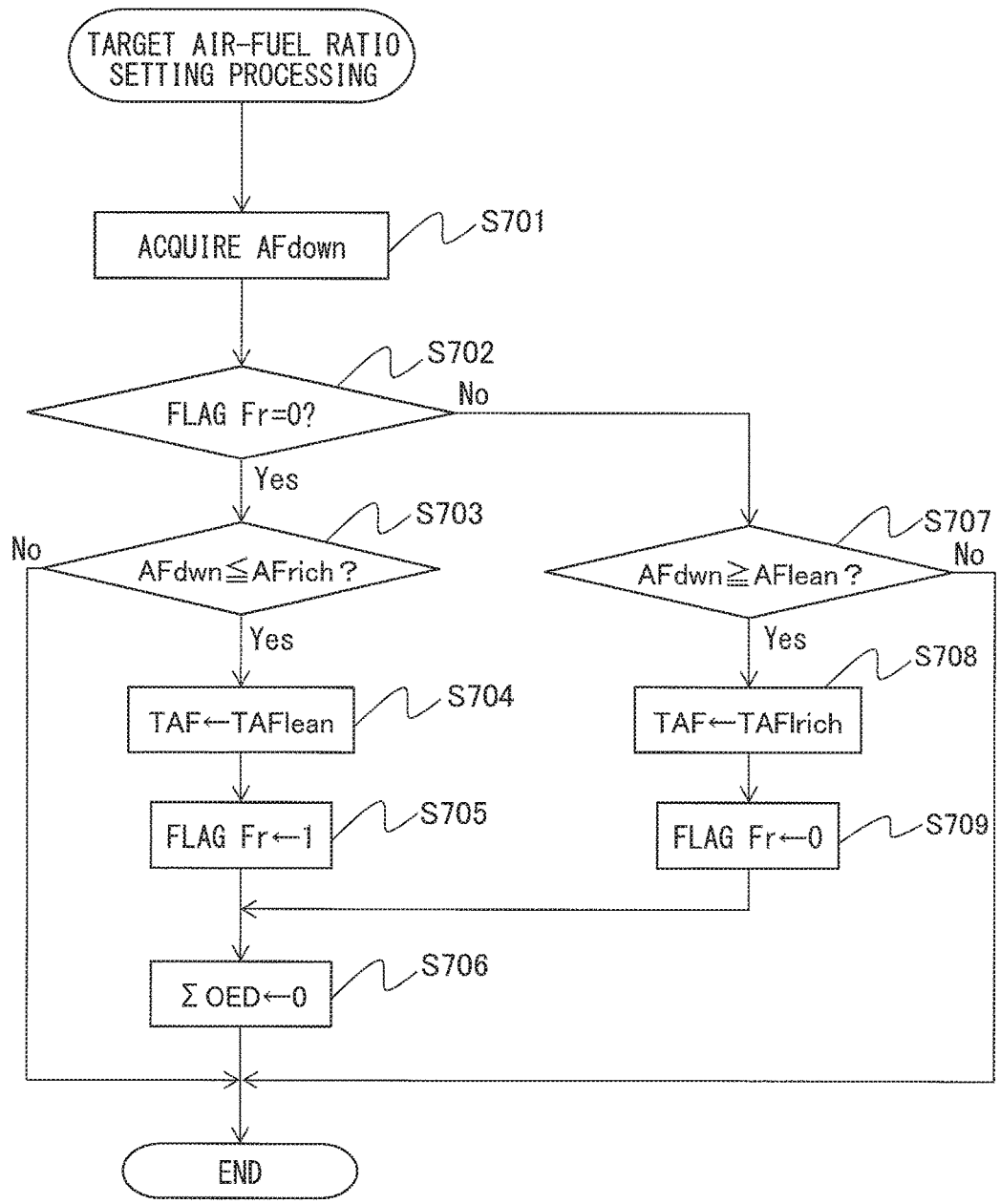
FIG. 19 is a flow chart which shows a control routine of processing for setting the target air-fuel ratio in a third embodiment of the present invention.

FIG. 19 is a flow chart which shows a control routine of processing for setting a target air-fuel ratio in the third embodiment of the present invention. The illustrated control routine is performed by interruption at certain time intervals.

First, at step S701, the output air-fuel ratio AFdwn of the downstream side air-fuel ratio sensor 41 is acquired. Next, at step S702, it is judged if the lean set flag Fr is set to zero. Note that, the lean set flag Fr is a flag which is made "1" when the target air-fuel ratio TAF is set to the lean set air-fuel ratio TAFlean while is made zero when the target air-fuel ratio TAF is set to the rich set air-fuel ratio TAFrich.

At step S702, when it is judged that the lean set flag Fr is set to zero, that is, when the target air-fuel ratio TAF is set to the rich set air-fuel ratio TAFrich, the routine proceeds to step S703. At step S703, it is judged if the output air-fuel ratio AFdwn of the downstream side air-fuel ratio sensor 41 is the predetermined rich judged air-fuel ratio AFrich or less. The rich judged air-fuel ratio AFrich is a predetermined air-fuel ratio which is slightly richer than the stoichiometric air-fuel ratio (for example, 14.55).

At step S703, when it is judged that the output air-fuel ratio AFdwn of the downstream side air-fuel ratio sensor 41 is larger than the rich judged air-fuel ratio AFrich, the present control routine is ended. Therefore, the target air-fuel ratio TAF is maintained at the rich set air-fuel ratio TAFrich.

On the other hand, at step S703, when it is judged that the output air-fuel ratio AFdwn of the downstream side air-fuel ratio sensor 41 is the rich judged air-fuel ratio AFrich or less, that is, when the output air-fuel ratio AFdwn of the downstream side air-fuel ratio sensor 41 reaches the rich judged air-fuel ratio AFrich, the routine proceeds to step S704. At step S704, the target air-fuel ratio TAF is set to the lean set air-fuel ratio TAFlean. Therefore, target air-fuel ratio TAF is switched from the rich set air-fuel ratio TAFrich to the lean set air-fuel ratio TAFlean. The lean set air-fuel ratio TAFlean is a predetermined air-fuel ratio which is a certain extent leaner than the stoichiometric air-fuel ratio (air-fuel ratio forming center of control). For example, it is made 14.65 to 20, preferably 14.65 to 18, more preferably 14.65 to 16 or so.

After step S704, at step S705, the lean set flag Fr is set to "1". Next, at step S706, the cumulative oxygen excess/deficiency ΣOED of the upstream side exhaust purification catalyst 20 is reset and made zero. After that, the present control routine is ended. Note that, in the third embodiment, the cumulative oxygen excess/deficiency ΣOED of the upstream side exhaust purification catalyst 20 is used in the learning control when the scavenging amount is the reference blow-through amount or less.

On the other hand, at step S702, when it is judged that the lean set flag Fr is set to "1", that is, when the target air-fuel ratio TAF is set to the lean set air-fuel ratio TAFlean, the routine proceeds to step S707. At step S707, it is judged if the output air-fuel ratio AFdwn of the downstream side air-fuel ratio sensor 41 is the lean judged air-fuel ratio AFlean or more. The lean judged air-fuel ratio AFlean is a predetermined air-fuel ratio which is slightly leaner than the stoichiometric air-fuel ratio (for example, 14.65).

At step S707, when it is judged that the output air-fuel ratio AFdwn of the downstream side air-fuel ratio sensor 41 is smaller than the lean judged air-fuel ratio AFlean, the present control routine is ended. Therefore, the target air-fuel ratio TAF is maintained at the lean set air-fuel ratio TAFlean. On the other hand, at step S708, when it is judged that the output air-fuel ratio AFdwn of the downstream side air-fuel ratio sensor 41 is the lean judged air-fuel ratio AFlean or more, that is, the output air-fuel ratio AFdwn of the downstream side air-fuel ratio sensor 41 has reached the lean judged air-fuel ratio AFlean, the routine proceeds to step S708. At step S708, the target air-fuel ratio TAF is set to the rich set air-fuel ratio TAFrich. Therefore, the target air-fuel ratio TAF is switched from the lean set air-fuel ratio TAFlean to the rich set air-fuel ratio TAFrich. The rich set air-fuel ratio TAFrich is a predetermined air-fuel ratio which is richer by a certain extent than the stoichiometric air-fuel ratio (air-fuel ratio forming control center). For example, it is made 10 to 14.55, preferably 12 to 14.52, more preferably 13 to 14.5 or so.

After step S708, at step S709, the lean set flag Fr is set to zero. Next, at step S706, the cumulative oxygen excess/deficiency ΣOED of the upstream side exhaust purification catalyst 20 is reset and is made zero. After that, the present control routine is ended.

<Fourth Embodiment>

Next, referring to FIG. 20, a fourth embodiment of the present invention will be explained. Note that, the configuration and control of the internal combustion engine of the fourth embodiment are basically similar to the internal combustion engines of the first embodiment to third embodiment, so in the following explanation, mainly parts different from the first embodiment to third embodiment will be explained.

As explained above, in the first embodiment to third embodiment, when the scavenging amount is larger than the reference blow-through amount, main feedback control and updating of the learning value are prohibited. For this reason, compared to when the scavenging amount is the reference blow-through amount or less (when main feedback control and updating of the learning value are permitted), sometimes the difference of the actual air-fuel ratio and target air-fuel ratio of the inflowing exhaust gas becomes larger.

If the difference of the actual air-fuel ratio and target air-fuel ratio of the inflowing exhaust gas is large, even if making the target air-fuel ratio the rich set air-fuel ratio, sometimes the actual air-fuel ratio of the exhaust gas becomes the lean set air-fuel ratio. Further, if the difference of the actual air-fuel ratio and target air-fuel ratio of the inflowing exhaust gas is large, even if making the target air-fuel ratio the lean set air-fuel ratio, sometimes the actual air-fuel ratio of the exhaust gas becomes the rich set air-fuel ratio. In this case, in the air-fuel ratio control in the first embodiment to third embodiment, the target air-fuel ratio cannot be switched at a suitable timing and the exhaust emissions are liable to deteriorate. Therefore, when the scavenging amount is larger than the reference blow-through amount, even if performing the air-fuel ratio control in the first embodiment to third embodiment, sometimes the exhaust emissions will deteriorate.

Therefore, in the fourth embodiment, the lean set air-fuel ratio when the scavenging amount is greater than the reference blow-through amount is made larger than the lean set air-fuel ratio when the scavenging amount is the reference blow-through amount or less, while the rich set air-fuel ratio when the scavenging amount is greater than the reference blow-through amount is made smaller than the rich set air-fuel ratio when the scavenging amount is the reference blow-through amount or less. Due to this, the absolute value of the difference between the lean set air-fuel ratio and the stoichiometric air-fuel ratio and the absolute value of the difference between the rich set air-fuel ratio and the stoichiometric air-fuel ratio when the scavenging amount is greater than the reference blow-through amount become larger than the absolute value of the difference between the lean set air-fuel ratio and the stoichiometric air-fuel ratio and the absolute value of the difference between the rich set air-fuel ratio and the stoichiometric air-fuel ratio when the scavenging amount is the reference blow-through amount or less. As a result, even when the scavenging amount is larger than the reference blow-through amount, in lean control where the target air-fuel ratio is set to the lean set air-fuel ratio, the actual air-fuel ratio of the inflowing exhaust gas can be made reliably lean and in rich control where the target air-fuel ratio is set to the rich set air-fuel ratio, the actual air-fuel ratio of the inflowing exhaust gas can be made reliably rich. Therefore, deterioration of the exhaust emissions along with the occurrence of scavenging can be more reliably suppressed.

<Control Routine of Air-Fuel Ratio Control>

Figure 20:
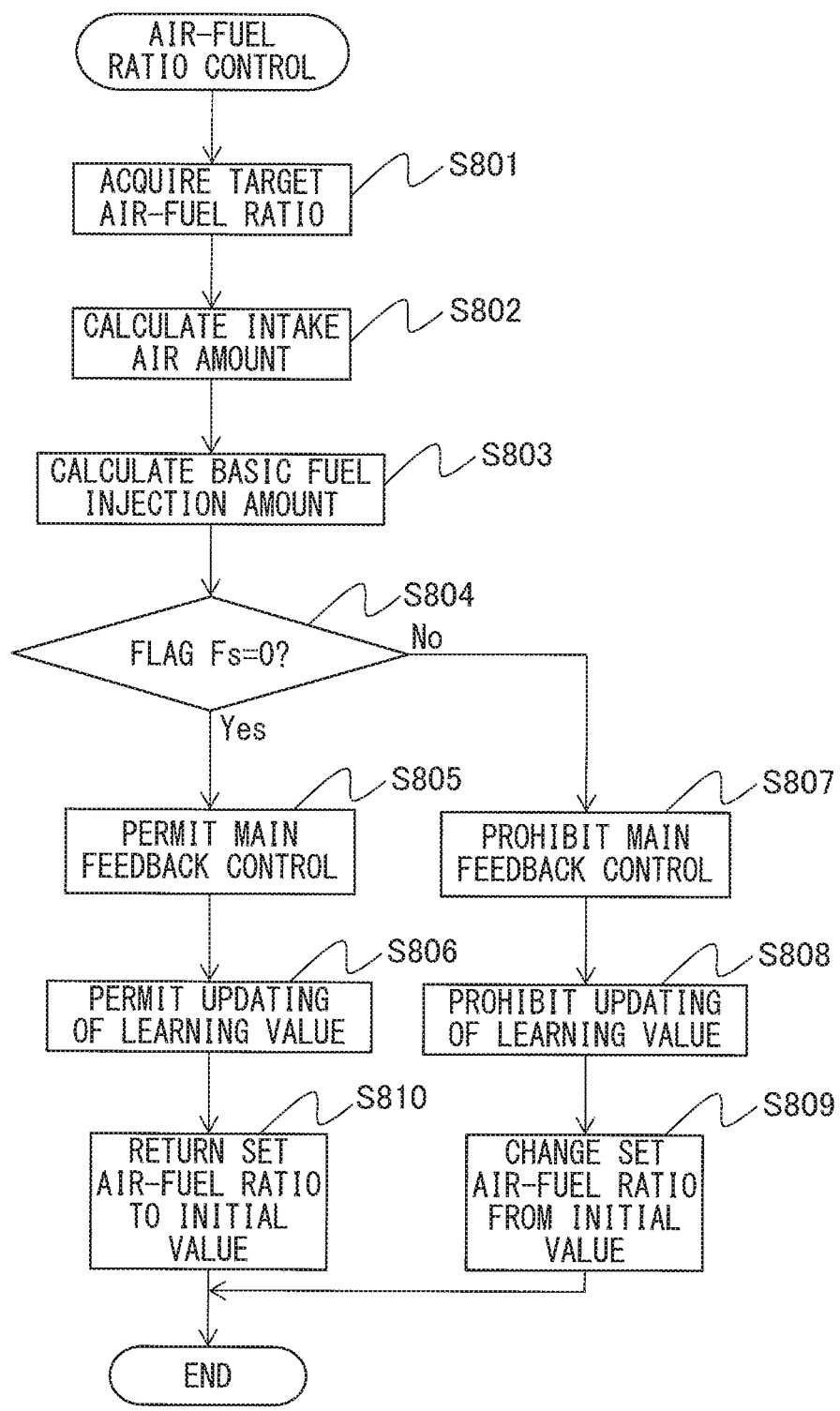
FIG. 20 is a flow chart which shows a control routine of processing for setting the target air-fuel ratio in a fourth embodiment of the present invention.

FIG. 20 is a flow chart which shows a control routine of air-fuel ratio control in a fourth embodiment of the present invention. The illustrated control routine is performed by interruption at certain time intervals. Step S801 to step S808 in FIG. 20 are similar to step S101 to step S108 in FIG. 11, so explanations will be omitted.

After step S808, at step S809, at least one of the rich set air-fuel ratio and lean set air-fuel ratio is changed from the initial value. Further, after step S806, at step S810, the rich set air-fuel ratio and the lean set air-fuel ratio are returned to the initial values.

Specifically, in the fourth embodiment, the lean set air-fuel ratio TAFlean in the first embodiment and third embodiment is made larger when the scavenging amount is larger than the reference blow-through amount compared with when the scavenging amount is the reference blow-through amount or less, and the rich set air-fuel ratio TAFrich in the first embodiment and third embodiment is made smaller when the scavenging amount is larger than the reference blow-through amount compared with when the scavenging amount is the reference blow-through amount or less. Note that, the absolute value of the difference between the lean set air-fuel ratio TAFlean and the stoichiometric air-fuel ratio in the first embodiment is larger than the absolute value of the difference between the rich set air-fuel ratio TAFrich and the stoichiometric air-fuel ratio in the first embodiment. For this reason, it is also possible to make the lean set air-fuel ratio TAFlean in the first embodiment constant regardless of the scavenging amount and make the rich set air-fuel ratio TAFrich in the first embodiment smaller when the scavenging amount is larger than the reference blow-through amount compared with when the scavenging amount is the reference blow-through amount or less.

Alternatively, the weakly lean set air-fuel ratio TAFslean in the second embodiment may be made larger when the scavenging amount is larger than the reference blow-through amount compared with when the scavenging amount is the reference blow-through amount or less, and the weakly rich set air-fuel ratio TAFsrich in the second embodiment may be made smaller when the scavenging amount is larger than the reference blow-through amount compared with when the scavenging amount is the reference blow-through amount or less. Note that, the weakly lean set air-fuel ratio TAFslean and lean set air-fuel ratio TAFlean in the second embodiment may be made larger when the scavenging amount is larger than the reference blow-through amount compared with when the scavenging amount is the reference blow-through amount or less, and the weakly rich set air-fuel ratio TAFsrich and rich set air-fuel ratio TAFrich in the second embodiment may be made smaller when the scavenging amount is larger than the reference blow-through amount compared with when the scavenging amount is the reference blow-through amount or less.

Note that, all of the above-mentioned control procedures are controlled by the ECU 31 of the internal combustion engine 100.

Above, preferred embodiments according to the present invention were explained, but the present invention is not limited to these embodiments and can be modified and changed in various ways within the scope of the claims.

REFERENCE SIGNS LIST 1. engine body
5. combustion chamber
7. intake port
9. exhaust port
13. intake runner
14. surge tank
18. throttle valve
19. exhaust manifold
20. upstream side exhaust purification catalyst
24. downstream side exhaust purification catalyst
31. ECU
40. upstream side air-fuel ratio sensor
41. downstream side air-fuel ratio sensor
101. turbocharger (supercharger)
100. internal combustion engine
B, C. variable valve timing mechanism

The invention claimed is:

1. An internal combustion engine comprising:
a supercharger configured to change a pressure of air fed into a combustion chamber,
a variable valve timing mechanism configured to change an amount of valve overlap between an intake valve and an exhaust valve,
a fuel injector for directly feeding fuel into the combustion chamber,
a catalyst which is arranged in an exhaust passage and which can store oxygen,
an upstream side air-fuel ratio sensor which is arranged at an upstream side of the catalyst and is configured to detect an air-fuel ratio of inflowing exhaust gas flowing into the catalyst,
a downstream side air-fuel ratio sensor which is arranged at a downstream side of the catalyst and is configured to detect an air-fuel ratio of outflowing exhaust gas flowing out from the catalyst, and
an air-fuel ratio control device including memory and a processor for executing control programs stored in the memory, the air-fuel ratio control device configured to control an air-fuel ratio of the inflowing exhaust gas, wherein, the air-fuel ratio control device further configured to:
set a target air-fuel ratio of the inflowing exhaust gas based on the air-fuel ratio detected by the downstream side air-fuel ratio sensor and control the amount of fuel fed to the combustion chamber by the fuel injector by feedback control so that the air-fuel ratio detected by the upstream side air-fuel ratio sensor matches the target air-fuel ratio when a blow-through amount of air blown from the intake passage through a cylinder to the exhaust passage due to an occurrence of valve overlap is a reference blow-through amount or less, and set the target air-fuel ratio of the inflowing exhaust gas based on the air-fuel ratio detected by the downstream side air-fuel ratio sensor and, without performing the feedback control, feed the amount of fuel calculated from the target air-fuel ratio to the combustion chamber when the blow-through amount is greater than the reference blow-through amount, and update the target air-fuel ratio of the inflowing exhaust gas based on the oxygen storage amount of the catalyst and the air-fuel ratio detected by the downstream side air-fuel ratio sensor, the oxygen storage amount of the catalyst being calculated based on the air-fuel ratio detected by the upstream side air-fuel ratio sensor when the blow-through amount is the reference blow-through amount or less and being calculated based on the target air-fuel ratio of the inflowing exhaust gas without using the air-fuel ratio detected by the upstream side air-fuel sensor when the blow-through amount is greater than the reference blow-through amount.

2. The internal combustion engine according to claim 1 wherein the reference blow-through amount is zero.

3. The internal combustion engine according to claim 1 wherein the target air-fuel ratio is alternately set to a rich set air-fuel ratio richer than a stoichiometric air-fuel ratio and a lean set air-fuel ratio leaner than the stoichiometric air-fuel ratio, the air-fuel ratio control device, in rich control where the target air-fuel ratio is set to the rich set air-fuel ratio, is configured to switch the target air-fuel ratio to the lean set air-fuel ratio when the air-fuel ratio detected by the downstream side air-fuel ratio sensor reaches a rich judged air-fuel ratio richer than the stoichiometric air-fuel ratio and, in lean control where the target air-fuel ratio is set to the lean set air-fuel ratio, is configured to switch the target air-fuel ratio to the rich set air-fuel ratio when it is estimated that the oxygen storage amount of the catalyst has reached a reference oxygen storage amount smaller than the maximum oxygen storage amount, the oxygen storage amount of the catalyst being calculated based on the air-fuel ratio detected by the upstream side air-fuel ratio sensor when the blow-through amount is the reference blow-through amount or less and is calculated based on the target air-fuel ratio without using the air-fuel ratio detected by the upstream side air-fuel ratio sensor when the blow-through amount is greater than the reference blow-through amount.

4. The internal combustion engine according to claim 3 wherein the air-fuel ratio control device, in lean control, is configured to switch the target air-fuel ratio to the rich set air-fuel ratio when the air-fuel ratio detected by the downstream side air-fuel ratio sensor reaches a lean judged air-fuel ratio leaner than the stoichiometric air-fuel ratio if the air-fuel ratio detected by the downstream side air-fuel ratio sensor reaches the lean judged air-fuel ratio before it has estimated that the oxygen storage amount of the catalyst has reached the reference oxygen storage amount.

5. The internal combustion engine according to claim 1 wherein the target air-fuel ratio is set to any of a rich set air-fuel ratio richer than a stoichiometric air-fuel ratio, a weakly rich set air-fuel ratio richer than the stoichiometric air-fuel ratio and closer to the stoichiometric air-fuel ratio than the rich set air-fuel ratio, a lean set air-fuel ratio leaner than the stoichiometric air-fuel ratio, and a weakly lean set air-fuel ratio leaner than the stoichiometric air-fuel ratio and closer to the stoichiometric air-fuel ratio than the lean set air-fuel ratio, the air-fuel ratio control device, in rich control where the target air-fuel ratio is set to the rich set air-fuel ratio, is configured to switch the target air-fuel ratio to the weakly rich set air-fuel ratio when it is estimated that the oxygen storage amount of the catalyst has reached a first reference oxygen storage amount smaller than the maximum oxygen storage amount, in weakly rich control where the target air-fuel ratio is set to the weakly rich set air-fuel ratio, is configured to switch the target air-fuel ratio to the lean set air-fuel ratio when the air-fuel ratio detected by the downstream side air-fuel ratio sensor reaches a rich judged air-fuel ratio richer than the stoichiometric air-fuel ratio, in lean control where the target air-fuel ratio is set to the lean set air-fuel ratio, is configured to switch the target air-fuel ratio to the weakly lean set air-fuel ratio when it is estimated that the oxygen storage amount of the catalyst has reached a second reference oxygen storage amount smaller than the maximum oxygen storage amount, and, in weakly lean control where the target air-fuel ratio is set to the weakly lean set air-fuel ratio, is configured to switch the target air-fuel ratio to the rich set air-fuel ratio when the air-fuel ratio detected by the downstream side air-fuel ratio sensor has reached a lean judged air-fuel ratio leaner than the stoichiometric air-fuel ratio, the oxygen storage amount of the catalyst being calculated based on the air-fuel ratio detected by the upstream side air-fuel ratio sensor when the blow-through amount is the reference blow-through amount or less and is calculated based on the target air-fuel ratio without using the air-fuel ration detected by the upstream side air-fuel ration sensor when the blow-through amount is larger than the reference blow-through amount.

6. The internal combustion engine according to claim 5 wherein the air-fuel ratio control device, in the rich control, is configured to switch the target air-fuel ratio to the lean set air-fuel ratio when the air-fuel ratio detected by the downstream side air-fuel ratio sensor reaches the rich judged air-fuel ratio if the air-fuel ratio detected by the downstream side air-fuel ratio sensor reaches the rich judged air-fuel ratio before the oxygen storage amount of the catalyst reaches the first reference oxygen storage amount and, in the lean control, is configured to switch the target air-fuel ratio to the rich set air-fuel ratio when the air-fuel ratio detected by the downstream side air-fuel ratio sensor reaches the lean judged air-fuel ratio if the air-fuel ratio detected by the downstream side air-fuel ratio sensor reaches the lean judged air-fuel ratio before the oxygen storage amount of the catalyst reaches the second reference oxygen storage amount.

7. The internal combustion engine according to claim 5 wherein the weakly lean set air-fuel ratio when the blow-through amount is larger than the reference blow-through amount is larger than the weakly lean set air-fuel ratio when the blow-through amount is the reference blow-through amount or less, and the weakly rich set air-fuel ratio when the blow-through amount is larger than the reference blow-through amount is smaller than the weakly rich set air-fuel ratio when the blow-through amount is the reference blow-through amount or less.

8. The internal combustion engine according to claim 6 wherein the weakly lean set air-fuel ratio when the blow-through amount is larger than the reference blow-through amount is larger than the weakly lean set air-fuel ratio when the blow-through amount is the reference blow-through amount or less, and the weakly rich set air-fuel ratio when the blow-through amount is larger than the reference blow-through amount is smaller than the weakly rich set air-fuel ratio when the blow-through amount is the reference blow-through amount or less.

9. The internal combustion engine according to claim 3 wherein
the lean set air-fuel ratio when the blow-through amount is larger than the reference blow-through amount is larger than the lean set air-fuel ratio when the blow-through amount is the reference blow-through amount or less and
the rich set air-fuel ratio when the blow-through amount is larger than the reference blow-through amount is smaller than the rich set air-fuel ratio when the blow-through amount is the reference blow-through amount or less.

10. The internal combustion engine according to claim 3, wherein
the air-fuel ratio control device is configured to calculate an amount of oxygen stored in the catalyst in the time period from when switching the target air-fuel ratio to the lean set air-fuel ratio to when switching the target air-fuel ratio to the rich set air-fuel ratio, constituting a first oxygen amount, and an amount of oxygen released from the catalyst in the time period from when switching the target air-fuel ratio to the rich set air-fuel ratio to when switching the target air-fuel ratio to the lean set air-fuel ratio, constituting a second oxygen amount, based on the air-fuel ratio detected by the upstream side air-fuel ratio sensor, and the air-fuel ratio control device is configured to update a learning value based on the difference between the first oxygen amount and the second oxygen amount and is configured to correct a parameter relating to the air-fuel ratio based on the updated learning value so that the difference between the first oxygen amount and the second oxygen amount becomes smaller when the blow-through amount is the reference blow-through amount or less and, without updating the learning value, is configured to correct the parameter based on the current learning value when the blow-through amount is greater than the reference blow-through amount.

* * * * *